US006677936B2

(12) United States Patent
Jacobsen et al.

(10) Patent No.: US 6,677,936 B2
(45) Date of Patent: Jan. 13, 2004

(54) COLOR DISPLAY SYSTEM FOR A CAMERA

(75) Inventors: Jeffrey Jacobsen, Hollister, CA (US); John C. C. Fan, Chestnut Hill, MA (US); Stephen A. Pombo, Campbell, CA (US); Matthew Zavracky, Plympton, MA (US); Rodney Bumgardner, San Jose, CA (US); Alan Richard, Wrentham, MA (US); Wen-Foo Chern, Wayland, MA (US)

(73) Assignee: Kopin Corporation, Taunton, MA (US)

( * ) Notice: Subject to any disclaimer, the term of this patent is extended or adjusted under 35 U.S.C. 154(b) by 0 days.

(21) Appl. No.: 08/942,272

(22) Filed: Sep. 30, 1997

(65) Prior Publication Data

US 2001/0043166 A1 Nov. 22, 2001

Related U.S. Application Data

(63) Continuation-in-part of application No. 08/884,485, filed on Jun. 27, 1997, now Pat. No. 6,232,937, which is a continuation-in-part of application No. 08/855,909, filed on May 14, 1997, now Pat. No. 6,073,034, which is a continuation-in-part of application No. 08/853,630, filed on May 9, 1997, now Pat. No. 6,486,862, which is a continuation-in-part of application No. 08/838,420, filed on Apr. 7, 1997, which is a continuation-in-part of application No. 08/810,646, filed on Mar. 3, 1997, which is a continuation-in-part of application No. 08/766,607, filed on Dec. 13, 1996, which is a continuation-in-part of application No. 08/741,671, filed on Oct. 31, 1996.

(51) Int. Cl.[7] .................................................. G09G 5/00
(52) U.S. Cl. ........................ 345/211; 345/102; 345/88; 348/333.01; 348/333.13; 396/374
(58) Field of Search ............................... 345/87, 88, 89, 345/101, 7, 8, 9, 102, 211, 212, 213; 348/333.01, 333.02, 333.09, 333.11, 333.12, 333.13; 396/373, 374

(56) References Cited

U.S. PATENT DOCUMENTS 4,010,322 A  3/1977 Nathanson .................. 358/233
4,159,417 A  6/1979 Rubincam ................... 235/375

(List continued on next page.)

FOREIGN PATENT DOCUMENTS

CA    2123461     11/1994
DE    27 15 446   10/1978

(List continued on next page.)

OTHER PUBLICATIONS

"Hand–held Videophone," *Popular Science* (Feb. 1992).
"VideoPhone price cut to $1,000," *USA Today* (Jan. 2, 1993).
"SA620 Integrated Front–End," *Philips Electronics North America Corp.* (1993).
Kummerow, T., Meurer, W., "Bildtelefon—ein Kommunikationsdienst im ISDN ab 1991," *Telenorma Nachrichten, Telenorma Bosch Gruppe* 1989 Heft 93, pp. 52, 53, index and cover page.
Linder, Ben, "A whole lot smarter," *Telephony*, pp. 22, 23, 26, 28 and cover (May 19, 1997).

*Primary Examiner*—Xiao Wu
(74) *Attorney, Agent, or Firm*—Hamilton, Brook, Smith & Reynolds, P.C.

(57) ABSTRACT

The invention relates to a microdisplay system that utilizes a small high resolution active matrix liquid crystal display with an illumination system and a magnifying optical system to provide a viewfinder in a electronic image record system such as a digital camera or video camera. The matrix display can be transmissive or reflective using sequential lighting. The system can use an alternating common voltage which allows reduced power consumption. In addition an internal heating system in the display allows the system to be used at low temperatures.

30 Claims, 71 Drawing Sheets

U.S. PATENT DOCUMENTS

| | | | | |
|---|---|---|---|---|
| 4,258,387 A | | 3/1981 | Lemelson et al. ............. 358/85 |
| 4,336,524 A | | 6/1982 | Levine .................... 340/311.1 |
| 4,573,766 A | | 3/1986 | Bournay, Jr. et al. ....... 350/345 |
| 4,621,261 A | * | 11/1986 | Hehlen et al. ............... 345/101 |
| 4,630,895 A | | 12/1986 | Abdala, Jr. et al. ......... 350/345 |
| 4,636,866 A | | 1/1987 | Hattori ...................... 358/236 |
| 4,695,129 A | | 9/1987 | Faessen et al. .......... 350/96.25 |
| 4,704,740 A | | 11/1987 | McKee et al. .............. 455/348 |
| 4,814,876 A | | 3/1989 | Horio et al. ................. 358/160 |
| 4,837,817 A | | 6/1989 | Maemori .................... 358/224 |
| 4,850,009 A | | 7/1989 | Zook et al. .................... 379/96 |
| 4,855,725 A | | 8/1989 | Fernandez .................. 340/706 |
| 4,856,045 A | | 8/1989 | Hoshina ....................... 379/53 |
| 4,856,088 A | | 8/1989 | Oliwa et al. ................. 455/349 |
| 4,873,576 A | | 10/1989 | Hattori et al. ............... 358/224 |
| 4,882,617 A | | 11/1989 | Vriens ......................... 358/60 |
| 4,916,441 A | | 4/1990 | Gombrich ................... 340/712 |
| 4,928,300 A | | 5/1990 | Ogawa et al. ................ 379/53 |
| 4,934,773 A | | 6/1990 | Becker ....................... 350/6.6 |
| 4,958,915 A | | 9/1990 | Okada et al. ............... 350/345 |
| 4,959,642 A | | 9/1990 | Sharples .................... 340/716 |
| 4,975,694 A | | 12/1990 | McLaughlin et al. .. 340/825.44 |
| 4,977,456 A | | 12/1990 | Furuya .................. 358/213.13 |
| 4,980,774 A | | 12/1990 | Brody ........................ 358/241 |
| 5,003,300 A | | 3/1991 | Wells ......................... 340/705 |
| 5,008,658 A | | 4/1991 | Russay et al. .............. 340/784 |
| 5,008,788 A | | 4/1991 | Palinkas ..................... 362/231 |
| 5,023,931 A | | 6/1991 | Streck et al. ................. 455/21 |
| 5,042,918 A | | 8/1991 | Suzuki ........................ 359/59 |
| 5,048,077 A | | 9/1991 | Wells et al. ................... 379/96 |
| 5,077,784 A | | 12/1991 | Fujita et al. .................. 379/53 |
| 5,079,627 A | | 1/1992 | Filo ............................ 358/85 |
| 5,088,806 A | | 2/1992 | McCartney et al. .......... 359/84 |
| 5,106,179 A | | 4/1992 | Kamaya et al. ............. 351/158 |
| 5,108,172 A | | 4/1992 | Flasck ........................ 353/31 |
| 5,111,498 A | | 5/1992 | Guichard et al. ............. 379/53 |
| 5,122,880 A | | 6/1992 | Nagano ...................... 358/209 |
| 5,132,825 A | | 7/1992 | Miyadera .................... 359/85 |
| 5,138,312 A | | 8/1992 | Tsukamoto et al. .... 340/825.44 |
| 5,162,828 A | | 11/1992 | Furness et al. ............. 353/122 |
| 5,164,833 A | | 11/1992 | Aoki ........................... 358/224 |
| 5,164,980 A | | 11/1992 | Bush et al. .................. 379/53 |
| 5,166,814 A | | 11/1992 | Jacobs et al. ............... 359/40 |
| 5,170,427 A | | 12/1992 | Guichard et al. ............. 379/53 |
| 5,185,712 A | | 2/1993 | Sato et al. ................... 358/224 |
| 5,189,632 A | | 2/1993 | Paajanen et al. ....... 364/705.05 |
| 5,204,660 A | | 4/1993 | Kamagami et al. ......... 340/784 |
| 5,206,749 A | | 4/1993 | Zavracky et al. ............. 359/59 |
| 5,220,366 A | | 6/1993 | King .......................... 354/76 |
| 5,224,198 A | | 6/1993 | Jachimowicz et al. | |
| 5,239,665 A | | 8/1993 | Tsuchiya ................... 395/800 |
| 5,256,562 A | | 10/1993 | Vu et al. ...................... 437/86 |
| 5,258,325 A | | 11/1993 | Spitzer et al. ................ 437/86 |
| 5,260,625 A | | 11/1993 | Holden et al. ............... 313/486 |
| 5,280,372 A | | 1/1994 | Horiuchi ...................... 359/49 |
| 5,281,957 A | | 1/1994 | Schoolman .................... 345/8 |
| 5,300,788 A | | 4/1994 | Fan et al. ....................... 257/13 |
| 5,300,976 A | | 4/1994 | Lim et al. .................... 354/219 |
| 5,305,244 A | | 4/1994 | Newman et al. ......... 364/708.1 |
| 5,311,206 A | | 5/1994 | Nelson ........................ 345/89 |
| 5,317,236 A | | 5/1994 | Zavracky et al. ......... 315/169.3 |
| 5,321,416 A | | 6/1994 | Bassett et al. .................. 345/8 |
| 5,325,429 A | | 6/1994 | Kurgan ........................ 379/53 |
| 5,331,333 A | | 7/1994 | Tagawa et al. ............... 345/7 |
| 5,334,821 A | | 8/1994 | Campo et al. ............... 235/380 |
| 5,335,276 A | | 8/1994 | Thompson et al. ............ 380/21 |
| 5,337,068 A | * | 8/1994 | Stewart et al. ............... 345/88 |
| 5,347,378 A | | 9/1994 | Handschy et al. ............ 359/53 |
| 5,347,400 A | | 9/1994 | Hunter ....................... 359/815 |
| 5,362,671 A | | 11/1994 | Zavracky et al. ............. 437/81 |
| 5,371,493 A | | 12/1994 | Sharpe et al. .......... 340/825.34 |
| 5,376,979 A | | 12/1994 | Zavracky et al. ............ 353/122 |
| 5,381,179 A | | 1/1995 | Kashimura .................. 348/376 |
| 5,398,043 A | | 3/1995 | Takeda et al. ................. 345/94 |
| 5,402,143 A | | 3/1995 | Ge et al. ..................... 345/102 |
| 5,404,580 A | | 4/1995 | Simpson et al. .............. 455/89 |
| 5,408,344 A | | 4/1995 | Takiguchi et al. ............. 359/40 |
| 5,412,396 A | | 5/1995 | Nelson ........................ 345/89 |
| 5,416,496 A | | 5/1995 | Wood ......................... 345/102 |
| 5,422,656 A | | 6/1995 | Allard et al. ................ 345/173 |
| 5,436,635 A | | 7/1995 | Takahara et al. .............. 345/95 |
| 5,444,557 A | | 8/1995 | Spitzer et al. ................. 359/59 |
| 5,467,215 A | | 11/1995 | Lebby et al. ................ 359/247 |
| 5,469,278 A | | 11/1995 | Takahara et al. .............. 359/51 |
| 5,475,399 A | | 12/1995 | Borsuk ....................... 345/130 |
| 5,483,285 A | | 1/1996 | Lim et al. .................... 348/341 |
| 5,485,318 A | | 1/1996 | Lebby et al. ................ 359/811 |
| 5,485,504 A | | 1/1996 | Ohnsorge .................... 379/58 |
| 5,486,708 A | | 1/1996 | Takahashi et al. ............ 257/59 |
| 5,486,946 A | | 1/1996 | Jachimowicz et al. ...... 359/263 |
| 5,491,507 A | | 2/1996 | Umezawa et al. ............ 348/14 |
| 5,495,287 A | | 2/1996 | Kasai et al. ................... 345/89 |
| 5,499,138 A | | 3/1996 | Iba ............................. 359/569 |
| 5,515,424 A | | 5/1996 | Kenney ........................ 379/96 |
| 5,528,285 A | | 6/1996 | Morikawa et al. ............ 348/14 |
| 5,539,554 A | | 7/1996 | Lebby et al. ................. 359/83 |
| 5,539,578 A | | 7/1996 | Togino et al. ............... 359/630 |
| 5,541,640 A | | 7/1996 | Larson ........................ 348/19 |
| 5,548,271 A | | 8/1996 | Tsuchiyama et al. .... 340/311.1 |
| 5,549,747 A | | 8/1996 | Bozler et al. ................. 117/43 |
| 5,550,754 A | | 8/1996 | McNelley et al. ...... 364/514 A |
| 5,561,538 A | | 10/1996 | Kato et al. ................... 359/40 |
| 5,568,185 A | | 10/1996 | Yoshikazu ................... 348/22 |
| 5,581,271 A | | 12/1996 | Kraemer ....................... 345/8 |
| 5,584,070 A | | 12/1996 | Harris et al. ................. 455/346 |
| 5,585,948 A | | 12/1996 | Petera ......................... 349/143 |
| 5,596,451 A | | 1/1997 | Handschy et al. ........... 359/633 |
| 5,608,553 A | | 3/1997 | Kim ............................ 349/61 |
| 5,627,560 A | * | 5/1997 | Verhulst ..................... 345/100 |
| 5,634,080 A | | 5/1997 | Kikinis et al. ............... 395/893 |
| 5,640,174 A | | 6/1997 | Kamei et al. ................. 345/89 |
| 5,642,129 A | | 6/1997 | Zavracky et al. ............ 345/100 |
| 5,646,432 A | | 7/1997 | Iwaki et al. ................. 257/347 |
| 5,648,860 A | | 7/1997 | Ooi et al. ..................... 349/10 |
| 5,661,635 A | | 8/1997 | Huffman et al. ............ 361/684 |
| 5,666,133 A | | 9/1997 | Matsuo et al. .............. 345/100 |
| 5,673,059 A | | 9/1997 | Zavracky et al. ............... 345/8 |
| 5,677,727 A | | 10/1997 | Gotoh et al. ................. 348/14 |
| 5,682,214 A | | 10/1997 | Amako et al. ................ 349/74 |
| 5,689,283 A | | 11/1997 | Shirochi .................... 345/132 |
| 5,691,783 A | | 11/1997 | Numao et al. ............... 348/48 |
| 5,694,147 A | | 12/1997 | Gaalema et al. ............ 345/101 |
| 5,719,936 A | | 2/1998 | Hillenmayer ................ 379/447 |
| 5,726,671 A | | 3/1998 | Ansley et al. .................. 345/8 |
| 5,734,875 A | | 3/1998 | Cheng ........................ 395/516 |
| 5,746,493 A | | 5/1998 | Jönsson et al. ................ 362/31 |
| 5,751,261 A | | 5/1998 | Zavracky et al. .............. 345/55 |
| 5,754,227 A | | 5/1998 | Fukuoka .................... 348/232 |
| 5,757,445 A | | 5/1998 | Vu et al. ...................... 349/45 |
| 5,761,485 A | | 6/1998 | Munyan ..................... 395/500 |
| 5,763,862 A | | 6/1998 | Jachimowicz et al. ...... 235/380 |
| 5,777,594 A | | 7/1998 | Miyawaki ................... 345/102 |
| 5,797,089 A | | 8/1998 | Nguyen ..................... 455/403 |
| 5,806,950 A | | 9/1998 | Gale et al. ................... 353/78 |
| 5,812,101 A | | 9/1998 | Monarchie et al. ............ 345/8 |
| 5,812,149 A | | 9/1998 | Kawasaki et al. .......... 345/516 |
| 5,815,126 A | | 9/1998 | Fan et al. ...................... 345/8 |
| 5,815,228 A | | 9/1998 | Flynn .......................... 349/71 |
| 5,822,021 A | | 10/1998 | Johnson et al. ............. 348/742 |
| 5,825,408 A | | 10/1998 | Yuyama et al. ............. 348/14 |
| 5,828,427 A | | 10/1998 | Faris ............................ 349/5 |

| | | | | | | |
|---|---|---|---|---|---|---|
| 5,889,567 A | | 3/1999 | Swanson et al. ............... 349/62 | JP | 1-160286 | 6/1989 |
| 5,926,161 A | | 7/1999 | Furuhashi et al. .......... 345/100 | JP | 2-113656 | 4/1990 |
| 5,929,958 A | | 7/1999 | Ohta et al. .................. 349/141 | JP | 2-196570 | 8/1990 |
| 5,940,159 A | | 8/1999 | Alvelda ...................... 349/202 | JP | 2-218251 | 8/1990 |
| 6,027,958 A | | 2/2000 | Vu et al. ..................... 438/110 | JP | 3-53785 | 3/1991 |
| 6,073,034 A | * | 6/2000 | Jacobsen et al. ............ 455/566 | JP | 3-105383 | 5/1991 |
| 6,232,937 B1 | * | 5/2001 | Jacobsen et al. ............. 345/87 | JP | 3-136487 | 6/1991 |
| 6,486,862 B1 | * | 11/2002 | Jacobsen et al. .............. 11/202 | JP | 5-14550 | 1/1993 |
| | | | | JP | 5-252523 | 9/1993 |

FOREIGN PATENT DOCUMENTS

| | | |
|---|---|---|
| JP | 6-123852 | 5/1994 |
| DE | 28 20 096 | 11/1979 |
| JP | 7-177398 | 7/1995 |
| DE | 38 28 485 A1 | 3/1990 |
| JP | 7-235892 | 9/1995 |
| DE | 92 00 683.3 | 6/1992 |
| JP | 8-76078 | 3/1996 |
| EP | 0 172 473 A2 | 2/1986 |
| JP | 8-95027 | 4/1996 |
| EP | 0 344 881 A2 | 12/1989 |
| JP | 8-102877 | 4/1996 |
| EP | 0 352 914 A2 | 1/1990 |
| JP | 8-114783 | 5/1996 |
| EP | 0 424 880 A2 | 5/1991 |
| JP | 8-129157 | 5/1996 |
| EP | 0 438 362 A1 | 7/1991 |
| JP | 8-149346 | 6/1996 |
| EP | 0 464 011 A1 | 1/1992 |
| JP | 8-149485 | 6/1996 |
| EP | 0 472 361 A2 | 2/1992 |
| JP | 8-154190 | 6/1996 |
| EP | 0 491 639 A1 | 6/1992 |
| JP | 8-248499 | 9/1996 |
| EP | 0 526 802 A2 | 2/1993 |
| JP | 8-340546 | 12/1996 |
| EP | 0 535 401 A1 | 4/1993 |
| JP | 9-26617 | 1/1997 |
| EP | 0 539 699 A2 | 5/1993 |
| JP | 9-55872 | 2/1997 |
| EP | 0 539 907 A3 | 5/1993 |
| WO | 92/12453 | 7/1992 |
| EP | 0 547 493 A1 | 6/1993 |
| WO | 93/01583 | 1/1993 |
| EP | 0 551 781 A1 | 7/1993 |
| WO | 93/16550 | 8/1993 |
| EP | 0 626 773 A1 | 11/1994 |
| WO | 93/18428 | 9/1993 |
| EP | 0 626 773 B1 | 11/1994 |
| WO | 93/23783 | 11/1993 |
| EP | 0 631 289 A3 | 12/1994 |
| WO | 94/01958 | 1/1994 |
| EP | 0 631 289 A2 | 12/1994 |
| WO | 94/09398 | 4/1994 |
| EP | 0 689 350 A2 | 12/1995 |
| WO | 94/11775 | 5/1994 |
| EP | 0 704 788 A2 | 4/1996 |
| WO | 94/14152 | 6/1994 |
| EP | 0 732 606 A2 | 9/1996 |
| WO | 95/11473 | 4/1995 |
| EP | 0 817 393 A2 | 1/1998 |
| WO | 95/25983 | 9/1995 |
| FR | 2612351 | 9/1988 |
| WO | 95/26110 | 9/1995 |
| GB | 2149554 A | 12/1985 |
| WO | 96/19794 | 6/1996 |
| GB | 2 242 335 A | 9/1991 |
| WO | 96/21173 | 7/1996 |
| GB | 2 289 555 | 5/1995 |
| WO | 96/21205 | 7/1996 |
| GB | 2 308 486 | 12/1995 |
| WO | 96/24197 | 8/1996 |
| JP | 61-139177 | 6/1986 |
| WO | 96/35288 | 11/1996 |
| JP | 62-91045 | 4/1987 |
| WO | 97/01240 | 1/1997 |
| JP | 63-151283 | 6/1988 |

* cited by examiner

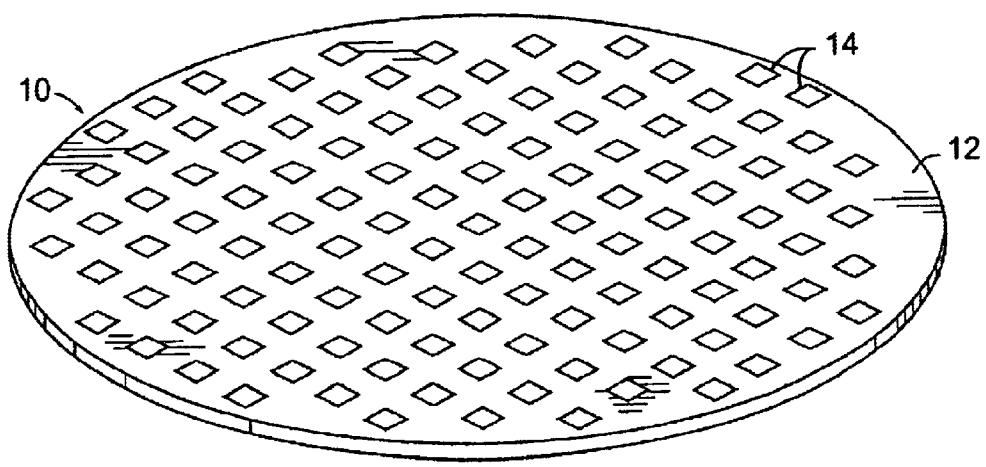
FIG. 1
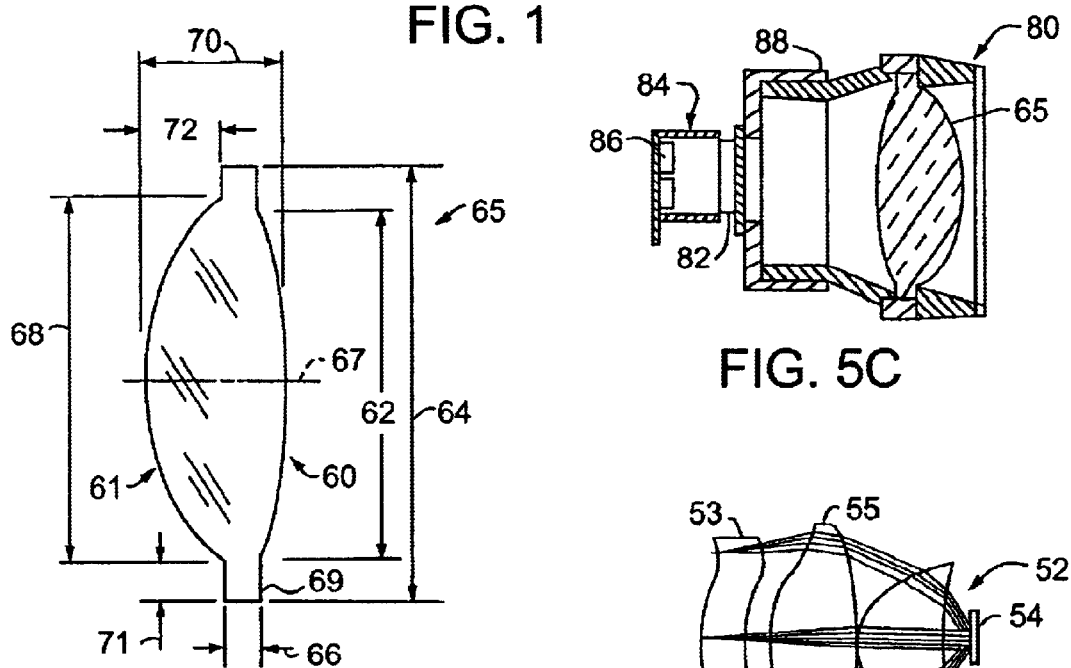
FIG. 5C
FIG. 5A
FIG. 5B
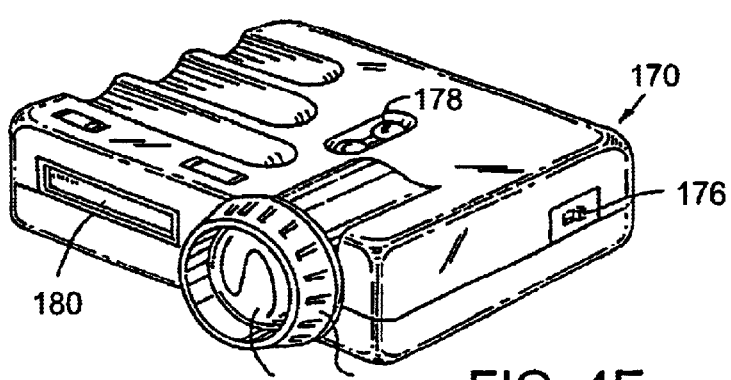
FIG. 4E

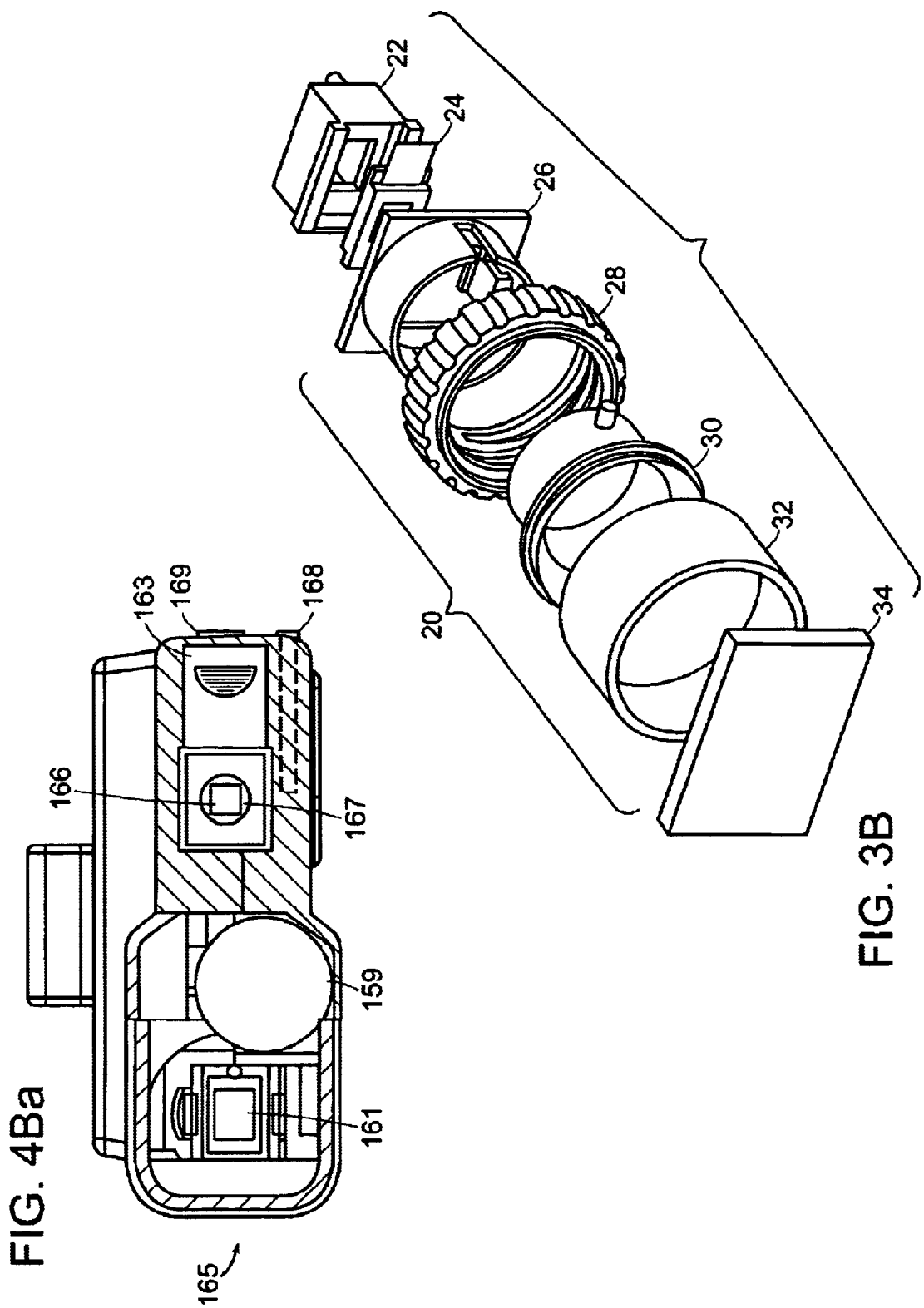

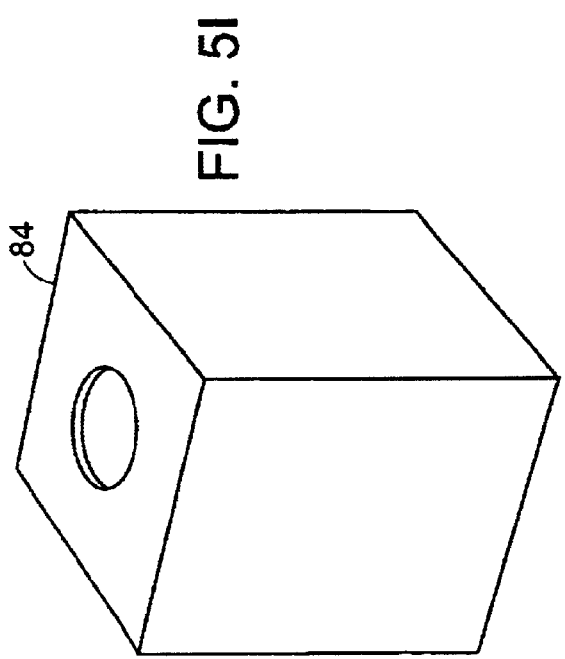
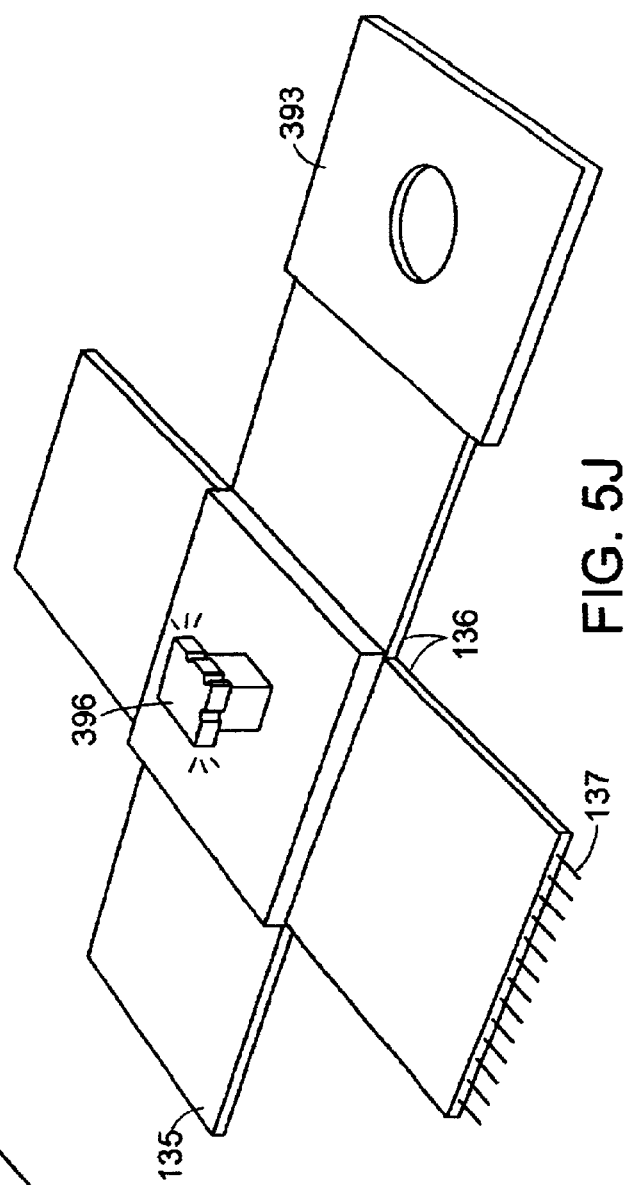

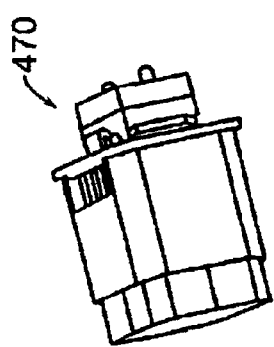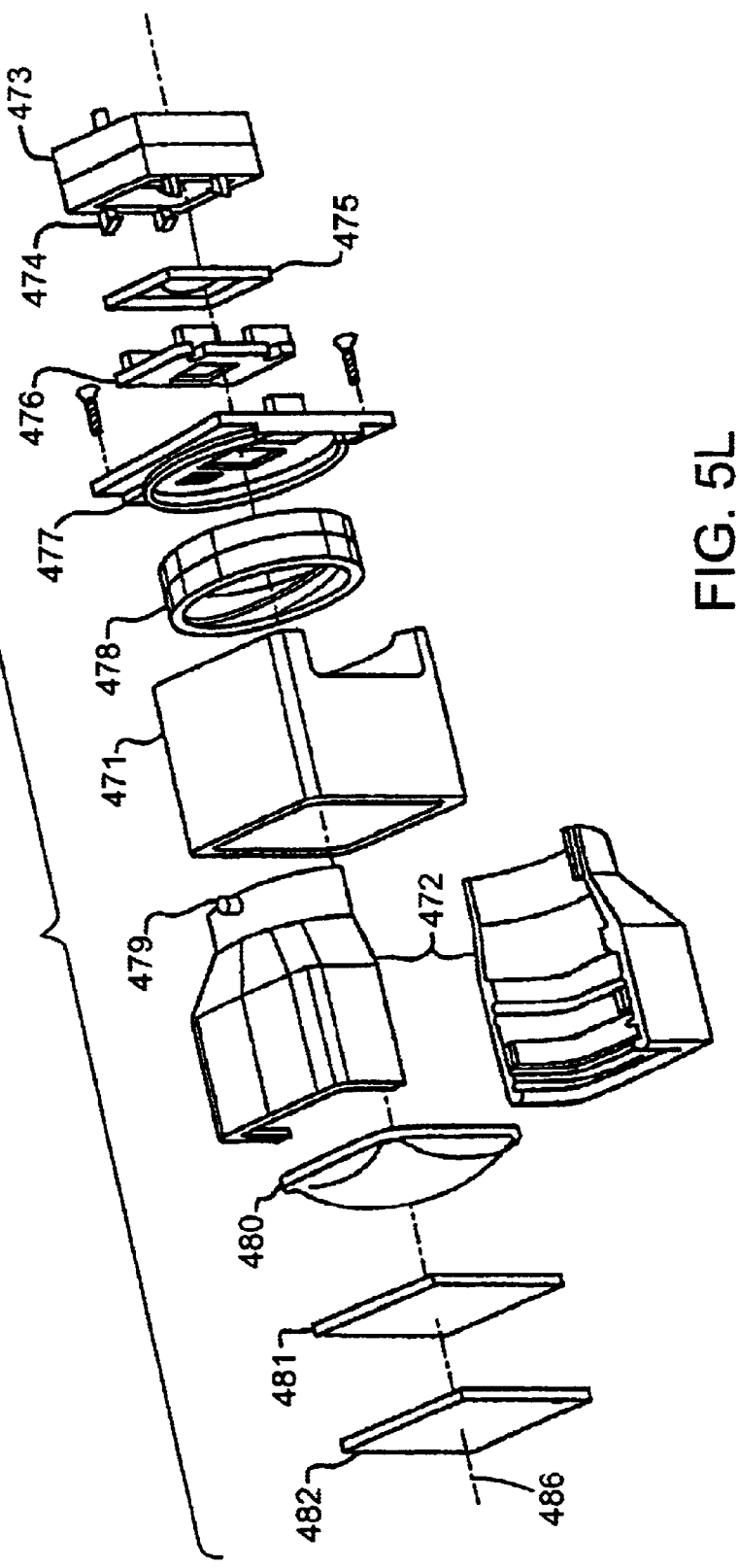

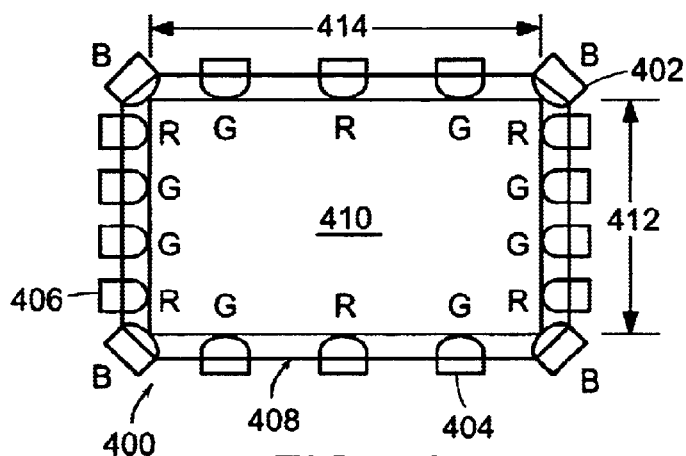
FIG. 7A
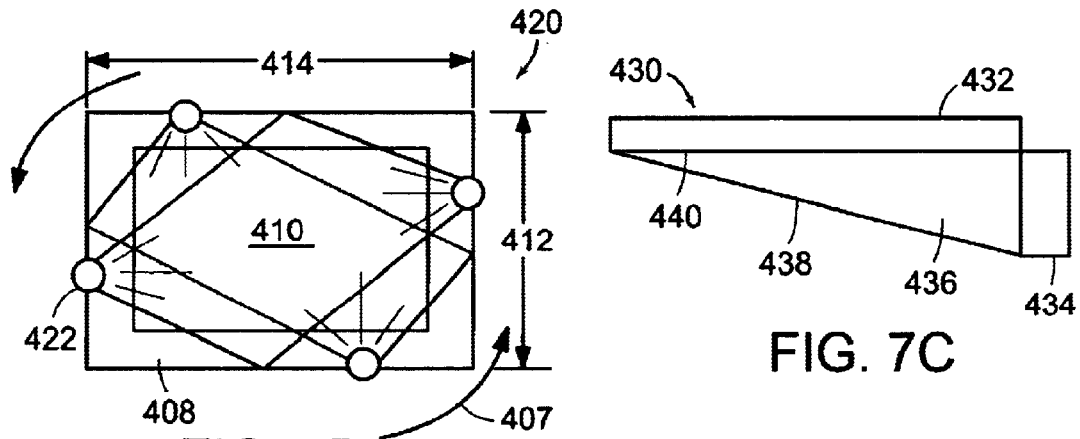
FIG. 7B
FIG. 7C
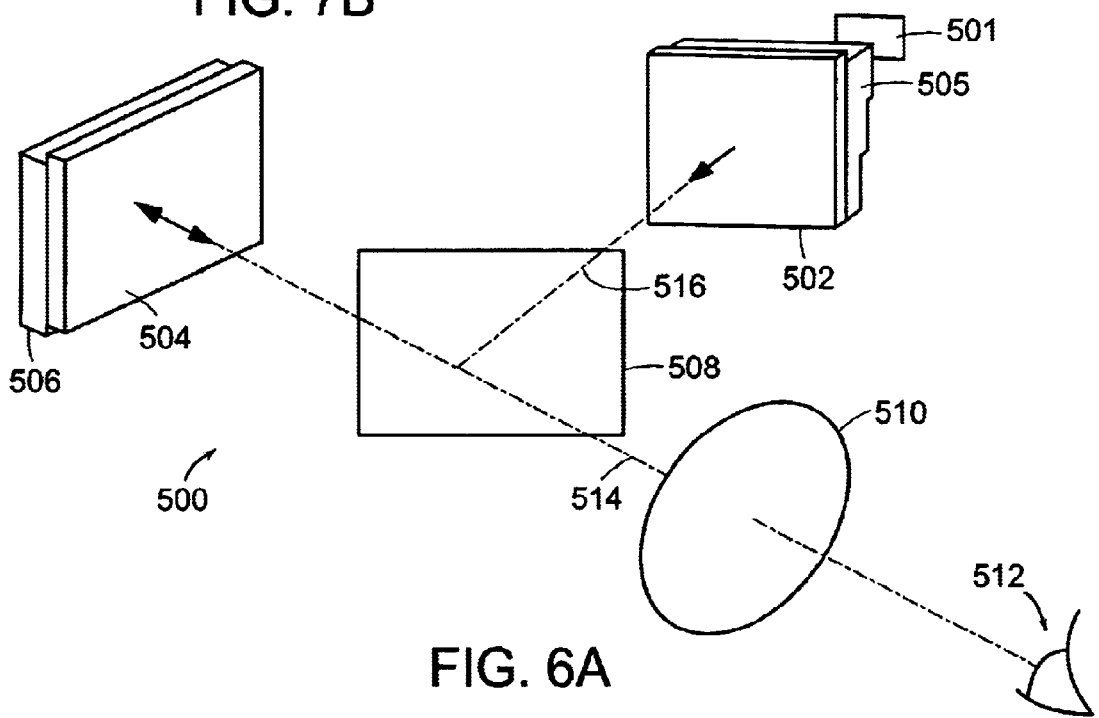
FIG. 6A

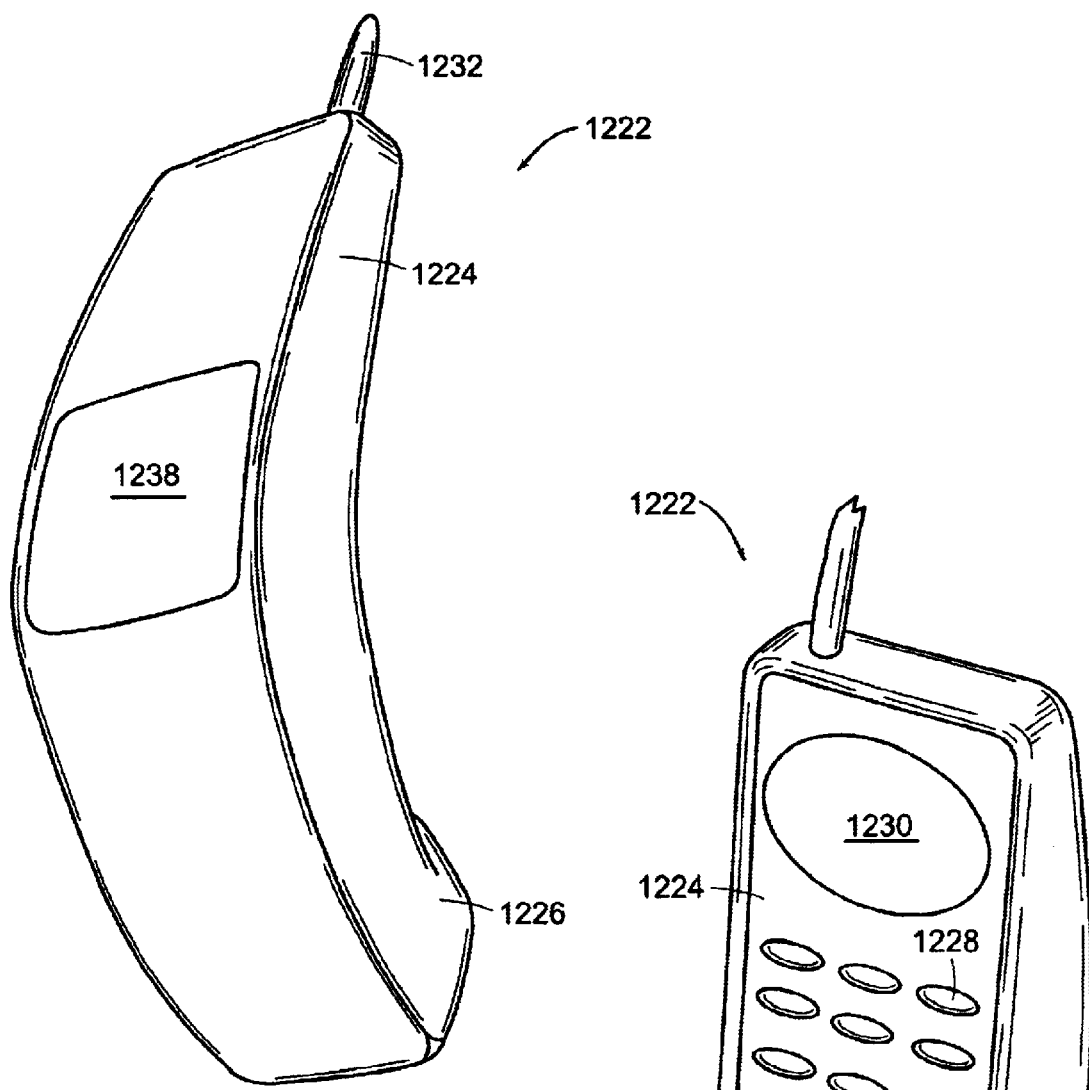
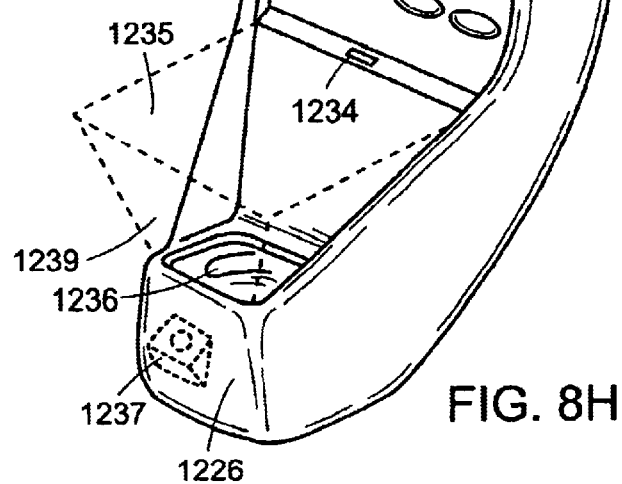
FIG. 8I
FIG. 8H

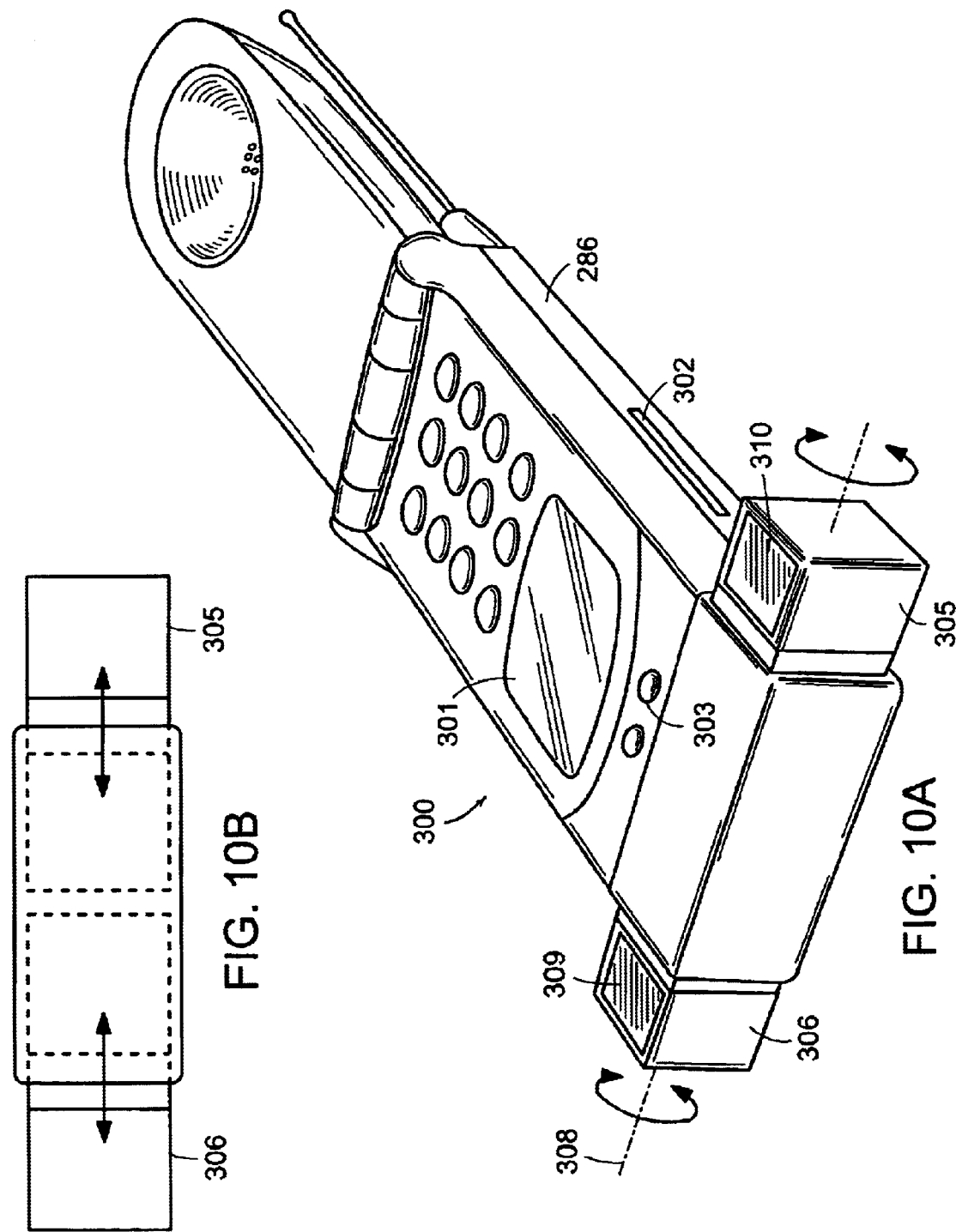

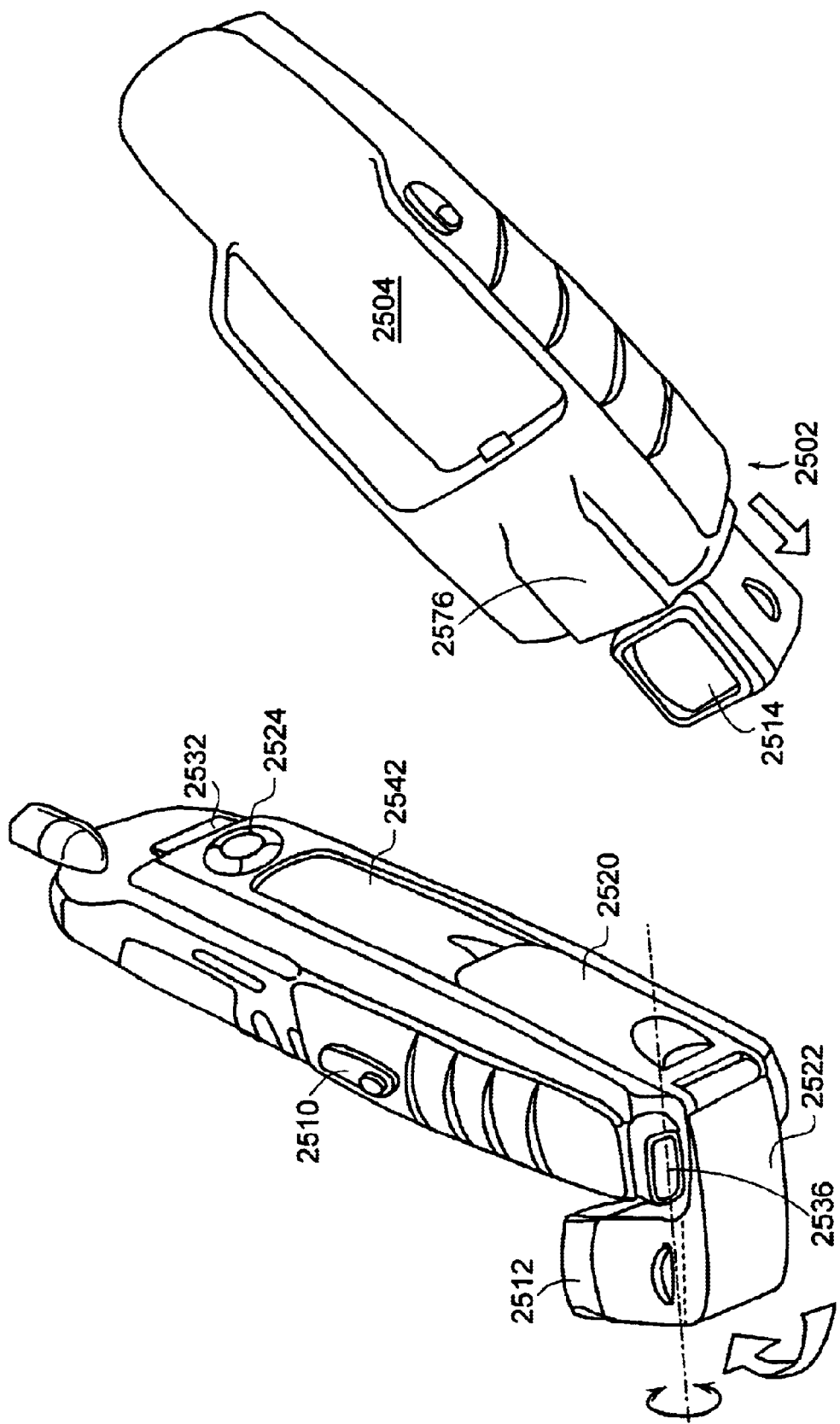

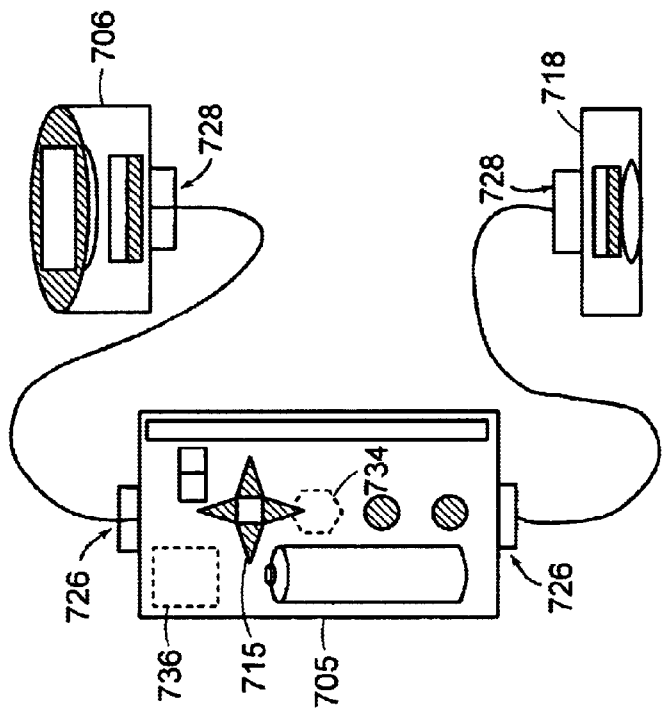
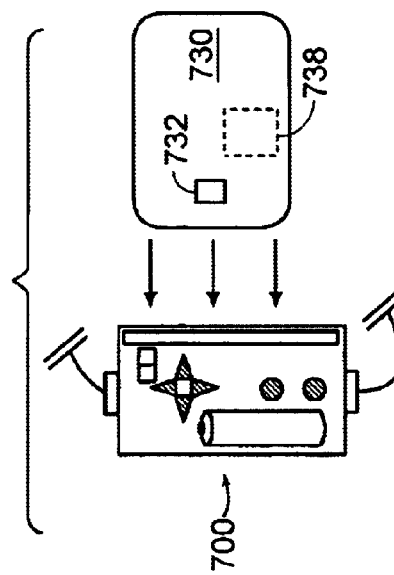
FIG. 17B
FIG. 17C
FIG. 17A

COLOR DISPLAY SYSTEM FOR A CAMERA

RELATED APPLICATIONS

This is a continuation-in-part application of U.S. Ser. No. 08/884,485 filed on Jun. 27, 1997 now U.S. Pat. No. 6,232,937 of Jacobsen, et al. which is a continuation-in-part application of U.S. Ser. No. 08/855,909 filed May 14, 1997, now U.S. Pat. No. 6,073,034 which is a continuation-in-part application of U.S. Ser. No. 08/853,630 filed on May 9, 1997 now U.S. Pat. No. 6,486,862 of Jacobsen, et. al. which is a continuation-in-part application of U.S. Ser. No. 08/838,420 filed on Apr. 7, 1997 of Jacobsen, et. al. which is a continuation-in-part application of U.S. Ser. No. 08/810,646 filed on Mar. 3, 1997, which is a Continuation-in-Part application of U.S. Ser. No. 08/766,607 filed on Dec. 13, 1996 which is a continuation-in-part application of U.S. Ser. No. 08/741,671 filed on Oct. 31, 1996, the entire contents of the above applications being incorporated herein by reference.

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for high performance displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In order to reduce flicker it is desirable to drive the active matrix at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as, the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays is significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, the microdisplay, because of its small size and weight, can be used as a hand-held communication system such as a pager, a wireless mobile telephone, or alternatively, as a head-mounted display, video camcorder, digital camera or a card reader display system. The display can provide a visual display suitable for data, graphics or video and accommodate standard television or high definition television signals. The system can optionally include circuitry for cellular reception and transmission of facsimile communications, can be voice activated, can include a mouse operated function, provide Internet access, and can have a keyboard or touch pad for numeric or alphabetic entry. The system can have, such as in a card reader display system, a housing with a port or aperture to receive a card, and a card reader for reading information from the card and displaying the information on the microdisplay.

The telephone or hand-held unit can be equipped with a camera or solid state imaging sensor so that images can be generated and transmitted to a remote location and/or viewed on the display. Also the telephone user can call to access a particular computer at a remote location, present the computer screen on the microdisplay, access specific files in the computer memory and download data from the file into a memory within the telephone or a modular memory and display unit connected to the telephone. The telephone can be connected to a local computer or display and the data from the file can be loaded into the local memory.

The video camcorder or digital camera has a microdisplay for a viewfinder. Either an image as seen through the lens or as previously recorded can be seen through the viewfinder, depending on what is selected.

In a preferred embodiment of the invention, a light emitting diode (LED) device is used to illuminate the display. For transmission displays the LED device operates as a backlight and can include a diffuser. An LED device can also be used as a light source for a reflective display in another preferred embodiment of the invention. The displays are preferably liquid crystal displays using a twisted nematic liquid crystal material. Consequently, controlling the time domain is not necessary to obtain grey scale.

For the purposes of this application, a microdisplay is defined as a display having at least 75,000 pixel electrodes and an active area of less than 160 mm$^2$, where the active area of the display is the area of the active matrix circuit that generates an image, including all of the pixel electrodes but not including the driver electronics and the border area for bonding and sealing of the liquid crystal display. For example, the array can be at least 320×240, 640×480 or higher. A preferred embodiment of the microdisplay has an active area of 100 mm$^2$ or less, and is preferably in the range between 5 mm$^2$ and 80 mm$^2$. The pixel pitch for these displays is in the range of 5–30 microns and preferably in the range between 5 and 18 microns. By utilizing pixel pitches of less than 18 microns smaller high resolution displays are now possible. For an embodiment utilizing a high definition format such as 1280×1024, and utilizing a pixel pitch of 12 microns or less, the active area of the display is less than 200 mm$^2$.

For displays of this size and resolution to be read by a user at distances of less than 10 inches (25.4 cm) there are specific lighting and magnification requirements. For a 0.25 inch (6.35 mm) diagonal display, for example, the LED device preferably includes a plurality of LEDS coupled to a diffuser. The lens used to magnify the display image has a field of view in the range of 10–60 degrees, and preferably at least about 16 degrees–22 degrees, an ERD in the range of about 25 mm–100 mm and an object distance of between about 1.5 and 5 feet (152.4 cm). A color field sequentially operated LED backlight system can use a plurality of LEDS with a two or four sided reflector assembly to concentrate the light through the liquid crystal display. A preferred embodiment can use at least two LEDs, or as many as six or more of each color, to provide the desired brightness level. Alternatively the LEDs can be arranged around the periphery of a transmissive display and directed down into a conical reflector that directs the backlighting through the display in concentrated form.

The backlight, the display and the viewing lens can be aligned along a single axis within a small housing volume that is less than 20 cm$^3$, and preferably less than 12 cm$^3$. The system weighs less than 10 grams, preferably in the range between 5 and 8 grams. The system can be incorporated into battery operated personal communication devices without substantial alteration of their form factor and weight requirements.

While a transmissive microdisplay with a backlight is preferred, a reflective microdisplay can also be used. The light from the light source is directed onto the same side of the display that is viewed by the user. An optical system directs the reflected image from the pixel electrodes onto a line of sight of the user. Reflective displays can be used in connection with the portable communications and display systems described herein.

The display can be operated using a color sequential system as described in U.S. patent application Ser. No. 08/216,817, "Color Sequential Display Panels" filed on Mar. 23, 1994, which issued as U.S. Pat. No. 5,642,129, and of U.S. Pat. No. 5,673,059, the entire contents of these patents being incorporated herein by reference. These patents disclose an active matrix display in which the control electronics is integrated with the active matrix circuitry using single crystal silicon technology. The control electronics provides compressed video information to produce a color image for data, a still image or a video image such as a television image on the display. The use of LEDs to provide color sequential operation has a number of advantages. The system provides a lightweight, low-power light source that generates red, green and blue color components in sequence. The same control circuit operates the light source and the display to pulse the appropriate color elements for each corresponding display image.

The light source can also be pulsed for monochrome display applications. The same circuit can be used for both color sequential and monochrome systems. For monochrome operation the light source need only be flashed momentarily to provide the desired brightness level By flashing the lamp briefly while a given frame is written on the display, the display power consumption can be substantially reduced, the voltage holding requirements of the display are reduced, and heat loading is reduced. The vertical synchronization signal can be used to trigger the light source pulse which need only extend for less than a third of the time needed to write a particular frame onto the display. Two flashes in a frame can also be used to reduce flicker.

The microdisplays described herein can be used in head mounted displays, cameras, card readers and portable communications systems, including color sequential systems as described in greater detail in U.S. application Ser. No. 08/410,124 filed on Mar. 23, 1995, the entire contents of which is incorporated herein by reference. Further details regarding the drive electronics suitable for a microdisplay can be found in U.S. Ser. No. 08/106,416 filed on Aug. 13, 1993, the entire contents of which is incorporated herein by reference. A preferred embodiment of the display control circuit utilizes an "under scanning" feature in which selected pixels are rapidly turned on and off to enhance edge definition and emulate a higher resolution display. The display control circuit can also utilize a panning capability so that a small portion of a displayed image can be selected, by mouse operation for example, and presented using the entire microdisplay image area thereby allowing the user to perceive smaller displayed features. This can also be used to view selected portions of a high resolution image, such as a portion of a 640×480 image on a 320×240 microdisplay.

As is readily apparent from the various embodiments described, one of the benefits of the microdisplay is the portability of the device using the microdisplay. An inherent concern with portability is providing enough power to operate the device for extended periods. One of the features of a preferred embodiment is the alternating of the voltage on the counterelectrode, therein allowing the microdisplay to operate at a lower voltage and therefore at a reduced power level. Another feature of a preferred embodiment is stopping the clock to the display when the display is not being written to, therein reducing power consumption.

When the display is used to display text, wherein the image display is not constantly changing, a feature of the preferred embodiment is to reduce the frame rate, or refresh rate. The reduction in frame rate results in a decrease in power consumption.

An additional problem with portability is the increased likelihood that the device will be used in non-ideal conditions. One such variable is the temperature in which the device will operate as temperature affects the performance of liquid crystal material. One of the features of a preferred embodiment is the monitoring of the temperature of the liquid crystal and the integral heating of the device.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIG. 2I illustrates an alternative timing diagram for the display control circuit illustrated in 2F.

FIGS. 3A and 3B are exploded views of a video display device and pager in accordance with a preferred embodiment of the invention.

FIGS. 4A–4K are exterior views of hand-held imaging devices in accordance with the invention.

FIG. 4Ba is a partial cross section rear view of a preferred embodiment of a pager with integrated camera in accordance with the invention.

FIG. 5A is a side view of a lens suitable for magnifying a microdisplay in accordance with the invention.

FIG. 5B is a side view of a multi element lens providing an increased field of view.

FIG. 5C is a cross-sectional view of a display assembly with a fixed lens.

FIGS. 5E–5P illustrate additional preferred embodiments of a backlighting system in accordance with the invention.

FIG. 6A is an optical diagram of a lighting system for a reflective liquid crystal display.

FIGS. 7A–7G illustrate preferred LED backlighting systems for a transmission type display.

FIGS. 8H–8I illustrate an alternative embodiment of a mobile telephone having a display device in accordance with the invention.

FIGS. 10A and 10B illustrate another preferred embodiment of a telephone microdisplay system.

FIGS. 13O–13S illustrate other preferred embodiments of the invention including a display docking system for a cellular telephone.

FIG. 13U illustrates another preferred embodiment of the docking station shown in FIGS. 13Q–13S.

FIGS. 17A–17C illustrate the use of a microdisplay in a card reader system in accordance with another preferred embodiment of the invention.

DETAILED DESCRIPTION OF THE INVENTION

High Resolution Active Matrix Microdisplay

Figure 19A:
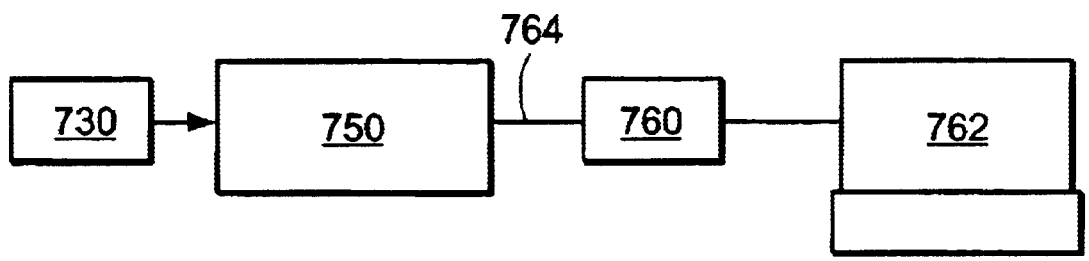
FIG. 19A illustrates another preferred embodiment of a card reader system.

A preferred embodiment of the invention utilizes a process of making a plurality of flat panel displays 10 in which a large number of active matrix arrays 14 are fabricated on a single wafer 12 as illustrated in connection with FIG. 1. The number of displays fabricated on a single wafer depends upon the size of the wafer and the size of each display. A preferred embodiment of the invention, for example, uses a high resolution display having an imaging area of the display with a diagonal of 0.5 inches (12.7 mm) or less. For a four inch wafer, forty separate displays can be fabricated on a single four inch wafer. Where each display has a diagonal of about 0.25 inches (6.35 mm), 80 displays can be fabricated on a single wafer, over 120 displays can be fabricated on a five inch wafer, over 180 displays on a six inch wafer, and 400 displays can be fabricated on an 8 inch wafer.

By fabricating a large number of small high resolution displays on a single wafer the manufacturing yield can be substantially increased and the cost per display can be substantially reduced.

To obtain monochrome resolutions of at least 75,000 pixels (e.g. a 320×240 array) suitable for displaying an NTSC television signal on a 0.25 inch diagonal display the pixel electrodes are preferably on the order of about 15 microns in width or less. To obtain a monochrome resolution of at least 300,000 pixels (e.g. 640×480 array) on a 0.25 inch diagonal display the pixel electrodes preferably have a width of about 8–10 microns.

These small high resolution displays require magnification such that when held in a user's hand within the range of 0.5 inches to 10 inches of the user's eye, a clear image is provided.

Figure 19B:
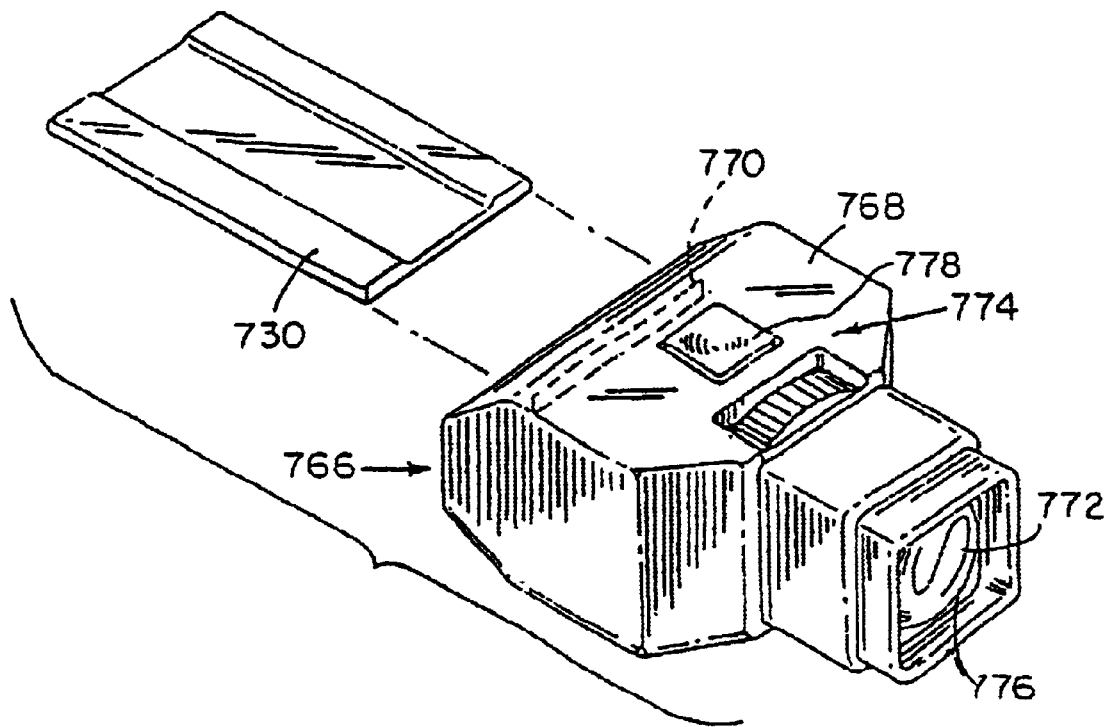
FIG. 19B shows another preferred embodiment of a card reader system.
Figure 19C:
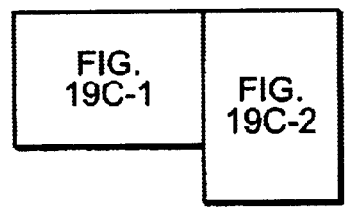
FIG. 19C, consisting of FIGS. 19C-1 and 19C-2, is a schematic circuit diagram of a memory card for a card reader or imager.
Figures 1, 19C:
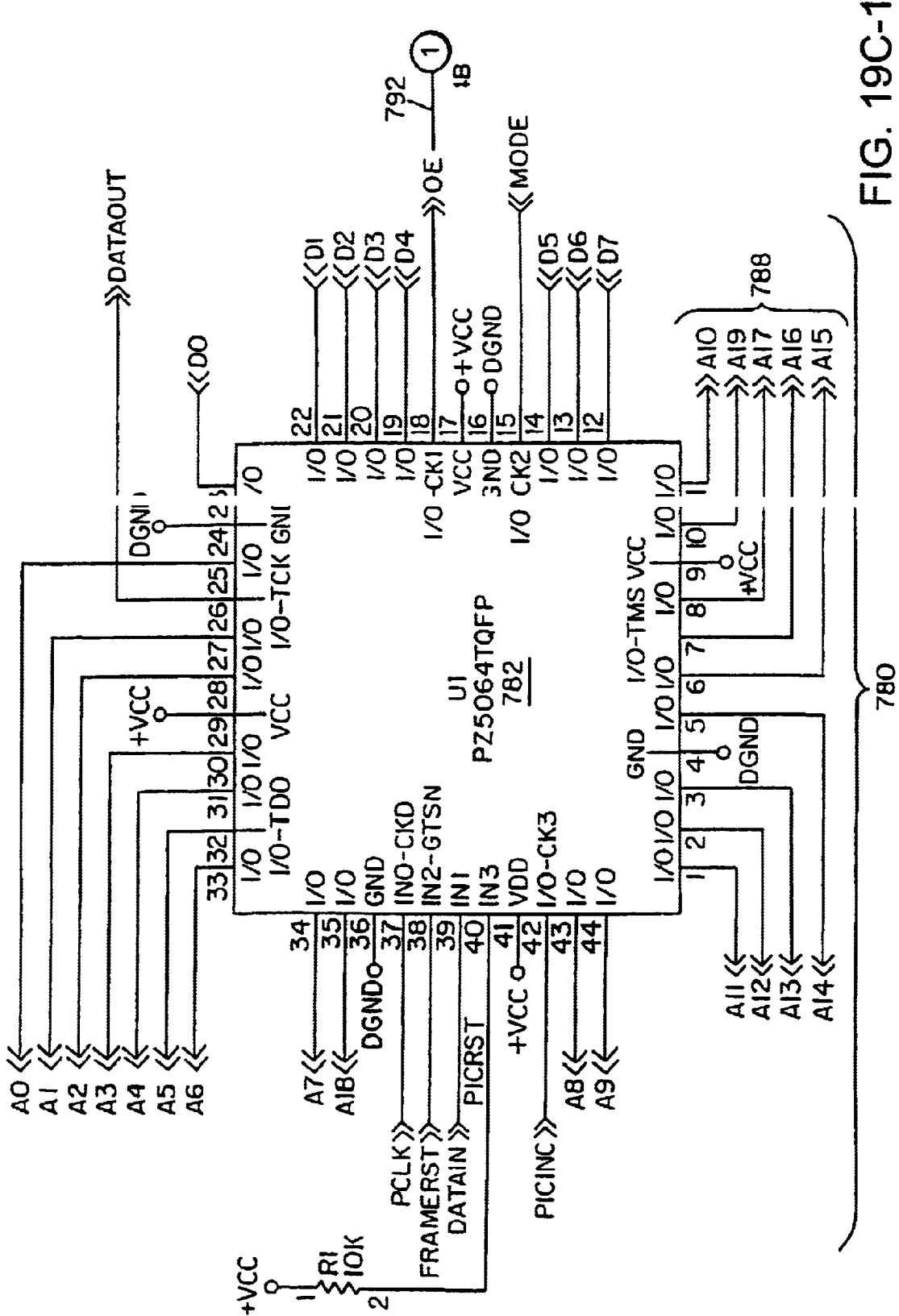
FIG. 1 is a perspective view of a single wafer having a plurality of display devices formed thereon in accordance with the invention.
Figures 2, 19C:
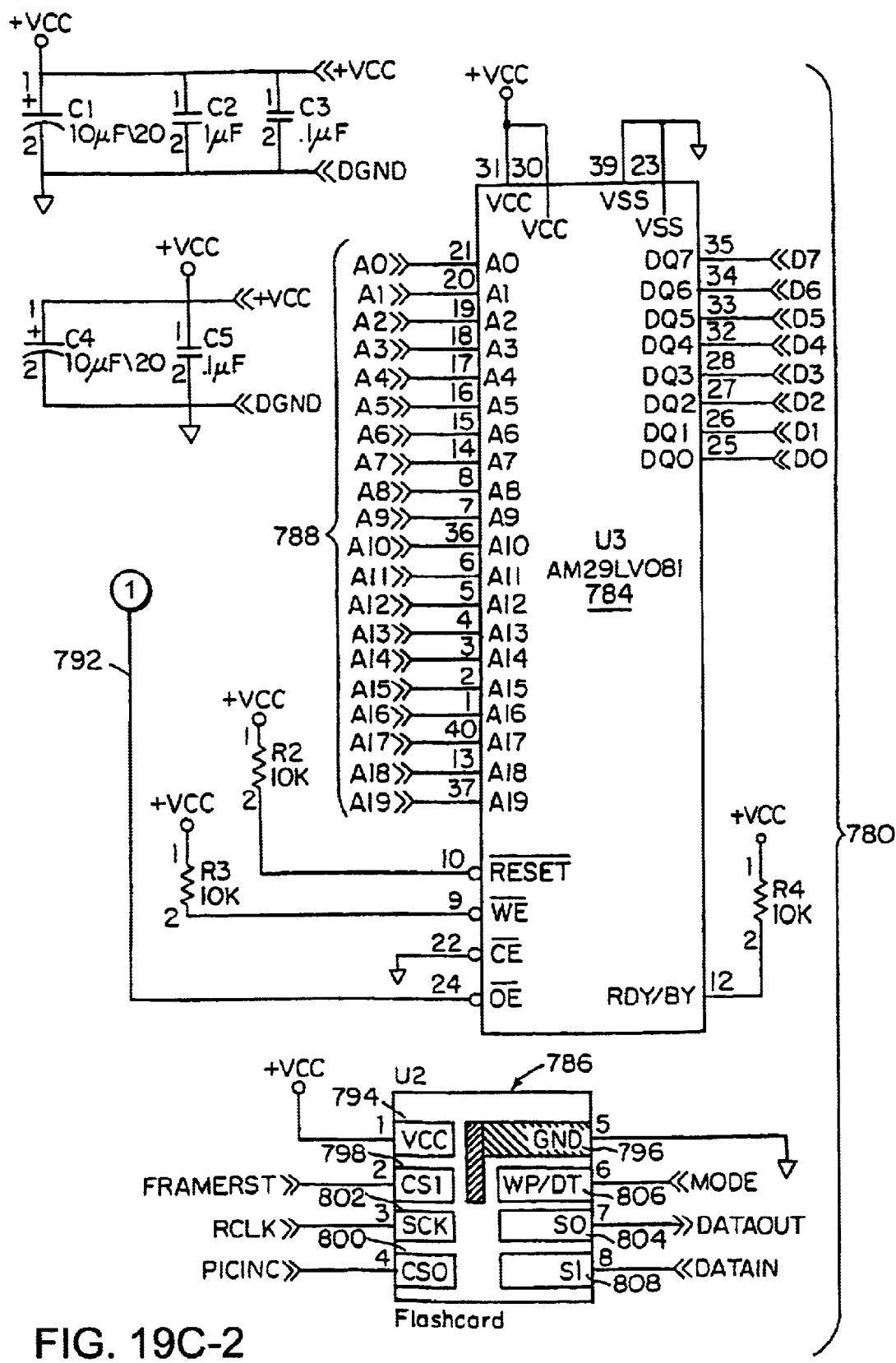

Referring now to FIG. 2, an integrated circuit active matrix display die is shown schematically which has been diced from a single wafer along with selected number of replicated circuits. Incorporated into the circuit 100 are scanner circuits 42a, 42b, 42c, 42d, along with pixel driven circuits 44a, 44b, 44c, 44d, select scanner circuits 46a, 46b and a display matrix circuit 90.

Further details regarding the fabrication of each die on a wafer can use the methods described in U.S. Pat. No. 5,256,562, the contents of which incorporated herein its entirety by reference.

By fabricating a selected number of circuits 100 on a single wafer, the circuit yield from a single wafer is greatly enhanced at the expense of reduced display area. However, this area disadvantage is overcome by magnifying and projecting the display image as will be described herein.

A video signal bus 35-1 through 35-16 carries analog video signals from digital to analog amplifiers (not shown) to column drivers 44a–d. Because signal interference and signal loss can occur as the analog video signal cross each signal line in the signal bus 35, the channels of video signals are arranged to reduce interference. As illustrated, there are four column drivers 44a–44d, two column drivers 44a, 44b at the top of the active matrix circuit 90 and two column drivers 44c, 44d at the bottom of the active matrix circuit region 90. Each channel is allocated to one of the column drivers 44 such that each column driver 44 receives video from four channels. The top column drivers 44a, 44b receive video from the channels that drive the odd-numbered pixel columns and the bottom column drivers 44c, 44d receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention. For applications having resolutions of 320×240 or 640×480 it is desirable to use single column and row drivers to drive the display. For high speed, high definition displays more can be used to improve performance.

The data scanners 42a–d are responsive to a pixel data signal 142 and a pixel clock signal 143 from a control signal generator (not shown). The data scanners 42a–d can use a shift register array to store data for each scan. An odd shift register array can be used to store data to odd column pixels and an even shift register array can be used to store data to even column pixels. As illustrated, there are left and right odd data scanners 42a, 42b and left and right even data scanners 42c, 42d.

The column drivers 44 selected by the data scanner 42 transmit video data to a selected column of C pixels in the active matrix circuit 90. The select scanner 46 controlled by a control signal generator determines by control lines which pixels accept this column data.

To reduce signal loss across the active matrix region 90, the select lines are driven from both sides by select scanners 46a and b. As viewed in FIG. 2A, a left select scanner 46a and right select scanner 46b are connected to the select data line 146 and the select clock line 147. A third enabling line 148 can also be used for specific applications. The left select scanner 46a provides a select line signal at the end of the select line nearest the lowest-valued pixel column ($C_1$) and right select scanner 46b provides a select line signal at the end of the select line nearest the highest-valued pixel column ($C_N$). Thus, an identical select line signal is supplied at both ends of the select line.

Although static shift registers can be used, the shift registers of the data scanner 42 and the select scanners 46 are preferably implemented as dynamic shift registers. The dynamic shift registers rely on capacitor storage without leakage. However, dynamic shift registers are susceptible to leakage, especially when they are exposed to light. Hence, light shields are needed to protect the scanners 42a–42d, 46 from exposure to light. Similarly, light shields are also used to protect the transmission gates 44 and pixel columns $C_{1-C_N}$.

For further information regarding the input signals to the circuit 100, reference is made to the above-cited U.S. patents and applications.

Figure 2A:
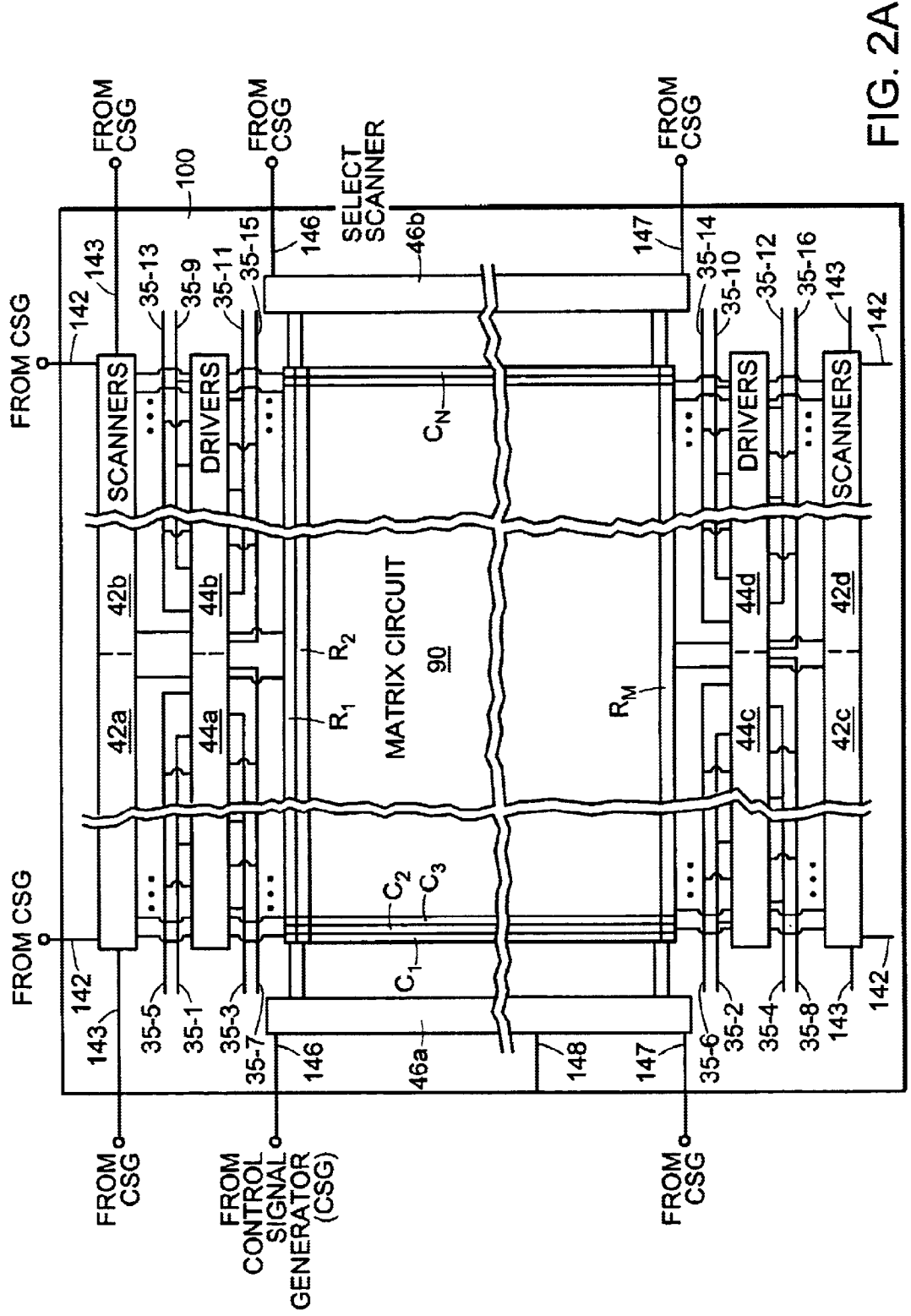
FIG. 2A is a schematic illustration of a die for an integrated active matrix panel display which includes optional control signal circuitry therein.

In a preferred embodiment of the invention, the panel drive circuitry of FIG. 2A is fabricated as an integrated circuit along with the active matrix circuit 90. The integrated circuitry is preferably fabricated in single crystal silicon having a silicon-on-insulator (SOI) structure using the fabrication and transfer procedures described previously in the aforementioned U.S. Pat. No. 5,256,562. By fabricating the row and column drive circuitry 42a–42d, 44a–44d, 46a, 46b as well as the scanners in single crystal material along with the active matrix circuit 90, the size of the display panel is not constrained by the connecting pins for the various discrete components. The integrated fabrication also increases the operating speed of the display relative to displays constructed from discrete components. Furthermore, the drive circuitry can be optimized to increase display performance. For example, it is easier to construct a small 1280H×1024V display panel with dual select scanners through integrated fabrication than it is using discrete components.

The pixel electrodes in a preferred embodiment are between 60 and 250 microns square. Consequently, a 1280H×1024V active matrix with the control system can be fabricated such that there are at least 40 such integrated circuits on a five inch wafer, for example.

Figure 2B:
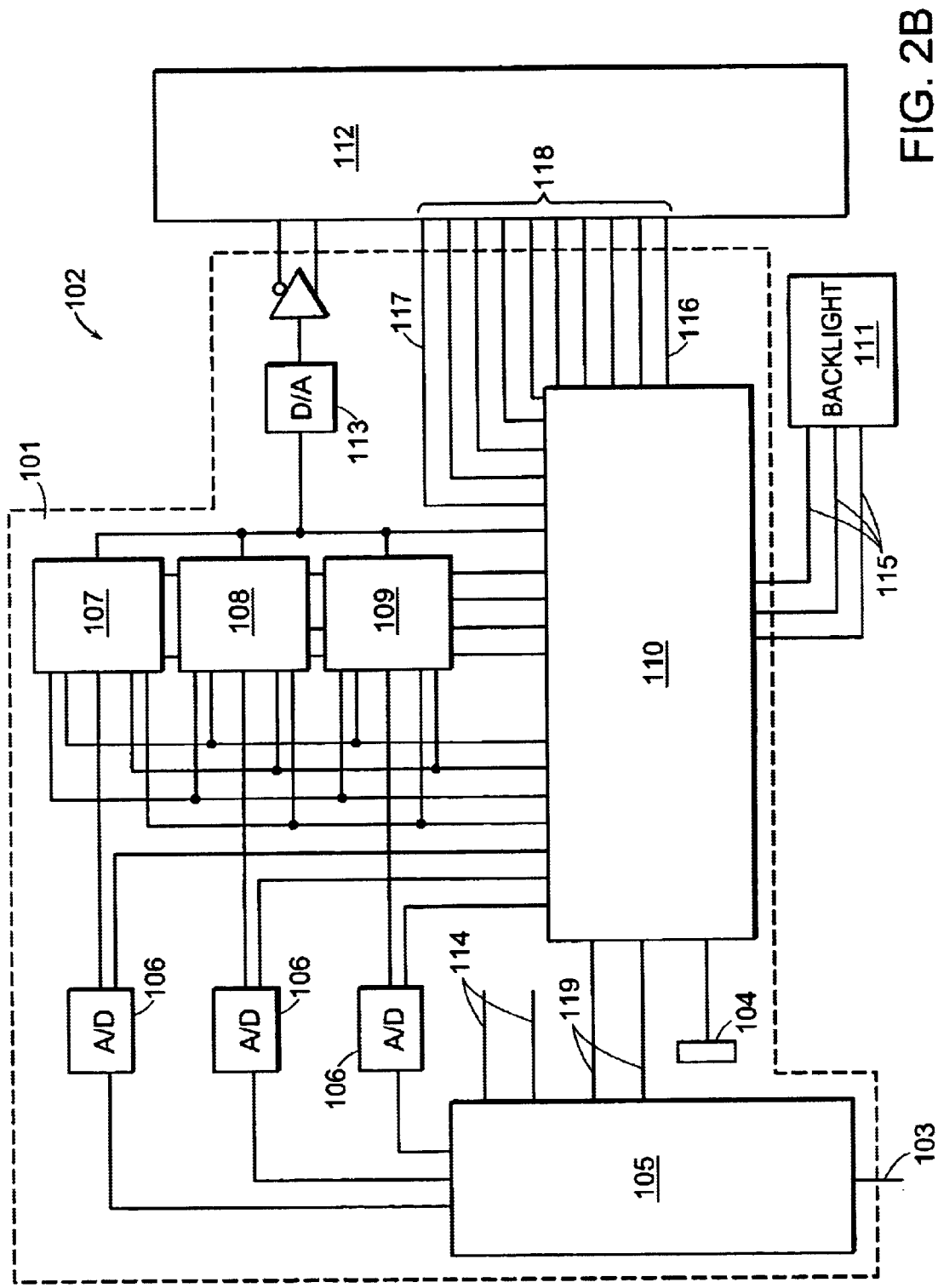
FIGS. 2B and 2C illustrate preferred embodiments of display control circuits in accordance with the invention.

A preferred embodiment of a display control circuit for a color sequential microdisplay is illustrated in connection with FIG. 2B. The display control circuit 102 receives an analog composite signal 103 such as a television or VCR video signal at converter 105. Converter 105 can be a commercially available chip, such as the Sony CXA1585, which separates the signal 103 into red, green and blue components. The three analog color components are converted into digital signals by three respective analog to digital (A/D) converters 106. The three color digital signals are stored in red 107, green 108, and blue 109 memory circuits. Circuits 107, 108 and 109 can be RAM, such as DRAM, frame buffers that are connected to the timing circuit 110. Timing circuit 110 can be connected to the converter 105 by an interface bus and receives horizontal and vertical synchronization signals along lines 119 from converter 105. Circuit 110 controls the sequential flow of each color frame onto the display by sending video data from each memory 107, 108, 109 onto the display and coordinating actuation of the backlight 111 along lines 115 for each primary color. Lines 114 provide control of hue and contrast of the resulting image. Lines 116, 117 and 118 are used to control the row and column driver circuits within display circuit 112. Lines 116 and 117 control horizontal shift and vertical shift of the data as it is read onto the display.

Lines 116 and 117 can be used to allow the user to invert (i.e. reverse left to right or right to left) the image on the display. This can be useful for the telephone user who may select one hand to hold the telephone during use and simply press a button on the housing so that the image is inverted for presentation to the eye of the user when electing to hold the telephone speaker in the other hand adjacent to the user's ear. The inverting of the image can be accomplished by several different techniques including by software and hardware methods. One such method is to use a bi-directional shift register and shift the direction of the register to invert the image. Another technique is to change the method by which the data is pulled out of memory using the software.

Lines 118 control vertical and horizontal pulse, vertical and horizontal clock, even and odd row enable signals and the horizontal multiplying pulse signal. Digital to analog converters 113, memories 107, 108, 109, converter 105 and control circuit 110 can be mounted on a common circuit board with display 112, or they can be split onto separate circuit boards or integrated circuits within the telephone housing, the pager housing, the docking element housing, or other housing described in greater detail below depending on the geometry and operational requirements of the specific embodiment. In addition to placing the digital to analog converters, memories, converter and control circuit 110 on a common circuit board, they can be all located on a single monolithic integrated circuit (IC), represented by a dash line 101. The placing of a components on a single IC reduces the internal capacitance and therefore the power consumption of the circuit.

Figure 2C:
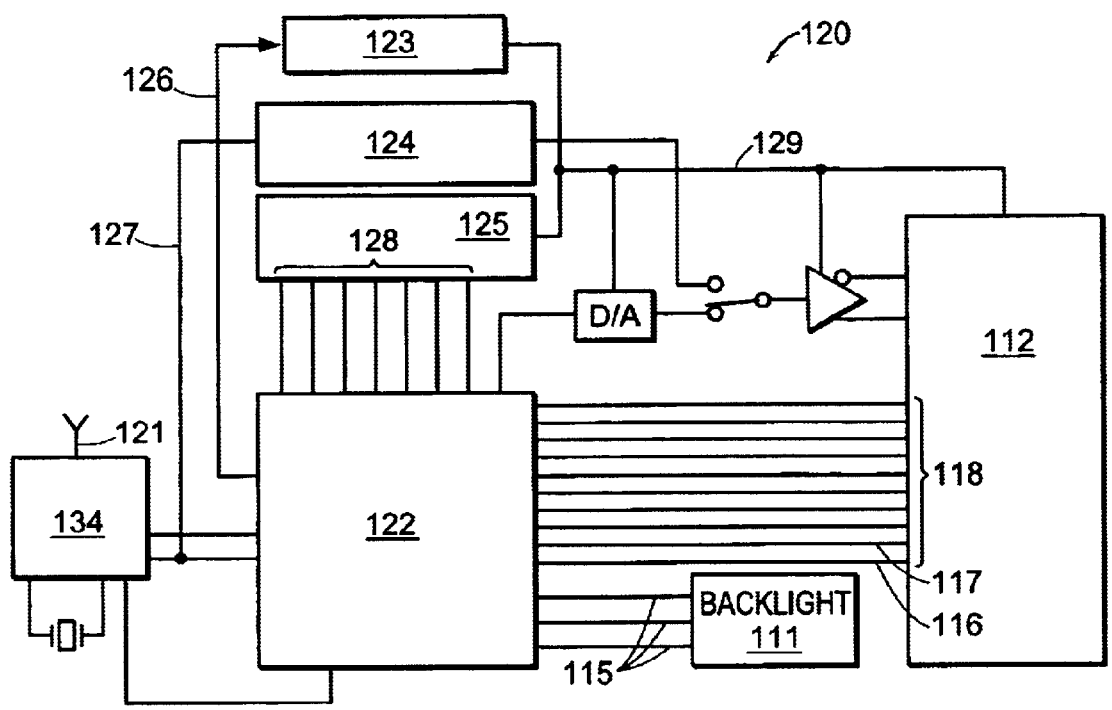

Another preferred embodiment of a display control circuit is illustrated in connection with FIG. 2C. In this embodiment, a digital circuit 120 is used to control color sequential display operation. The processor 134 receives serial digital image data at 121 and sends display data to memory 124. An optional additional non-volatile, such as flash memory or SRAM circuit 125 can also be included to store graphics data where that is in addition to text stored at 124 using a serial bus 127. Timing control circuit 122 receives clock and digital control signals from processor 134 and transmits control signals to the backlight 111 and display 112 along lines 115, 116, 117, and 118, respectively. Lines 128 direct ready, reset, write enable, output enable, color enable, address and data signals to memory to control deliver of image frames to the display 112. This circuit can be used within a telephone housing or the docking element housing described in greater detail below depending on the geometry and operational requirements of the specific embodiment. A switch can be provided to allow the user to reverse the image on the display left to right or right to left. This can be useful for the telephone user who may select one hand to hold the telephone during use and simply press a button on the housing so that the image is inverted for presentation to the other eye of the user when electing to hold the telephone speaker in the other hand adjacent to the user's other ear.

Power management circuit 123 receives control signals along line 126 from circuit 122 to lower power consumption of the circuit 120. Circuit 123 is used to control power during display operation, and is connected to flash memory circuit 125, the digital to analog converter, the buffer/inverter and the display 112 by a line 129. This capability arises from the use of a transferred thin film active matrix circuit described previously which has an ability to store charge between vertical synchronization pulses. This storage capacity enables lower power consumption of the display and backlight at less than 0.2 Watts. Thus, after a frame of data is written on the display, power is lowered until the next frame is written. This lengthens battery cycle time of portable communication devices as described herein. The power can be lowered by periodically stopping the clock to the display as described below.

Figure 2D:
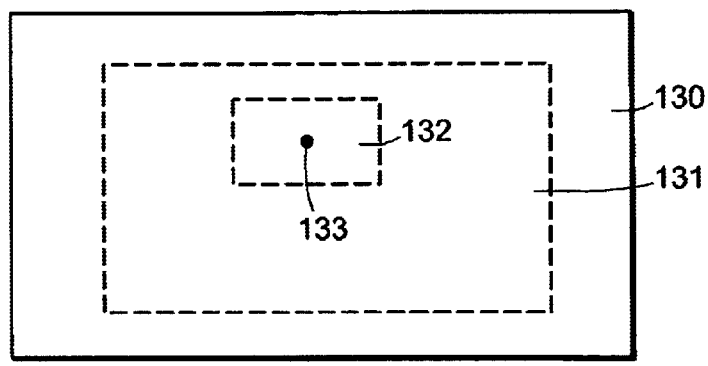
FIG. 2D illustrates a method for selectively displaying an image on a display in accordance with the invention.

FIG. 2D illustrates a method of displaying information on the display in which large amounts of information are contained in each image. For such high information images it may be desirable to enlarge a selectable portion of that image on the display. For example, the full image 130 has a region 131 in which a cursor 133 can be positioned. The user can position the cursor using a mouse or button control element anywhere within region 131 and identify a subregion 132. The user selects the image of subregion for display on the full display area.

If the data provided by the processor 134 is greater than that displayed on the display 112, the image can be written to the display by underscanning; e.g. only every fourth bit of display is written. In order to display the image of a subregion as the entire image, every bit of display is written, but only for that specific region. If the subregion 132 is to be displayed on the full display area, the data for the rows above subregion 132 are not forwarded to the display 112 by the timing control circuit 122, and only the columns that are included in subregion 132 are forwarded.

Figure 2E:
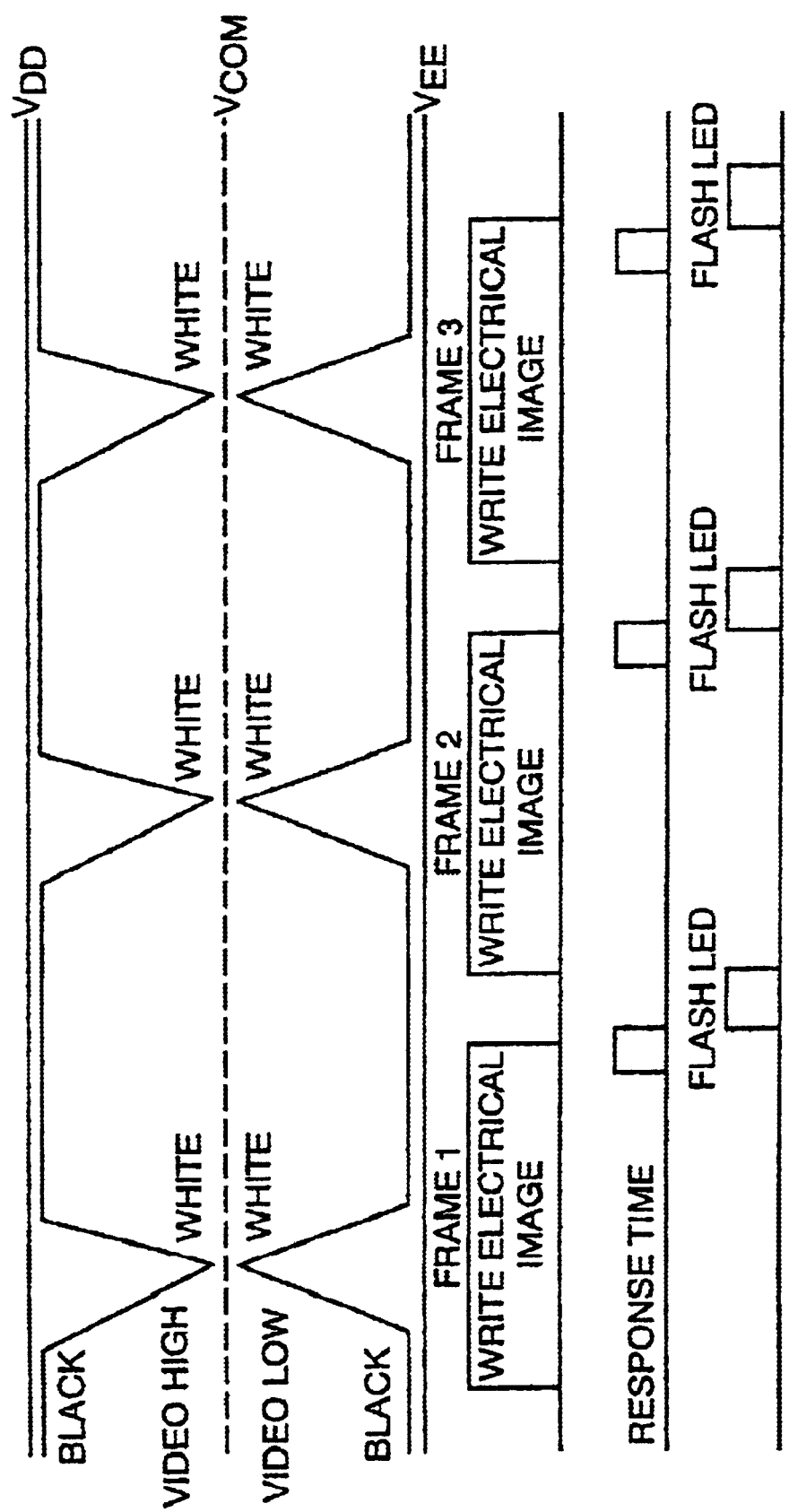
FIG. 2E illustrates a timing diagram for the display control circuit illustrated in FIG. 2D.

FIG. 2E illustrates a timing diagram that illustrates a preferred method of operating a microdisplay in accordance with the invention. The video signal is sent to the display 112 both as actual video and inverted video. The odd-numbered pixel columns receive video from the top column driver and the even-numbered columns receive video from the bottom column driver as described above with Reference to FIG. 2A. Referring to the embodiment of FIG. 2E, the odd-numbered pixels, which receive actual video, are driven between the common voltage ($V_{COM}$), the voltage applied to the counterelectrode, and the supply voltage source ($V_{DD}$). The even-numbered pixels, which receive the inverted video, are driven between $V_{COM}$ and the supply voltage sink ($V_{EE}$). After the entire frame is scanned into the display and there is a delay to allow the liquid crystal to twist, the backlight is flashed to present the image. In a preferred embodiment, $V_{DD}$ is 9 volts, $V_{EE}$ is 2 volts and $V_{COM}$ is 5.5 volts. The technique of alternating the video on each column is called column inversion and helps prevent a DC voltage from building up on the liquid crystal material and additionally prevents cross talk.

Another preferred embodiment of a display control circuit is illustrated in connection with FIG. 2F. In this embodiment, a digital circuit 1120 is used to control color sequential display operation as described in relation to FIG. 2C. Additionally, the circuit has the features of a modulating common voltage and a heater, as described below. The processor 1104 receives image data at 1121 and sends display data to memory 1124 and flash memory 1125 via the timing control circuit 1122. The image data can be in a variety of forms including serial or parallel digital data, analog RGB data, composite data or s-video. The processor 1104 is configured for the type of image data received, as is well known in the art. The timing control circuit 1122 receives clock and digital control signals from the processor 1104 and transmits control signals to the backlight 1111 along lines 1115. The timing control circuit 1122 transmits control signals, such as vertical start pulse, vertical clock, horizontal start pulse, and horizontal clock, to the display 1112 along lines 1116, 1117, and 1118. Lines 1128 direct ready, reset, write enable, output enable, color enable, address and data signals to memory to control delivery of image frames to the display 1112.

Still referring to FIG. 2F, the image data travels from the timing control circuit 1122 to the display 1112 through a digital to analog converter 1130 and through an inverter 1131 on an alternate frame dependent on a switch 1132 as described below. In addition and in contrast to previous embodiments, the common voltage ($V_{COM}$) enters the display 1112 at alternating values controlled by a switch 1133. The switches 1133 and 1132 for alternating the $V_{COM}$ and the video to the display are controlled by a frame control line 1134 from the timing control circuit 1122.

Figure 2F:
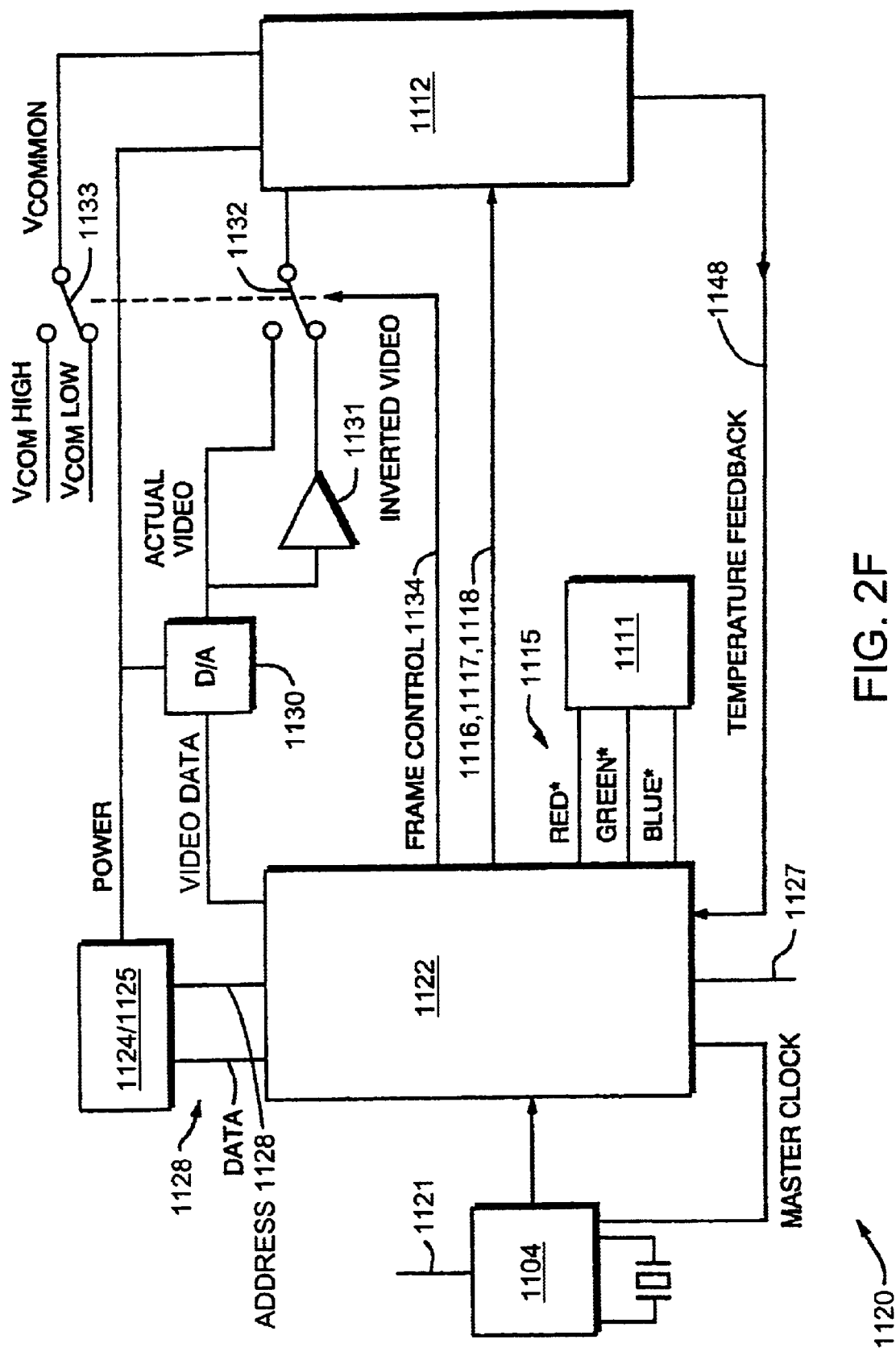
FIG. 2F illustrates an alternative preferred embodiment of the display control circuit in accordance with the invention.
Figure 2G:
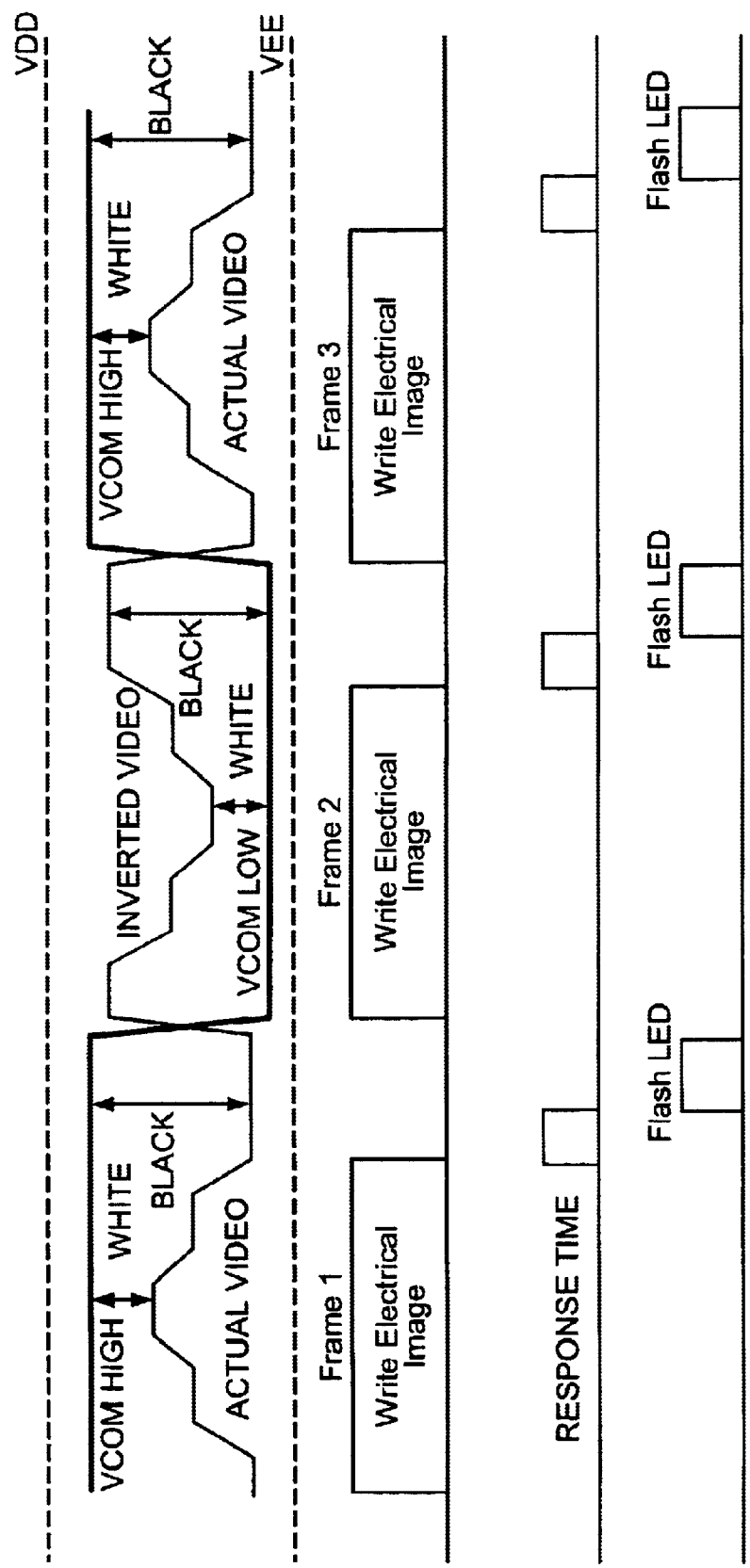
FIG. 2G illustrates a timing diagram for the display control circuit illustrated in FIG. 2F

Referring to FIGS. 2G and 2F, with the common voltage ($V_{COM}$) high, approximately 3–5 volts in a preferred embodiment, the actual video signal is scanned into the matrix circuit. After a delay to allow for the liquid crystal to twist to maximum position, the LED backlight 1111 is flashed to present the image. Prior to the next frame, frame 2 in FIG. 2G, $V_{COM}$ goes low, approximately zero (0) volts in a preferred embodiment. Driving $V_{COM}$ low erases the image that has just been scanned. However, since there is no backlight on, the loss of the image is not seen. With $V_{COM}$ low, the inverted video signal is scanned into the matrix circuit. Similarly, after a delay to allow the liquid crystal to twist, the LED backlight 1111 is flashed to present the refreshed or new image. Prior to the next frame, frame 3 in the Figure, $V_{COM}$ goes high. Driving $V_{COM}$ high results in the image that has just been scanned to be erased. With $V_{COM}$ high, an actual video signal is scanned into the matrix circuit. A delay occurs and then the LED backlight 1111 is flashed. The common voltage ($V_{COM}$) and the video keep on alternating. If the display is a color display, the LED backlight 1111 sequentially flashes the distinct colors. In addition, three screen scans, one for each color LED, comprises a frame and the $V_{COM}$ alternates each screen.

In a preferred embodiment, $V_{COM}$ fluctuates every 15–20 milliseconds. It takes 3–5 milliseconds to write/scan the image. The LED flashes for a time period of about 3 milliseconds. It is recognized that it may be desirable to vary the delay time before flashing the LED or varying the length of the LED flash dependent on the color LED to be flashed. For example, it may be desirable to have a longer delay time, response time, before flashing the LED when the LED to be flashed has a longer wavelength, such as red, which has a wavelength of between 630 and 700 nm.

With the video amplitude, the difference between $V_{DD}$ and $V_{EE}$, on the pixel's TFT reduced, a smaller storage capacitor is required. Less time is need to write with a smaller storage capacitor and therefore a smaller pixel TFT can be used. If the liquid crystal has a fast enough response, the storage capacitor can be eliminated and the capacitance of the liquid crystal becomes the storage capacitor. In addition, with no storage capacitor a larger aperture is possible. With larger aperture and increased aperture ratio, the image will be brighter for the same cycling of the backlight or the total power used can be reduced with the same image brightness.

Figure 2H:
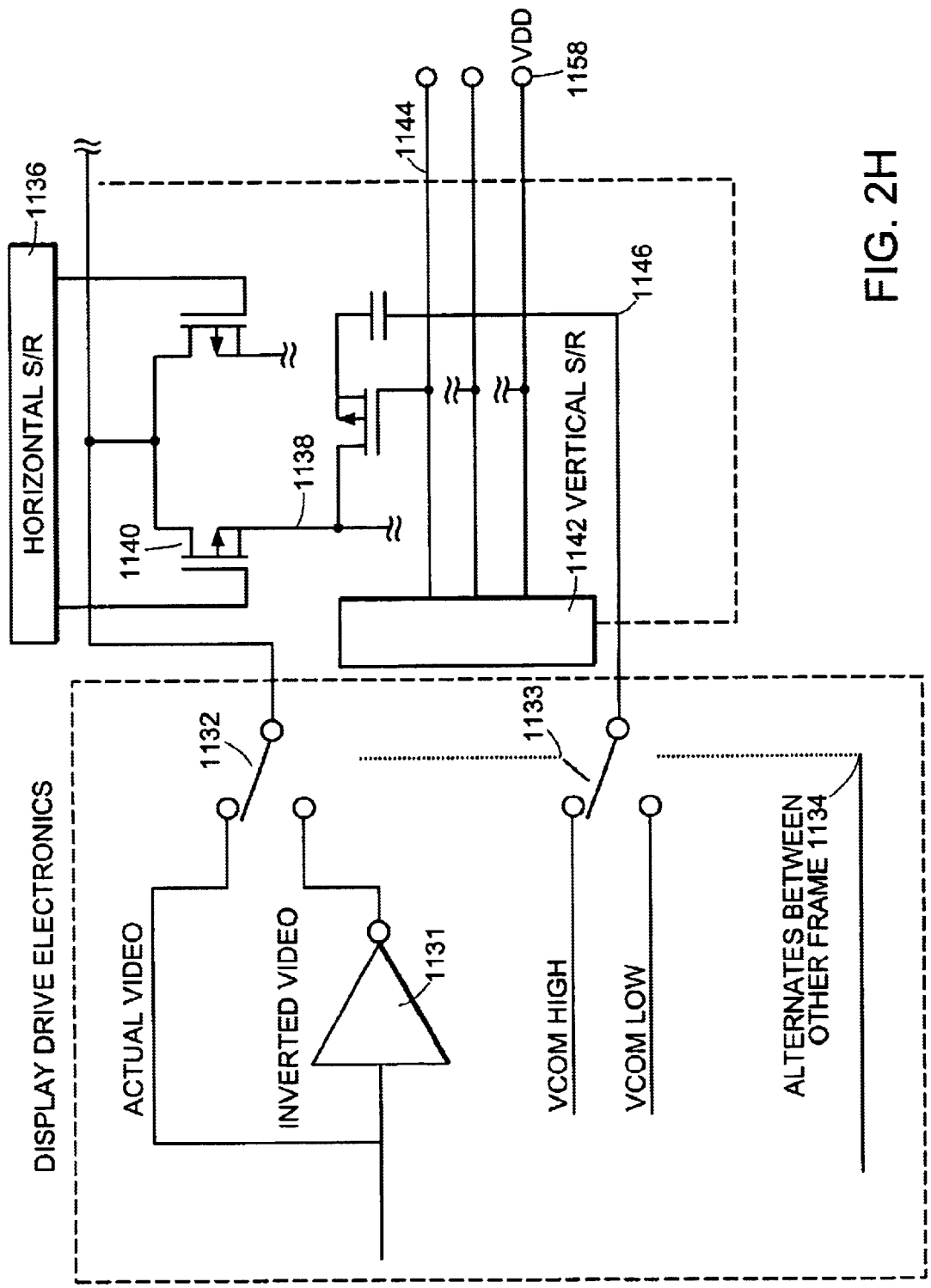
FIG. 2H illustrates a portion of the display control circuit shown in FIG. 2F.
Figure 21:
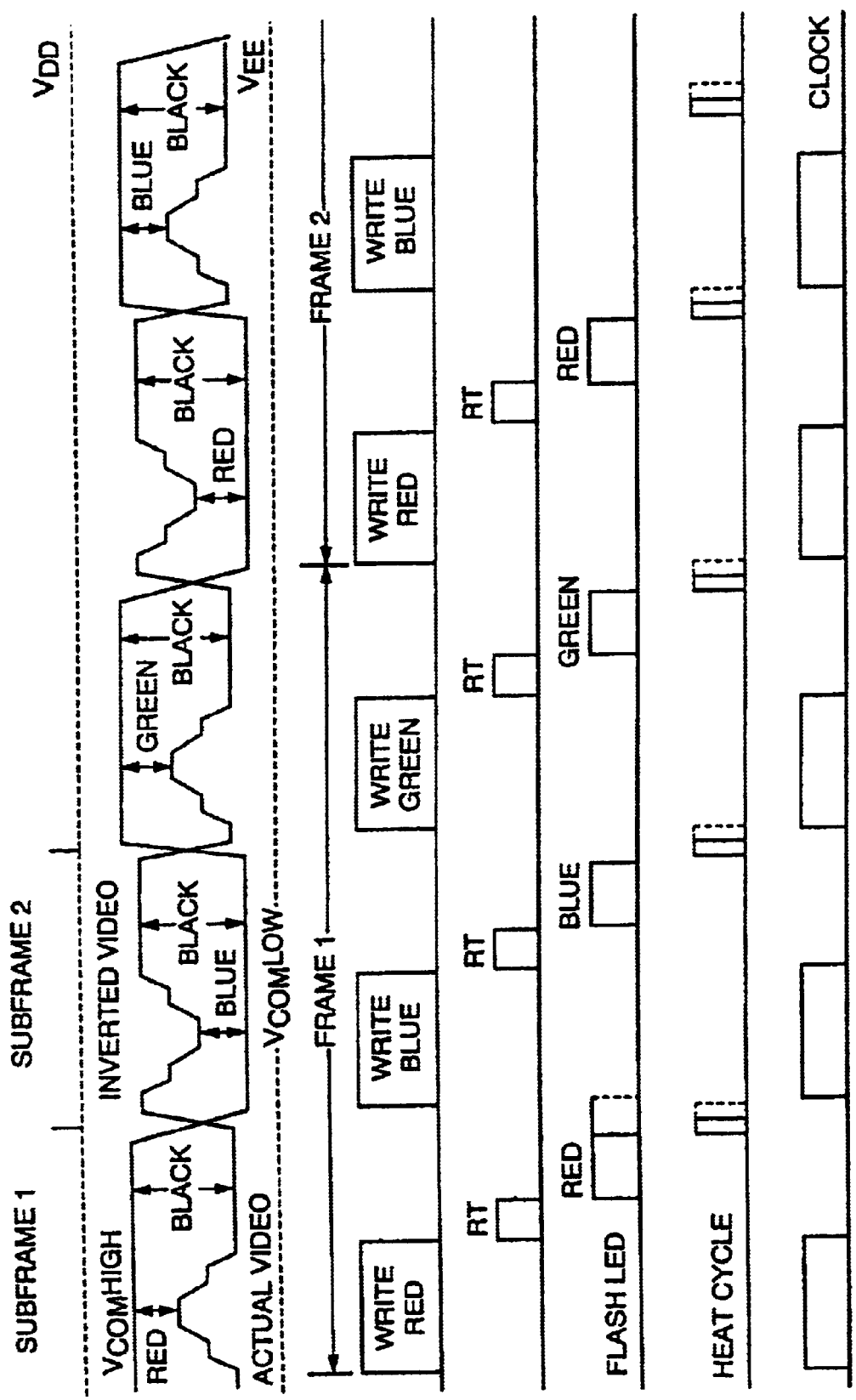

Referring to FIG. 2H, an enlarged schematic view of one pixel, the pixel is charged by the horizontal shift register 1136 selecting a column 1138 by turning a transmission gate 1140 and the vertical shift register 1142 selecting a row 1144. The video is written to the pixel and the liquid crystal begins to twist and become optically transmissive. After the entire display has been written and there has been a delay before the LED flashes, the $V_{COM}$ 1146, i.e., the voltage to the counterelectrode, is switched from high to low or vice versa by the frame control line. At the same time, the video signal is switched from actual video to inverted video or vice versa, so that the video will be switched for the next frame.

The liquid crystal can be twisted to become either optically transmissive or optically opaque. The orientation of the polarizers affect whether the liquid crystal is driven to white, transmissive, or to dark, opaque.

Referring back to FIG. 2F, the display circuit has an additional line, a temperature sensor line 1148, which runs from the display 1112 to the timing control circuit 1122. The active matrix comprises a plurality of pixels arranged in columns and rows. Heat is preferably absorbed substantially uniformly throughout the liquid crystal material. However, there may be local temperature variations due to the nature of the image being displayed as well as display and heater geometry and environmental conditions. Temperature sensors can be distributed throughout the active matrix region including around the perimeter of the active matrix including the corners and also disposed near the center of the active matrix. The use of a temperature sensor is described in U.S. patent application Ser. No. 08/364,070 filed Dec. 27, 1994 and is incorporated herein by reference.

The characteristics of the liquid crystal material is effected by the temperature of the liquid crystal. One such example is the twist time of twisted-nematic liquid crystal material, which is shorter when the liquid crystal material is warm. By knowing the temperature of the liquid crystal, the timing control circuit 1122 can set the duration and timing of the flash of the backlight 1111, therein achieving desired brightness and minimizing power consumption.

Another preferred embodiment of the display 1112 has an internal heater. Referring back to FIG. 2H, during normal operations, the vertical shift register 1142 has only one row on, so that as the horizontal shift register 1136 moves from column to column only one pixel is affected. After the last pixel on a row is addressed, the vertical shift register 1142 switches the active row. The display 1112 can be placed in a heat mode where each row 1144 is turned on and has a voltage drop across the row to create heat. In the embodiment shown in FIG. 2H, an end 1158 of each row line is connected to $V_{DD}$ and the end near the shift register is driven low thereby creating a voltage differential across each line. The heat is generated since $P=V^2/R$, where R is the resistance of the row lines. In normal operation, only the selected line which contains pixels to be driven low generate heat, not the entire display.

Referring to FIG. 2I, with the common voltage ($V_{COM}$) high, the actual video signal is scanned into the matrix circuit. After a delay to allow for the liquid crystal to twist into position, the LED backlight 1111 is flashed to present the image. Prior to the next screen or subframe, a heat cycle occurs where all the row lines are driven such that there is a voltage differential across the row. The heating can occur while $V_{COM}$ and the video are being alternated and inverted, respectively, by the frame control line 1131. FIG. 2I shows a heating cycle after each subframe, but the number and time period of heat cycles can be dependent on the temperature of the liquid crystal as determined by the temperature sensor 1132. In cold environments, the digital circuit 1120 can have a warm-up cycle where the heater is turned on prior to the first painting of the screen.

Still referring to FIG. 2I, driving $V_{COM}$ low erases the image that has just been scanned. However, since there is no backlight on, the erasure of the image is not seen. With $V_{COM}$ low, the inverted video signal is scanned into the matrix circuit. Similarly after a delay to allow the liquid crystal to twist, the LED backlight 1111 is flashed to present the refreshed or new image. Prior to the next screen, frame 1, subframe 3 in the Figure, $V_{COM}$ goes high. The driving $V_{COM}$ high results in the image that has just been scanned to be destroyed. With $V_{COM}$ high, an actual video signal is scanned into the matrix circuit. A delay occurs and then the LED backlight 1111 is flashed. The common voltage ($V_{COM}$) and the video keep on alternating.

The delay time before beginning the flash and the flash time are shown as identical in FIG. 2I. However, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point that the flash must be terminated, is dependent on when the liquid crystal associated with the first pixel to be written of the next frame has twisted sufficiently that light from the backlight is visible to the viewer. For example referring to FIG. 2I, it is not desirable for the red flash to be on, when the writing for the blue subframe has progressed to the point that the first pixel written for the blue subframe has resulted in the liquid crystal being optically transmissive for red wavelengths. The ending of the flash does not have to occur until sometime after the beginning of the writing of the next subframe because of response time of the liquid crystal.

The timing control circuit 1122, as seen in FIG. 2F, can vary the flash duration and the delay or response time dependent on the color that is to be flashed. In addition, the current to the backlights 1111 can be varied to adjust the intensity of the color. If desired, a color control line 1127 can be added to the timing control circuit 1122 to allow the user to vary the color.

It is recognized that the method of generating heat is different on different displays. For example, referring to FIG. 2A in which a select scanner 46a and 46b is located on both sides of the display and is connected to each end of the row, in typical operations either both ends are high or both ends are low depending on whether the row is being addressed. In order to heat the display, one of the select scanners, for example 46a, can be driven high for all the rows, and the other select scanner, for example 46b, is driven low for all rows therein creating a voltage difference across the row lines.

The clock timing sent to the display 1112 is shown in FIG. 2I. The clock timing is needed by the display 1112 only when writing to the pixels. The capacitance of the storage capacitor holds the liquid crystal in the proper position during the time the backlight 1111 is flashing. By periodically sending clock signals to the display 1112 for typically as much as fifty percent (50%) of the total time or less results in a power reduction.

Figure 2J:
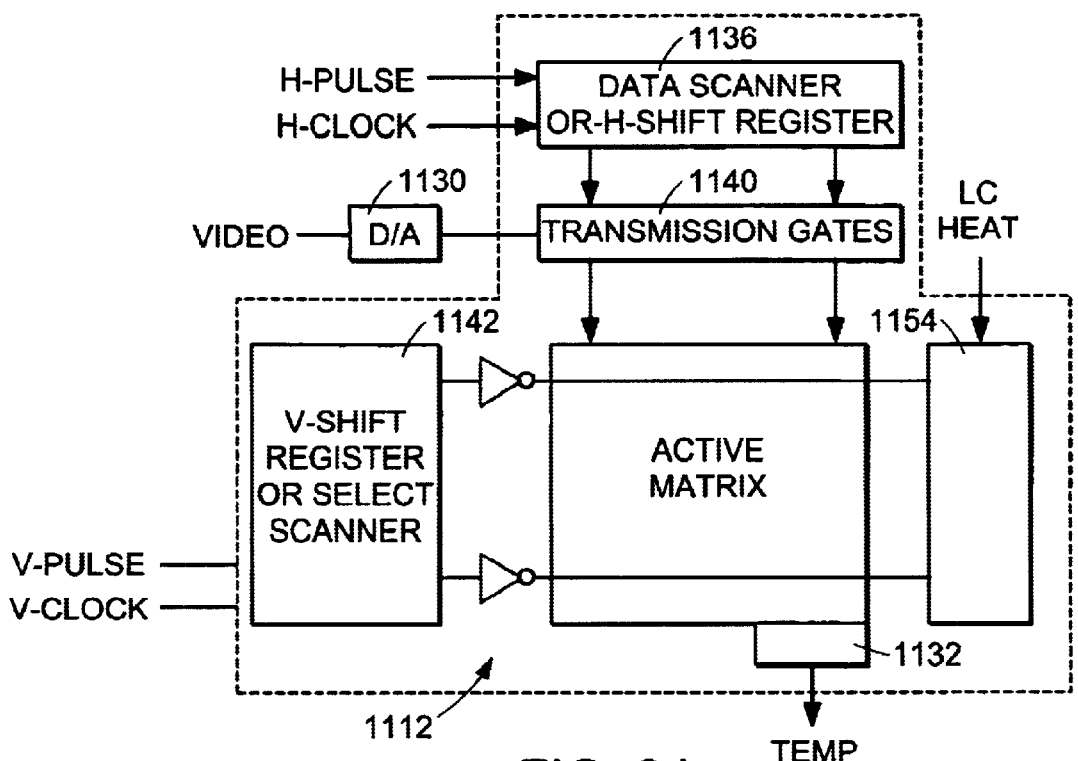
FIG. 2J illustrates an alternative preferred embodiment of the display with a heat gate.

Referring to FIG. 2J, a schematic of the display 1112 and the digital to analog converter 1130 are shown. The display has a horizontal shift register 1136, a vertical shift register 1142, and switches 1140 similar to what is illustrated in FIG. 2H. In addition, and in contrast to FIG. 2H, FIG. 2J illustrates a heating gate 1154.

Figure 2K:
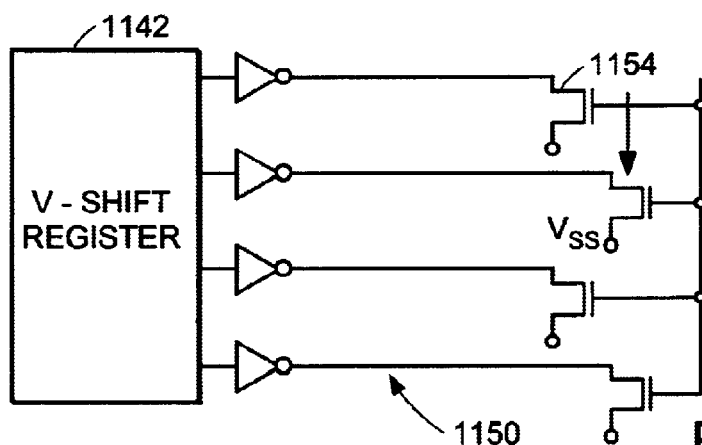
FIG. 2K illustrates a portion of the display shown in FIG. 2J.

Referring to FIG. 2K, for pixels which have p-channel TFTs, the heating gate 1154 has a series of n-channel TFTs. Typically when writing to the display only the row being written to is on (V=0). When not writing to the display, all the rows are $V_{DD}$. When the n-channel TFTs turned on, by applying $V_{DD}$ to a heat line 1150 results in current flowing from the inverter associated with the vertical shift register 1142 through the row to the n-channel TFT and heat is dissipated along the entire row. The drain is connected to $V_{EE}$, which is zero. It is also recognize that the display 1112 can have several extra rows outside the typical array to assist in uniform heating.

Figure 2L:
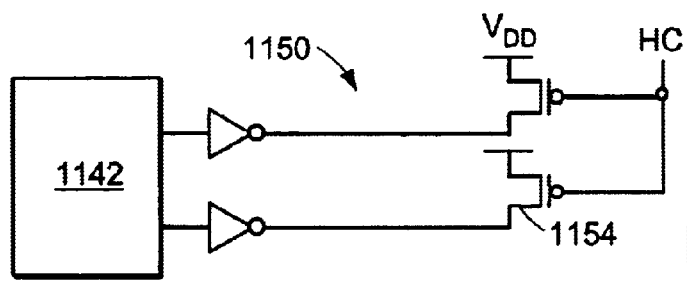
FIG. 2L illustrates an alternative embodiment of a portion of the display shown in FIG. 2J.

Likewise for pixels which have n-channel TFTs, referring to FIG. 2L the heating gate 1154 has a series of p-channel TFTs. Typically when writing to the display only the row being written to is on ($V=V_{DD}$). When not writing to the display, all the rows are approximately zero (0) volts. When the p-channel TFTs are turned, by setting the gate to zero (0), there is a voltage drop across the row of $V_{DD}$.

It is recognized that $V_{COM}$ addressing and the heating of the display can used independently. Heating can be incorporated into the embodiments described with respect to FIGS. 2A–2D. While an internal heater is preferred, it is recognized that a separate heater can be used with the temperature sensor.

Figure 2M:
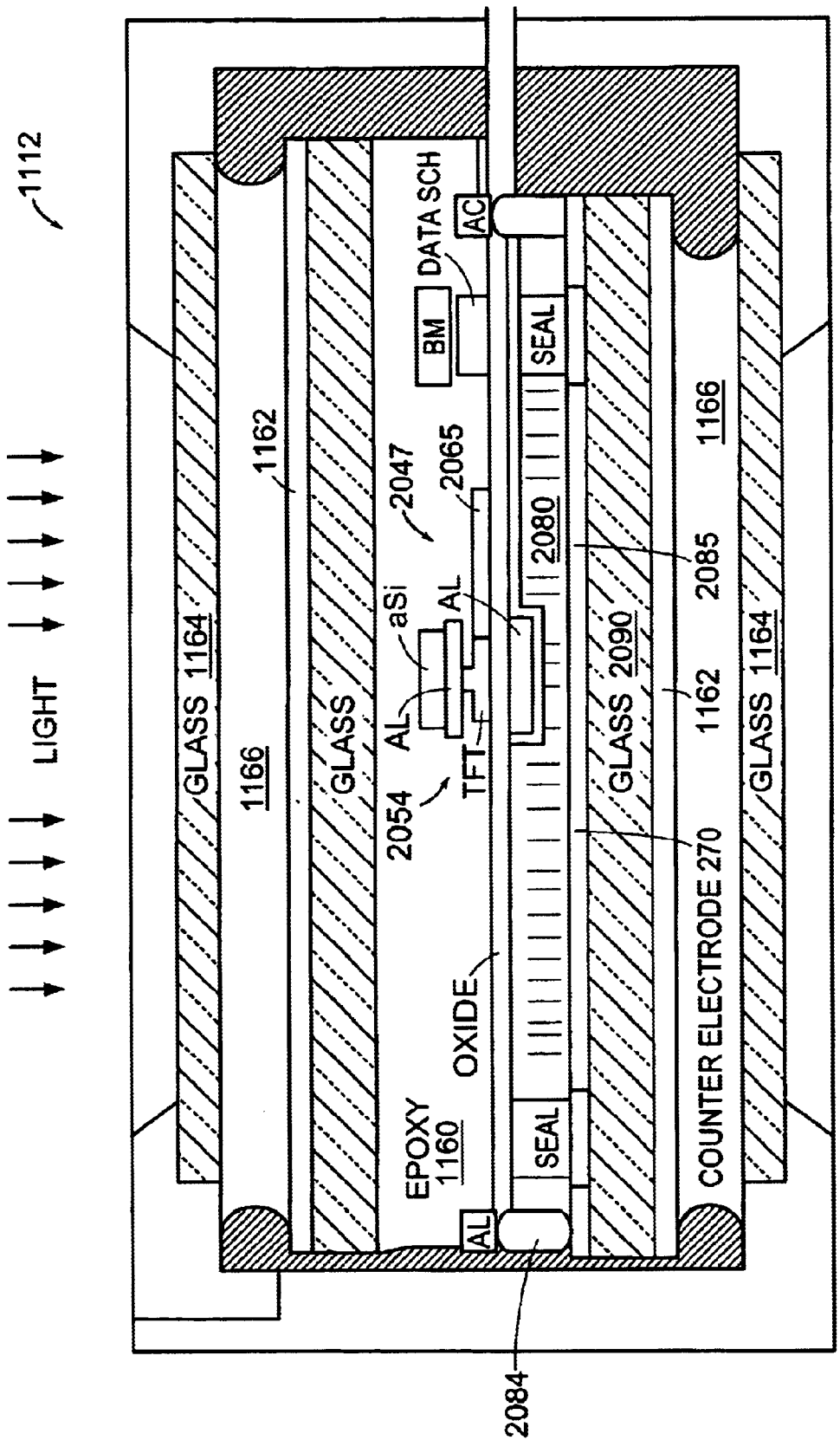
FIG. 2M is an enlarged sectional view of the display in its housing.

Referring to FIG. 2M, a sectional view of the display 1112 is shown. The display 1112 has an active matrix portion 1160 including a pixel element 2047 spaced from a counterelectrode 2085 by an interposed liquid crystal material 2080. Each pixel element 2047 has a transistor 2054 and a pixel electrode 2065. The active matrix portion 1160 can have aluminum light shields 2086 to protect the transistor (TFT) 2054 if the active matrix is used for projection requiring high luminance light. The counterelectrode 2085 is connected to the rest of the circuit by solder bumps 2088. The matrix 1160 is bounded by a pair of glass substrates 2090 in this embodiment and a pair of polarizers 1162. An additional pair of glass plates 1164 are located outboard of the active matrix portion 1160. The glass plates 1164 are spaced from the polarizer 1162. The space defines an insulation layer 1166. The display 1112 includes a two-piece case 1168 which contains the active matrix portion 1160, the glass plates 1162 and the polarizers 1164. A room temperature vulcanization (RTV) rubber 1170 helps in maintaining the elements in proper position in the case.

A preferred embodiment in the form of a stand-alone video display device 98 featuring a liquid crystal display incorporating the actual matrix display circuit 100 will now be described in connection with the exploded views of FIGS. 3A and 3B.

Figure 3A:
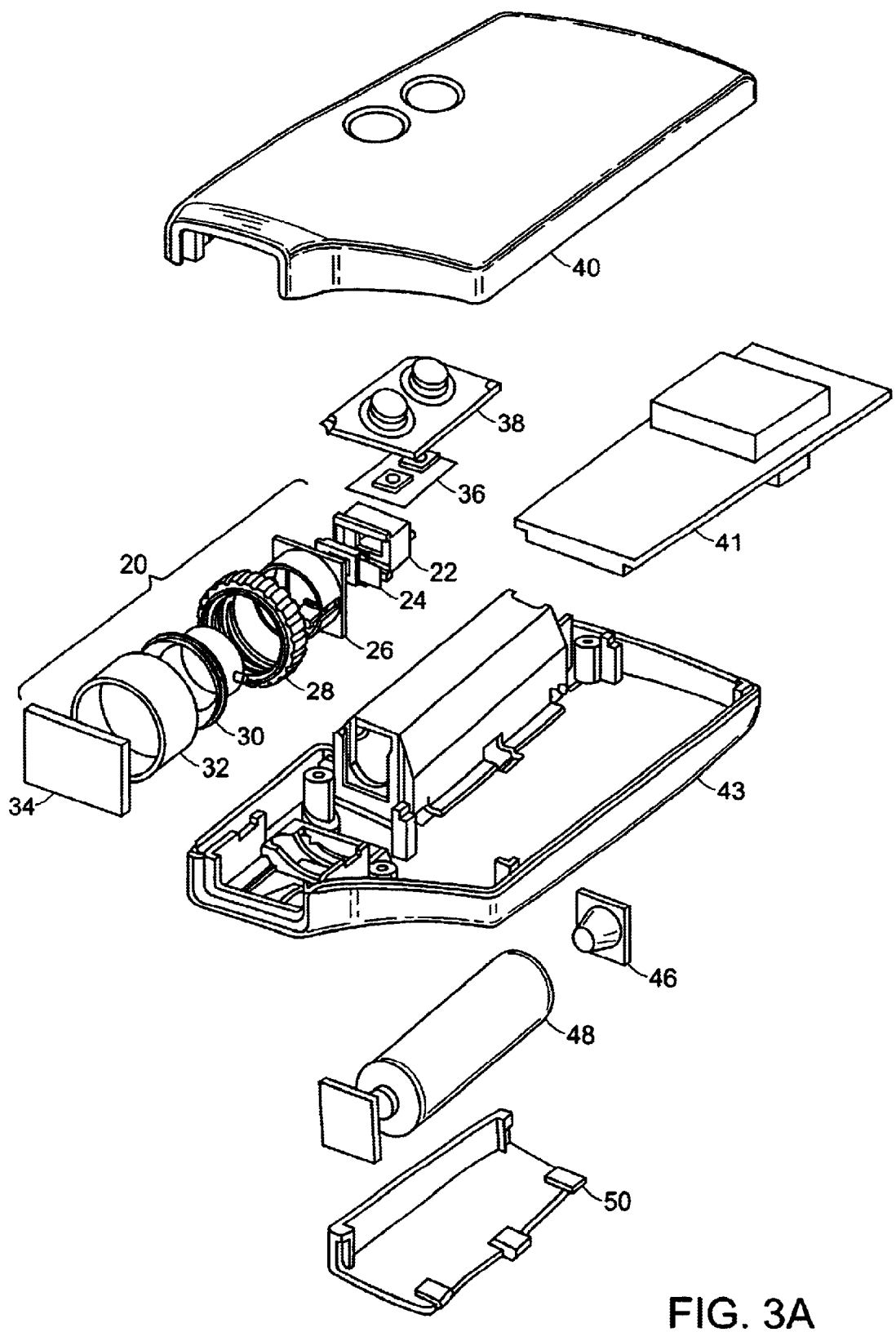

In FIG. 3A, a portable imaging device such as a pager is illustrated having a housing including a top 40 and a bottom 43 with a door 50 for access to a battery 48. The battery 48 provides power to the circuit board 41, the display 24 and the backlight 22. The pager can be operated by controls 38 or push buttons accessible through one of the housing surfaces that actuate display functions. An optical system 20 is positioned within the housing and includes a backlight 22, preferably an LED backlight, a transmission liquid crystal display 24, a focusing mechanism including a knob 28 that the user rotates to move the tunnel 30 relative to the optic slide 26, a lens assembly 32, and a cover glass 34.

Figure 4A:
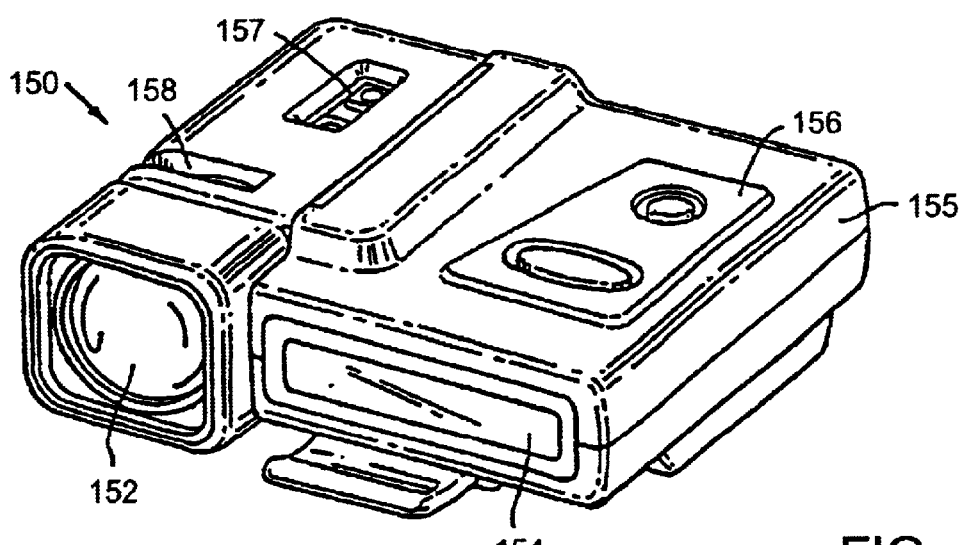
Figure 4C:
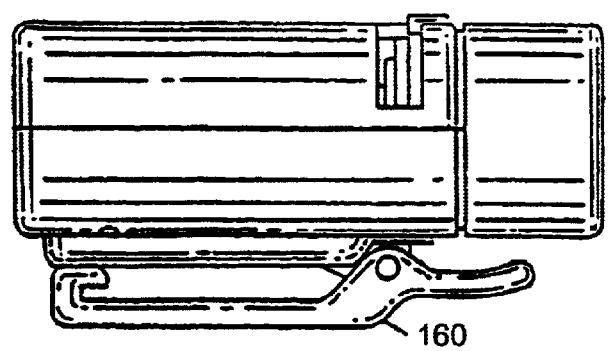
Figure 4B:
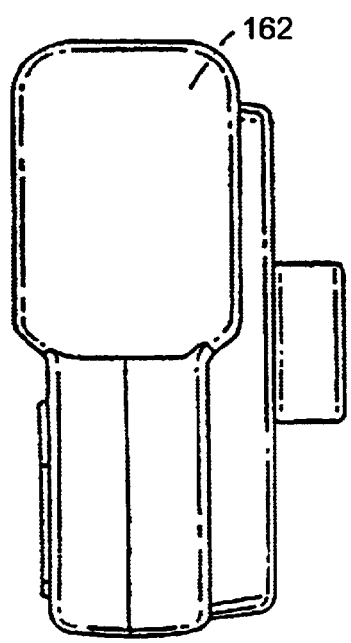
Figure 4D:
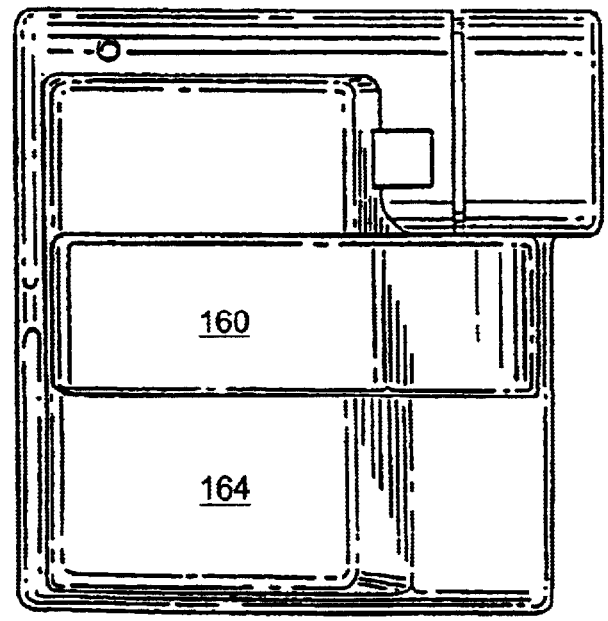
Figure 4G:
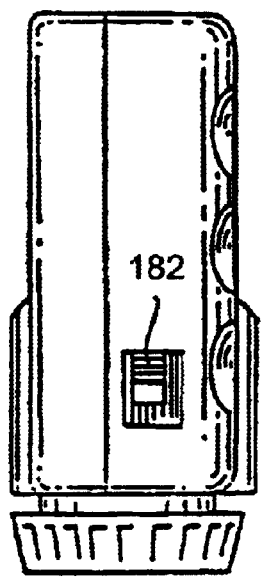

Preferred embodiment of hand held display devices are illustrated in connection with FIGS. 4A–4K. FIG. 4A is a perspective view of a preferred embodiment of a pager system 150 having two display viewing areas 152 and 154 within a housing 155. Viewing area 152 has a lens through which the user views a microdisplay as described previously. A second flat panel display without magnification is viewed by the user at 154. The second display is a simple low resolution numeric and/or alphabetic display to read telephone numbers or scrolled numbers or messages. The microdisplay magnification can be adjusted at switch 158. The displays are operated by switches 156, 157. As seen in the rear view of FIG. 4B, the rear surface 162 of housing 155 is thicker in that portion containing the microdisplay and the battery. In the alternative embodiment illustrated in FIG. 4Ba, the rear panel 162 is removed to expose the cavity 159 for the battery and the rear of the display assembly 161. Also shown in this embodiment is a cover 163 which slides to cover or expose a camera including an image sensor 166 and lens 167. The digital imaging sensor 166 can take images electronically stored within a memory within th pager that can be sent by wireless transmitter to a personal computer, a telephone as described herein, or web browser. The images can also be loaded by wire through port 169 onto a personal computer, or alternatively, can be loaded onto a smart card or flash memory card that can be inserted into one or more card slots 168. The port 169 can also be connected directly to a keyboard or touchpad as described herein. The sideview of the housing 155 shown in FIG. 4C illustrates a clip 160 that is used to fasten the device to the clothing of the user. The clip 160 is attached to the bottom surface 164 of the housing 155 as shown in FIG. 4D.

Figure 4F:
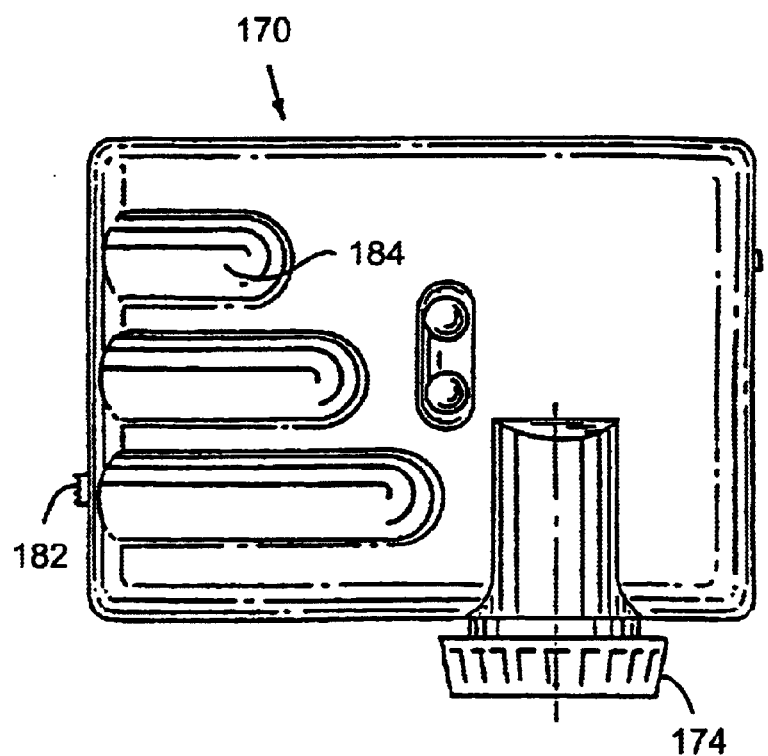

Another preferred embodiment of a hand-held viewing device 170 is illustrated in the perspective view of FIG. 4E. A first display is seen through lens 172 with magnification being adjusted by knob 174. A second display 180 as described above is positioned on the same side of the device 170 as the lens 172 for ease of viewing. The displays are operated by switch 176 and buttons or control elements 178. A top view is illustrated in FIG. 4F showing ridges 184 that accommodate the fingers of the user and the second display switch 182, which is shown more clearly in the side view of FIG. 46.

Figure 4H:
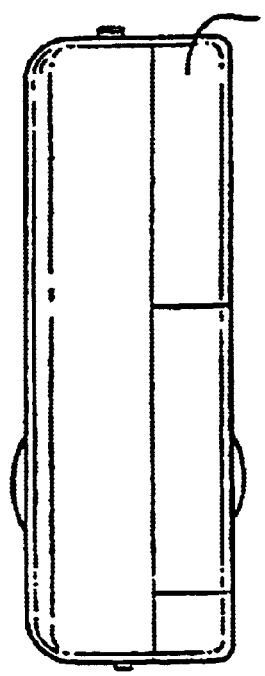
Figure 4I:
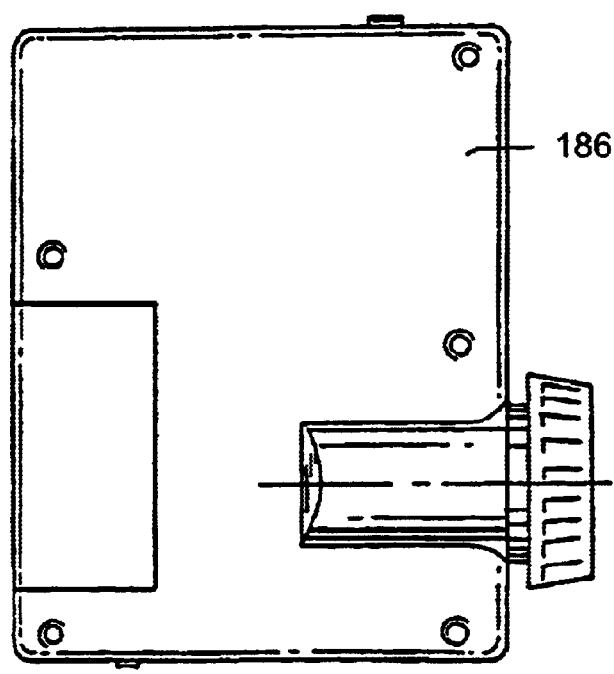

Rear and bottom views of device 170 show rear 188 and bottom 186 sides in FIGS. 4H and 4I, respectively.

Figure 4J:
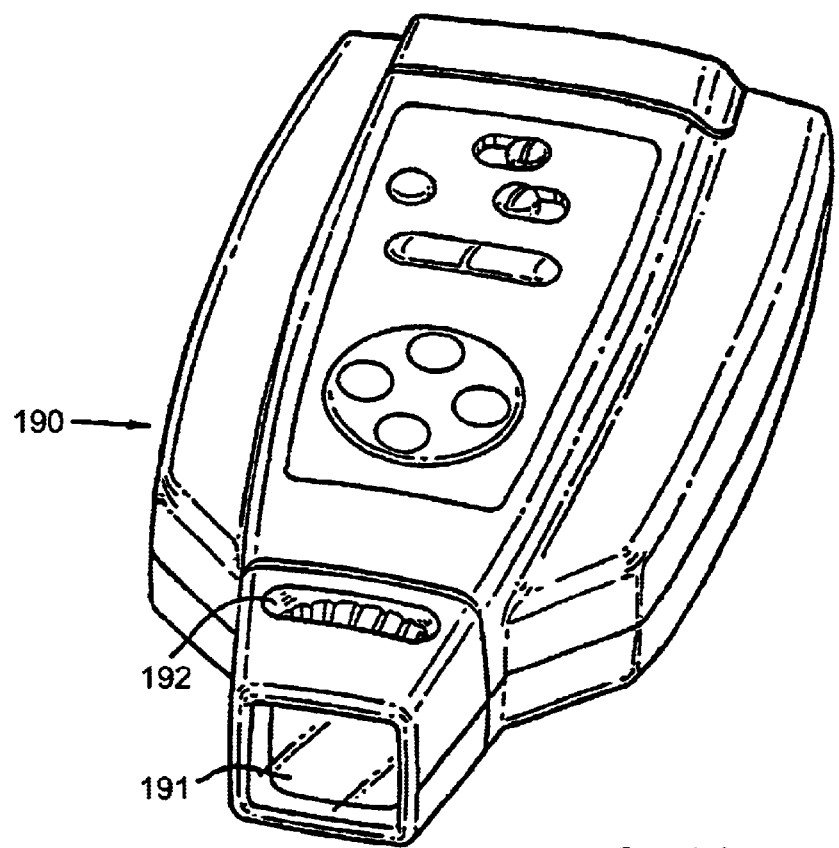
Figure 4K:
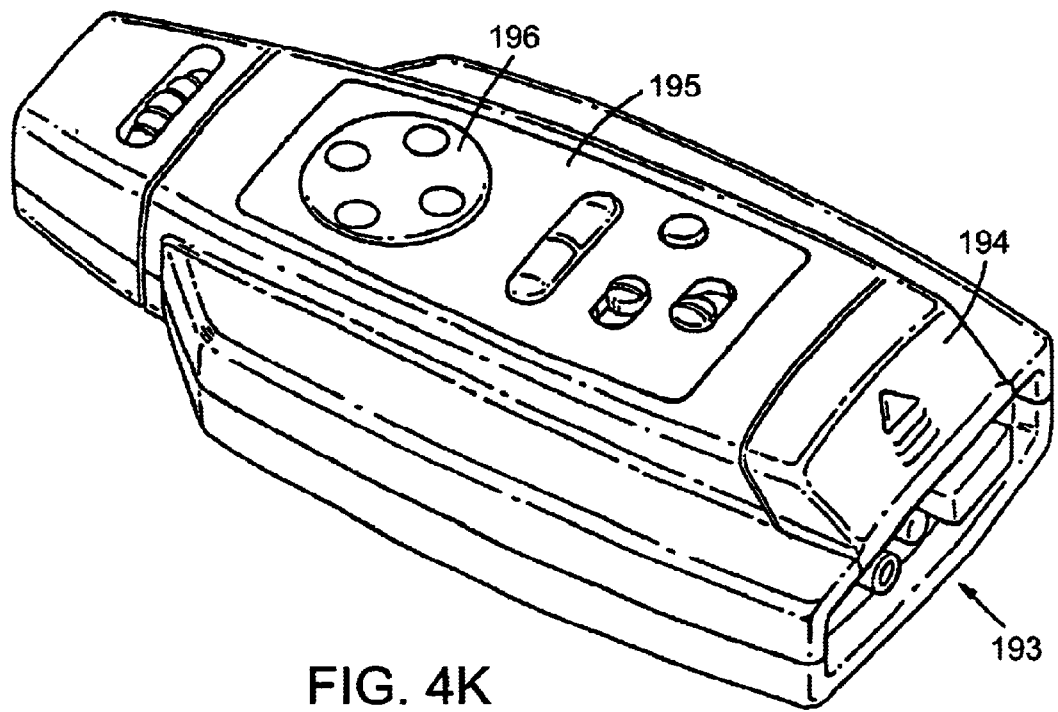

Another preferred embodiment is illustrated in the perspective views of FIGS. 4J and 4K. In the embodiment, a hand held unit 190 has a viewing window 191, a focus control 192, a rear panel 193 with an external port, a battery access panel 194, and a control panel 195 with control elements including a scan control element 196 to move text or the image on display up or down and left or right.

A lens 65 suitable for magnifying the image of a microdisplay for viewing by a user is illustrated in the example of FIG. 5A.

For a 0.25 inch diagonal microdisplay, the outer diameter 64 of the lens can be about 30.4 mm, the thickness 70 of the lens at the optical axis 67 can be about 8 mm, the inner surface 60 that receives light from the display has a curved diameter of about 21.6 mm, and the viewing surface 61 has a diameter of 68 of about 22.4. The peripheral edge 69 used to hold the lens in the assembly can have a thickness 66 of about 2 mm and a radius 71 of about 4 mm. The lens 65 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment for providing a color display can use a diffraction optical system such as those described in application U.S. Ser. No. 08/565,058 filed on Nov. 30, 1995, the entire contents of which is incorporated herein by reference.

Another preferred embodiment of a 1.25 inch diameter lens system 52 with a larger field of view is illustrated in FIG. 5B. Three lens elements 51, 53 and 55 enlarge the image on the display 54.

The lens 65 of FIG. 5A can be used in the alternative display assembly of 80 of FIG. 5C. In this embodiment, the display 82 is positioned between the backlight housing 84, containing LED 86, and the lens housing 88 that holds the lens 65 in a fixed position relative to the display 82.

A microdisplay system 360 utilizing a folded optical path is illustrated in connection with FIG. 5D. In this embodiment, an LED array 362, or other light source, illuminates the display within housing 364. The display 366 directs an image along a first optical path 372 that is reflected by mirror 368 along a second other path 374 through the lens 370 as described previously.

Figure 5P:
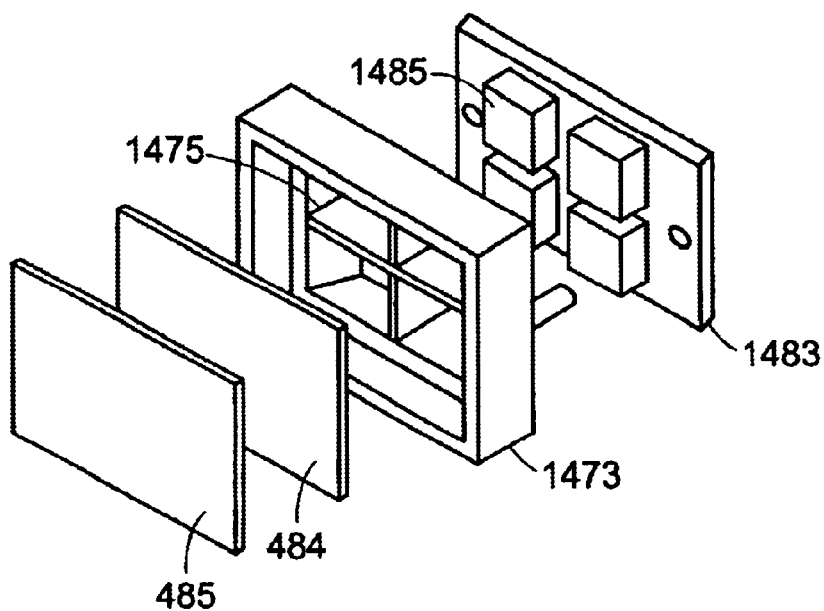
Figure 5D:
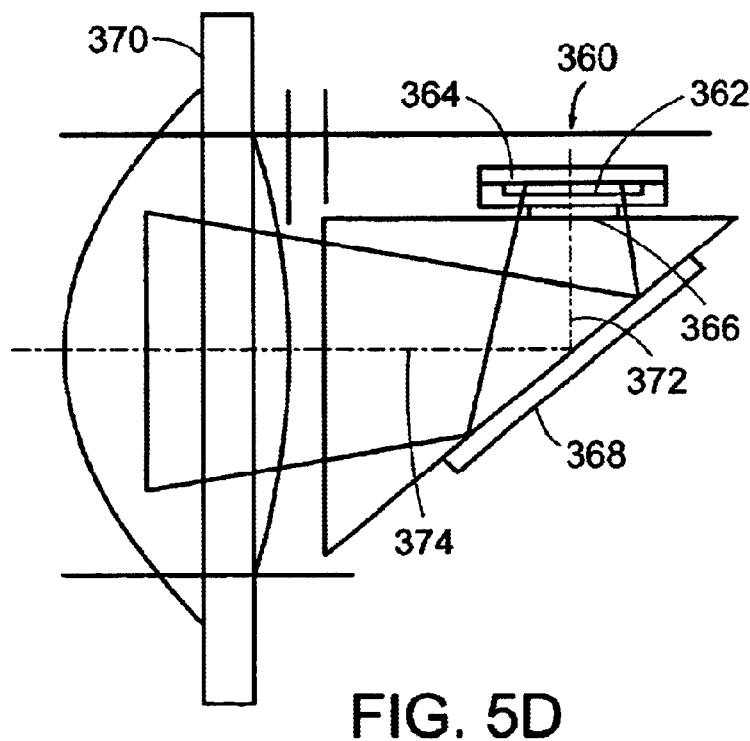
FIG. 5D is a schematic view of an LED backlighting system for a liquid crystal display in accordance with the invention.
Figure 5E:
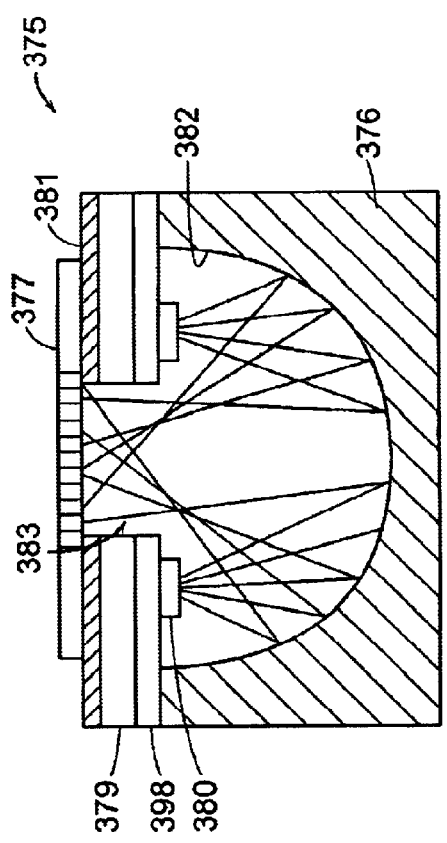
Figure 5F:
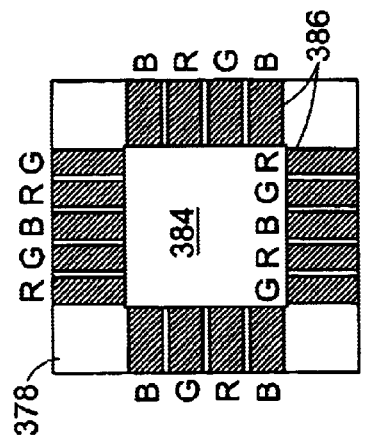
Figure 5G:
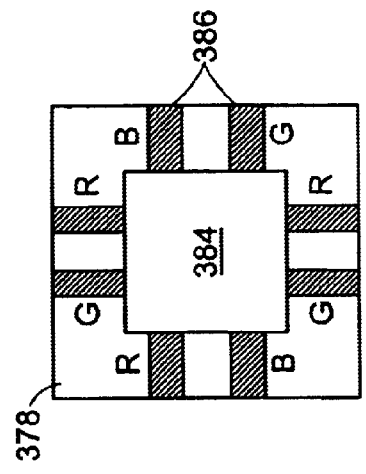

Another preferred embodiment of the backlight system is illustrated in FIGS. 5E–5G. The backlight 375 includes a reflective bowl 376 with an inner concave surface 382 that reflects light emitted by the LEDs 380 onto the active matrix region of display 377. The LEDs 380 are mounted on a circuit board 378 that is electrically connected to the timing circuit described previously. The system 375 can also include a heat sink 379 for applications requiring thermal isolation of the display circuit from the backlight circuit. The element 379 can be a silicon carbide, silicon, or aluminum nickel plate or wafer. The element 379 can be insulated from the display 377 with layer 381 such as an adhesive. The circuit board 378, element 379 and optional layer 381 have openings that are aligned to provide an aperture 383.

A preferred embodiment of printed circuit board 378 on which the LEDs are mounted is shown in FIG. 5F. In this embodiment 16 or 18 blue, green and red LEDs 386 are positioned around opening 384. Another preferred embodiment utilizing 8 LEDs 386 is illustrated in FIG. 5G. Fewer LEDs allow the circuit to operate at lower power. Additionally, for color sequential operation, where frame rates are relatively high, the LEDs are driven at higher rates to increase brightness.

Figure 5H:
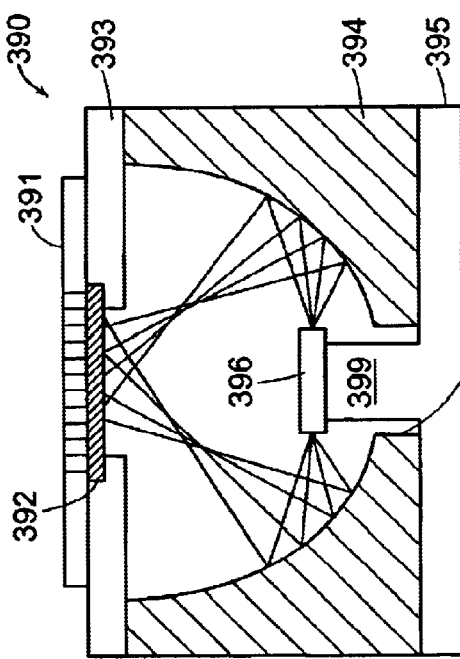

Another preferred embodiment of a backlight is illustrated by the system 390 of FIG. 5H. In the embodiment the circuit board 395 on which the LEDs 396 are mounted is positioned underneath the reflective bowl 394 with the LEDs 396 mounted on a post 399 extending through opening 398. Light is diffusely reflected by bowl through diffuser 392 onto display 391.

FIG. 5I illustrates a backlight housing 84 with an aperture on one side through which light exits the housing and is directed through the display. The housing has a base and sides 135 in the folded opened view of FIG. 5J. The display is mounted onto plate 393. The display 391 can be connected to external connectors 137 by flexible circuit boards 136 which wrap around the sides of the bowl. The backlight housing preferably has a volume of less than 0.5 cubic inches. The display module has a volume of less than 2 cubic inches and preferably less than 20 cm$^3$.

A system having a volume less than 15 cm$^3$ is illustrated in connection with FIGS. 5K–5O. FIG. 5K is a perspective view of an assembled display module 470. The exploded view of FIG. 5L shows the elements of system 470 in detail. The backlight reflector is positioned in back light housing 473 which can be adhered directly onto the display 475 with an epoxy adhesive or with an optional clip 474. The display is held by a display holder 476 which can also serve to define the visual border for the active area of the display as seen by the user through transparent window 482. The holder 476 is attached to holding panel 477 which retains ring 478 within the proximal end of housing element 471. The ring can be manually or electrically actuated to rotate and thereby translate optics holder 472 along the optical axis 486. A pin 479 can be used to couple the holder 472 to internal helical thread of ring 478. The lens 480, an optional second lens within the distal end of holder 472, a color correction element 481 and window 482 can all be held within holder 472 which moves relative to the display to focus the image thereon.

Figure 13A:
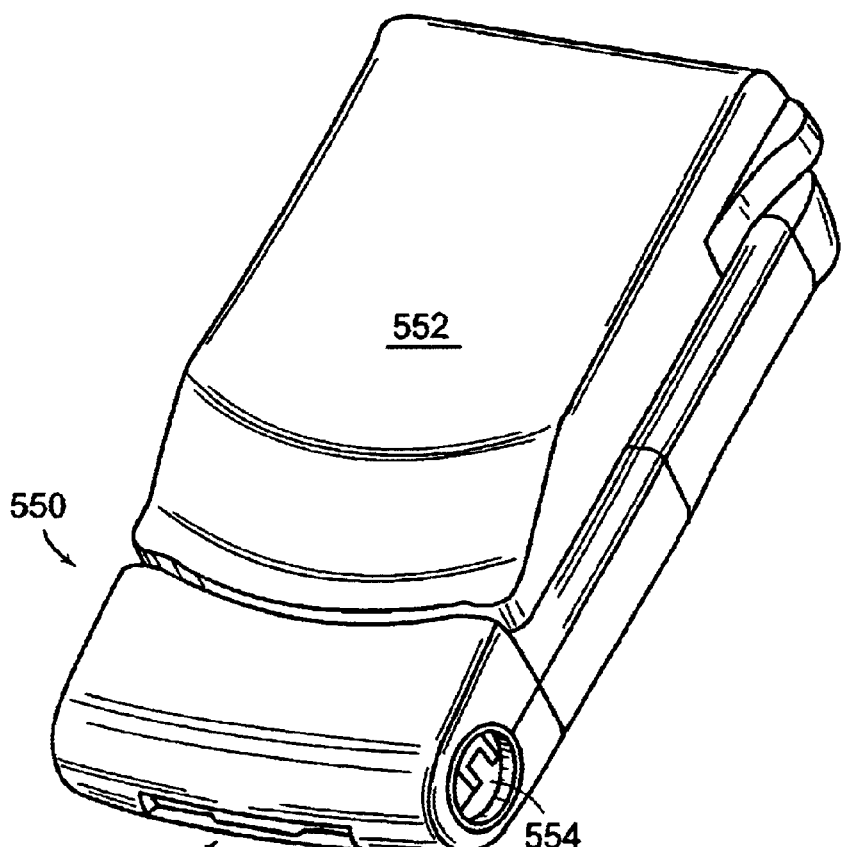
FIGS. 13A–13K illustrate other preferred embodiments of the invention including a display docking system for a cellular telephone.
Figure 13B:
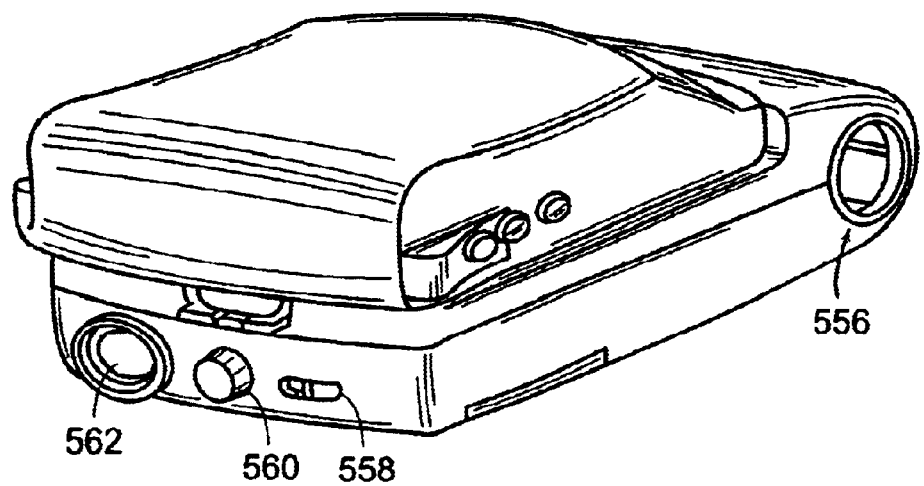
Figure 13C:
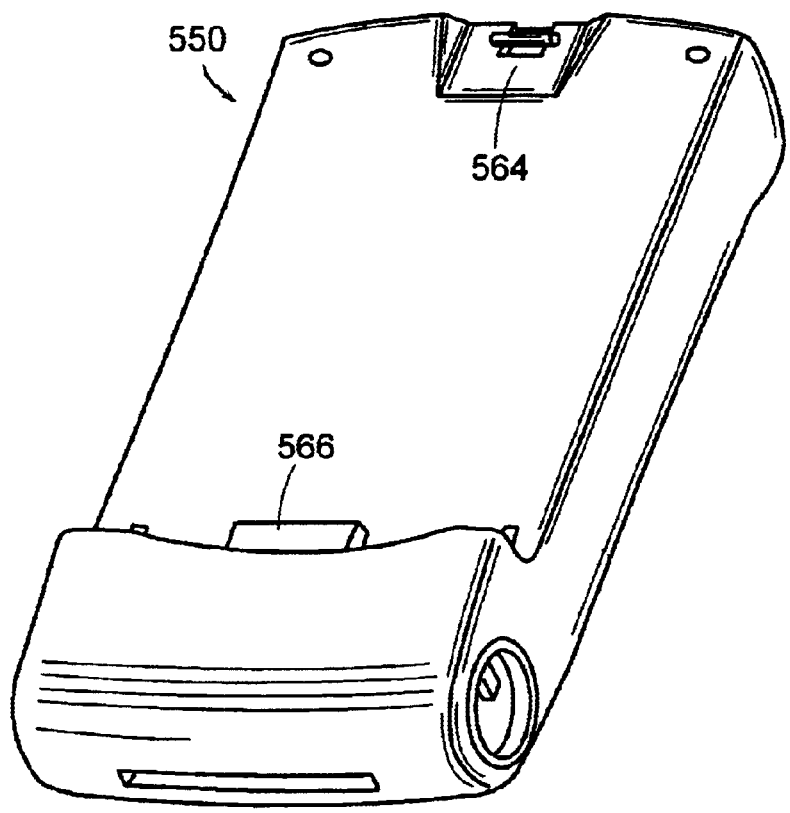
Figure 13D:
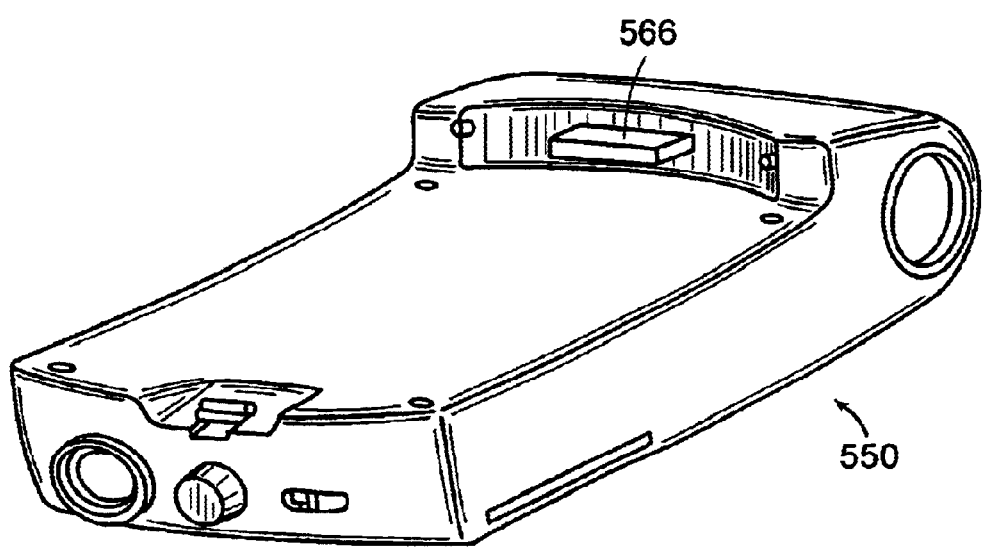
Figure 13E:
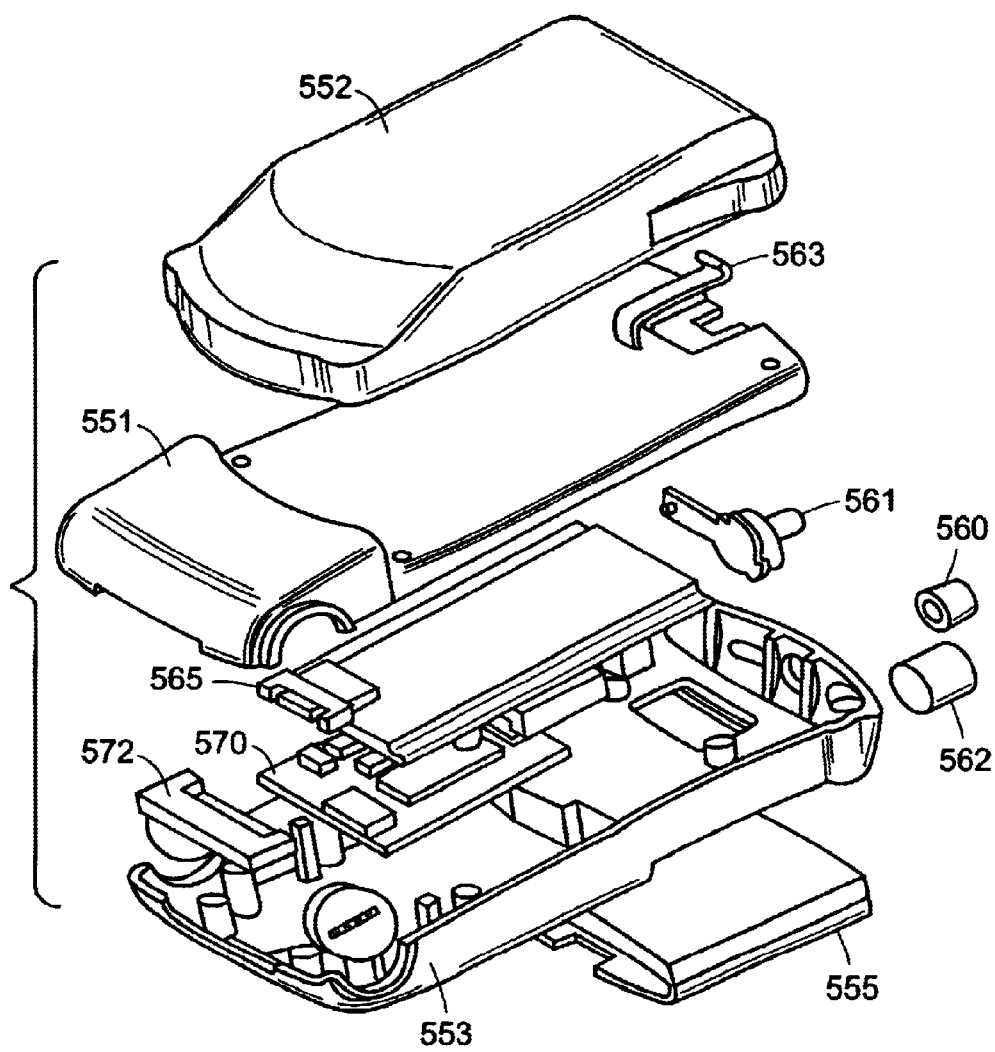
Figure 13F:
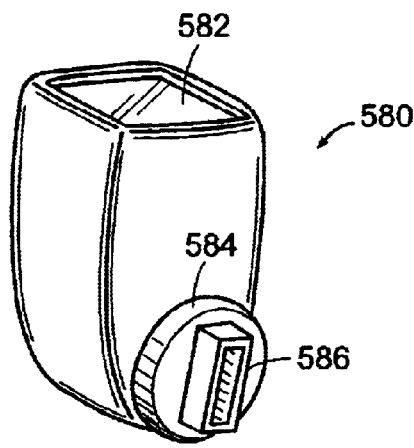

Element 470 fits snugly within an external housing such as that shown in FIG. 13F, or within the other device housings as described herein.

Figure 5M:
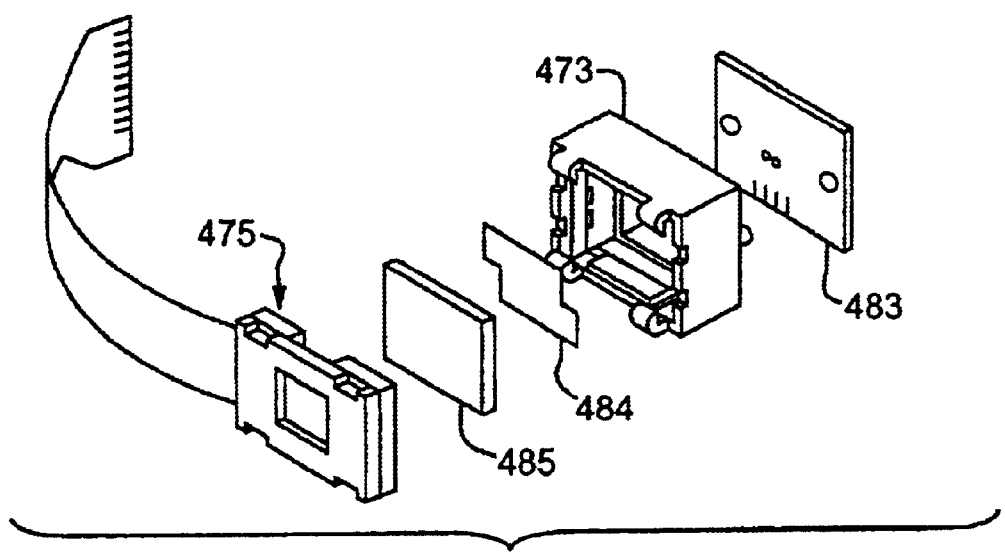
Figure 5N:
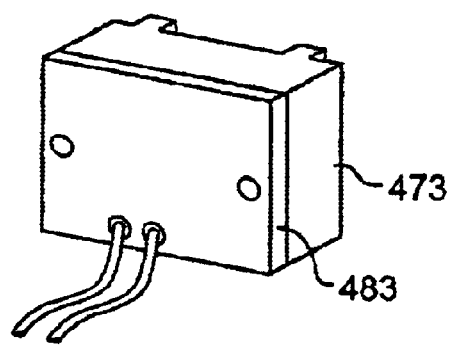
Figure 5O:
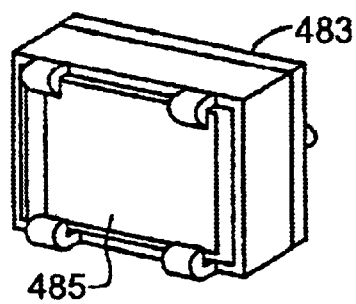

An exploded view of a preferred embodiment of the backlight relative to the display 475 is shown in FIG. 5M. The display circuit and LED backlight are mounted on circuit board 483. Preferably, two or three LEDs are used to provide two or three colors, respectively. Between the backlight housing 473 and the display 475, a brightness enhancement film 484, such as the "BEF" film available from 3M Corporation can optionally be used along with a diffuser 485. As seen in FIGS. 5N and 5O, the circuit board 483 mounted on a first side of housing 473 and the backlight active area is defined by the diffuser 485 on a second side of the housing 473.

An exploded view of an alternative embodiment of the backlight is shown in FIG. 5P. A backlight housing 1473 has a plurality of compartments 1475, four being shown in the Figure by way of example. The LED backlights are mounted on a circuit board 1483 in groups 1485 which compliment the compartments 1475 of the housing 1473. Preferably, two or three LEDs are used per group to provide two or three colors, respectively. A brightness enhancement film 484, such as the "BEF" film available from 3M Corporation can optionally be used along with a diffuser 485 between the backlight housing 1473 and the display.

Lighting System for Reflective Liquid Crystal Display

The details of a lighting system for a reflective microdisplay of the invention will now be described in connection with FIG. 6A. Illumination for a reflective LCD system 500 based upon the active matrix circuit described heretofore in connection with FIGS. 2A–2M is provided by an array of Light Emitting Diodes (LED(s)) 501 disposed adjacent light-diffuser 505 which uniformly transmits the source LED light to a linear polarizer 502.

The linear polarized light 516 from polarizer 502 is passed to a polarizing beamsplitter or prism 508 which is reflected by beam beamsplitter 508 and is incident on specularly reflective LCD 506 to provide the requisite illumination. The light incident on LCD 506 is selectively reflected 514 to generate an image that is rotated by ¼ wave plate 504 so that it is transmitted through splitter 508 and through lens 510 to the observer 512.

Figure 6B:
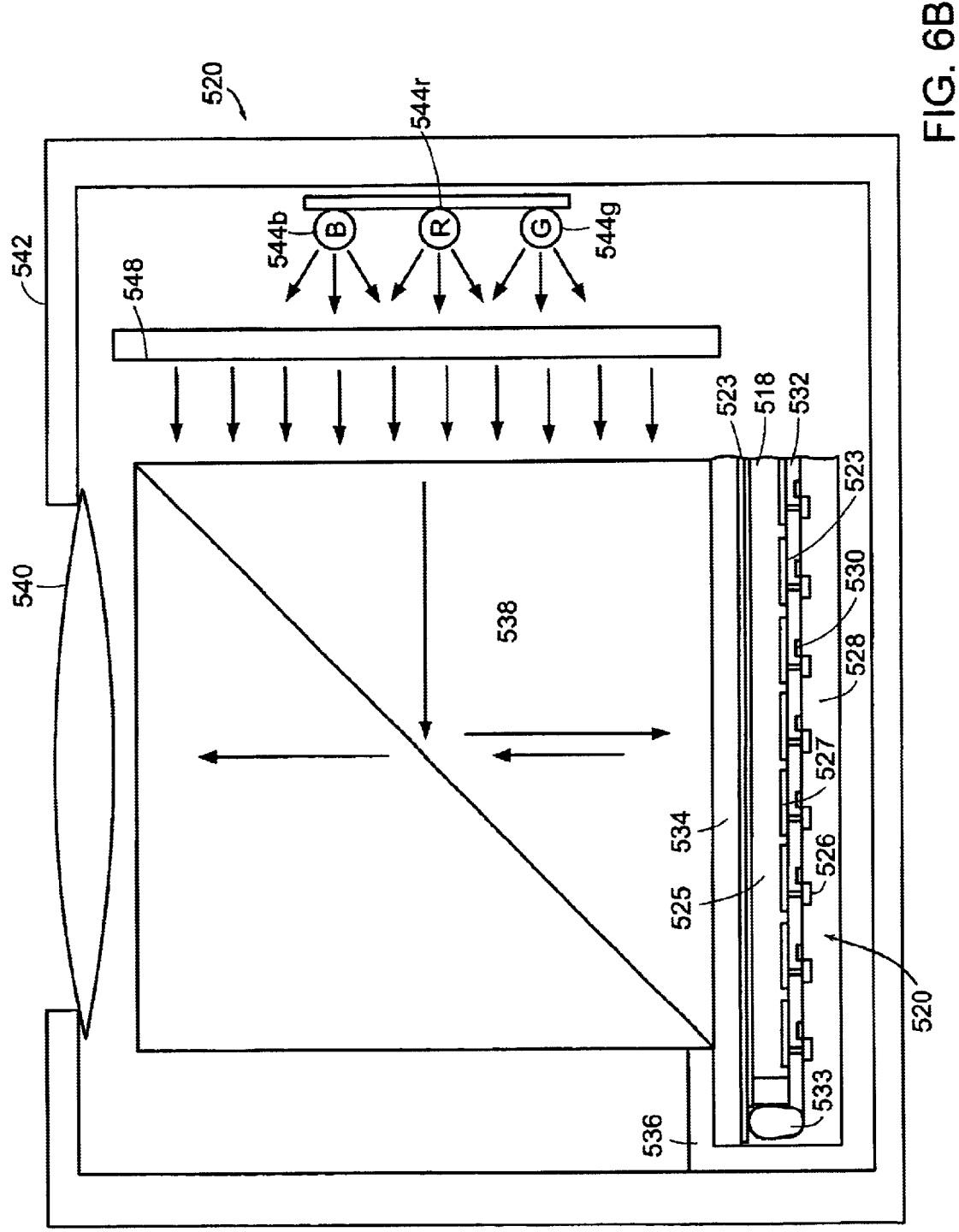
FIG. 6B is an enlarged sectional view of a reflective liquid crystal display in its housing.

Another preferred embodiment for a reflective microdisplay 518 is illustrated in FIG. 6B. A display 520 has the microdisplay 518 with an active matrix portion 522. The active matrix portion 522 has a pixel element 523 spaced from a counterelectrode 524 by an interposed liquid crystal material 525. Each pixel element 523 has a transistor 526 and a pixel electrode 527. The pixel electrodes 527 overlie the transistor (TFT) 526, located in an epoxy layer 528, where the pixel electrode protects or shields the TFT 526 from light. The pixel electrodes 527 are spaced from the channel lines 530 by a layer of oxide 532. The counterelectrode 524 is connected to the rest of the circuit by solder bumps 533. The active matrix 522 has a layer of glass 534 above the counterelectrode 524. The microdisplay 520 is carried with a case 536.

The display 520 has a dichroic prism 538 located between the active matrix 522 of the microdisplay 520 and a lens 540 for viewing the microdisplay 520. The lens 540, the dichroic prism 538 and the microdisplay 520 are carried in a display housing 542. The display housing 542 also has a plurality of light emitting diodes (LEDs) 544. The LEDs 544 in red 544r, blue 544b and green 544g are mounted to a circuit board 546 which is connected to a timing circuit. A diffuser 548 is interposed between the LEDs 544 and the dichroic prism 538. The light from the LEDs 544 is directed by the prism 538 towards the liquid crystal 524 of the active matrix 522. The light which is reflected back by the pixel electrodes 527 passes through the prism 538 towards the lens 540. As in the transmissive displays, the LEDs are flashed sequentially.

Figure 6C:
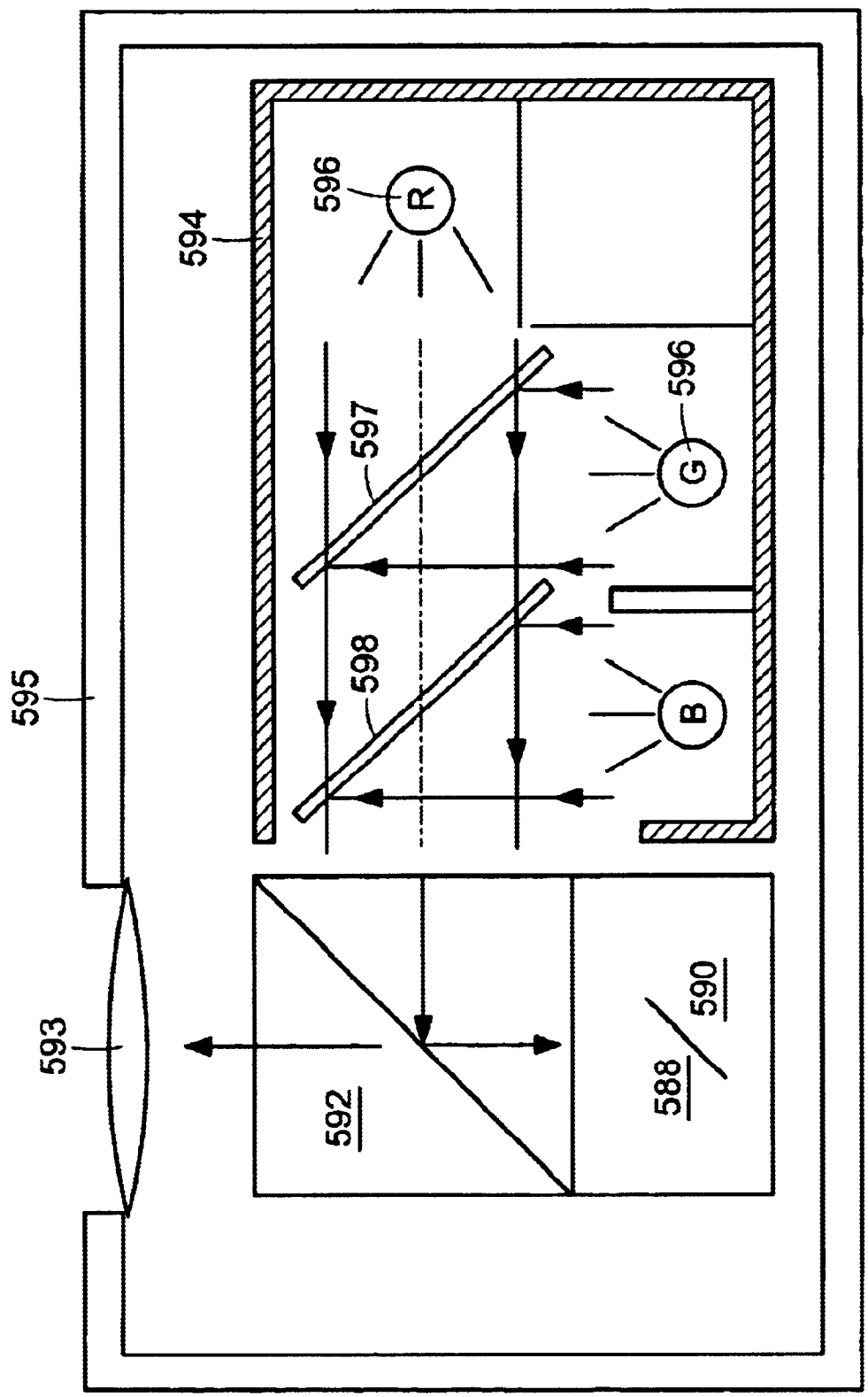
FIG. 6C is an enlarged sectional view of a reflective liquid crystal display with an alternative backlight.

FIG. 6C shows an alternative method of lighting the active matrix 588 of a reflective microdisplay 590. Similar to the previous embodiment, a dichroic prism 592 is interposed between the microdisplay 590 and the lens 593. A light source housing 594 is contained within the display housing 595. The light source housing 594 has a plurality of light emitting diodes (LEDs) 596. The LEDs are located in cells. A pair of dichroic mirrors 597 and 598 are located in the lighting housing 594 to direct the desired light from each color light source along a common axis towards the prism 592. The prism 592 reflects the light similar to the previous embodiment.

Shown in FIGS. 7A–7C are preferred embodiments of an LED backlighting system utilizing a diffuser for a transmission display in accordance with the invention. In a first embodiment of an LED illumination system 400 shown in FIG. 7A, blue (B)402, green (G)404, and red (R)406 LEDs are optically coupled to a flat diffuser element 408 around the periphery of an illumination area of 410 that is positioned adjacent the display active or viewing area. For a display having a diagonal of 6.35 mm, the side of 412 of the viewing area 410 can be about 3.81 mm in size, and the length 414 of the viewing area can be about 5.08 mm. The diffuser 408 can be a plastic material such as acrylic and the back of the diffuser can be coated with a reflective material to improve light output of the device.

In another embodiment of an LED display illumination system 420 as shown in FIG. 7B, the LED's 422 are coupled in pattern to the edge of the diffuser 408. The LEDs 422 are actuated in sequence 407 to provide color sequential operation with fewer LEDs.

In the system 430 of FIG. 7C, the display 432 is coupled to an angled diffuser 436 at interface 440. The linear array of LEDs 434 are coupled at one end of the diffuser and a reflective back surface 438 is designed to evenly distribute light as it is directed through the interface.

Figure 7D:
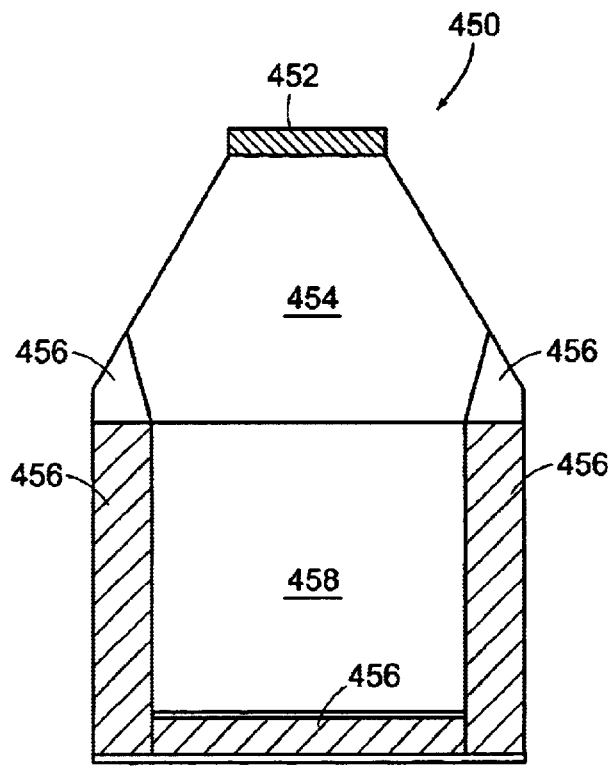
Figure 7E:
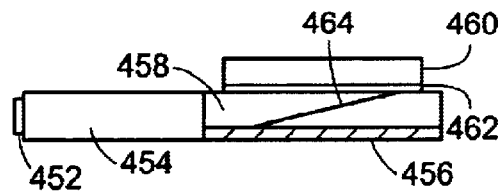

An enlarged top view of a diffuser and light pipe system 450 for backlight illumination of a display is illustrated in FIG. 7D. The light source 452 such as three light emitting diodes is coupled to an expanding light pipe 454. The light pipe 454 directs the light into the side of a reflecting element or diffuser 458, as illustrated in FIG. 7E. A BEF film referenced above can be used between the light pipe 454 and element and reflective element 458. The sides and bottoms of the elements can be beveled at 456 to further reduce the volume occupied by this portion of the optical system. A reflective surface or mirror 464 serves to reflect light towards diffuser 462 and through the display 460.

Figure 7F:
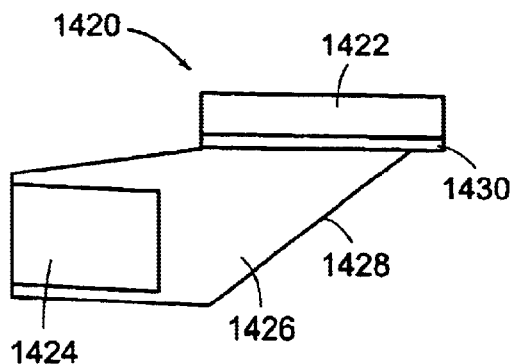

In another embodiment of an LED display illumination system 1420 as shown in FIG. 7F, the display 1422 is coupled to an angled diffuser 1426 at interface 1430. The linear array of LEDs are inserted into slot 1424 to couple light into one end of the diffuser and a reflective back surface 1428 is designed to evenly distribute light as it is directed through the interface. The increase thickness and shortness of the body of the angled diffuser 1426 increases the coupling efficiency of the element 1426 to display and thus increases the foot-lamberts (fL) of light produced per amount of power.

Figure 7G:
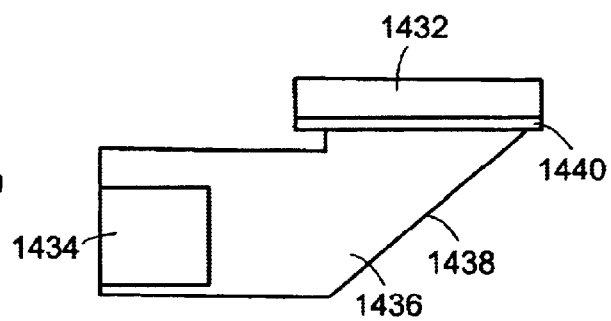

In another embodiment of an LED display illumination system as shown in FIG. 7G, the display 1432 is coupled to an angled diffuser 1436 at interface 1440. The linear array of LEDs are inserted at slot 1434 at one end of the diffuser and a reflective back surface 1438 is designed to evenly distribute light as it is directed through the interface. Similarly to the previous embodiment, the increased thickness and shortness of the body of the angled diffuser 1436 increases the coupling efficiency of the backlight system.

Figure 8A:
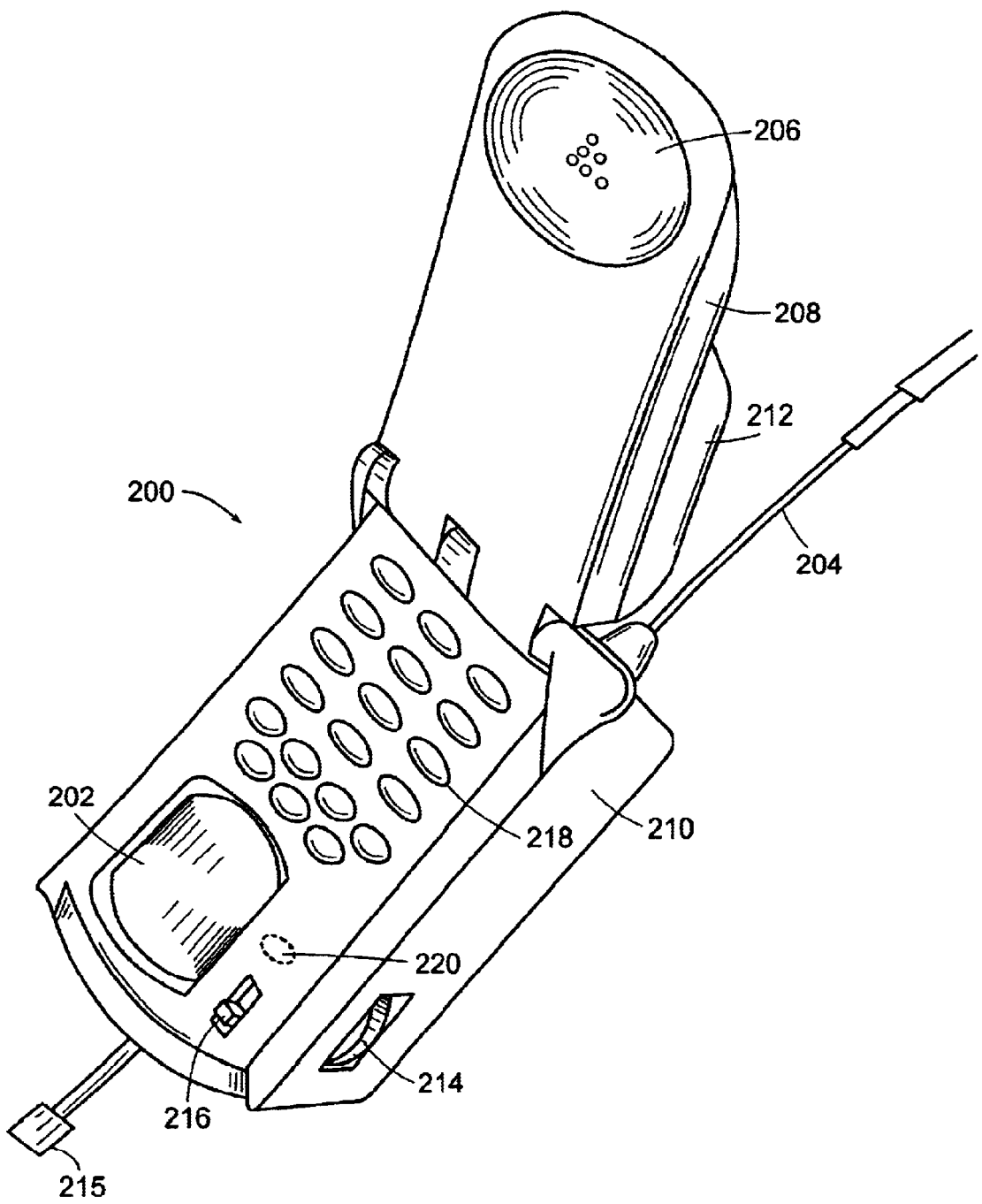
FIG. 8A is a perspective view of a preferred embodiment mobile telephone having a display device in accordance with the invention.

Illustrated in connection with FIG. 8A is a cellular telephone 200 having a magnified microdisplay in accordance with the invention. The display can be included in a base portion 210 of a "flip-phone" along with keypad 218 and microphone 220. The speaker 206, or the display or a second display as well as additional circuitry can be included in second portion 208 that rotates relative to the base 210. An antenna 204 can telescope out of the base for improved wireless reception. A battery is housed at 212. A lens 202 can be viewed by the user while holding the speaker to his or her ear thus enabling both viewing and voice transmission at the same time. The display can be turned on or off at switch 216 to save battery life when the display is not in use. The magnification can be adjusted at knob 214.

Additionally, a small camera 215 such as a charge coupled device (CCD), CMOS imaging sensor or other solid state imaging sensor can be mounted on a telescoping element to provide an imaging or video-conferencing capability. The camera can be pivoted so that the user can point and hold the camera in any selected direction. The image generated can be seen on the display and/or transmitted to a remote location, selected buttons or touch pad keys 218 can be used as a mouse control for the display.

Figure 8B:
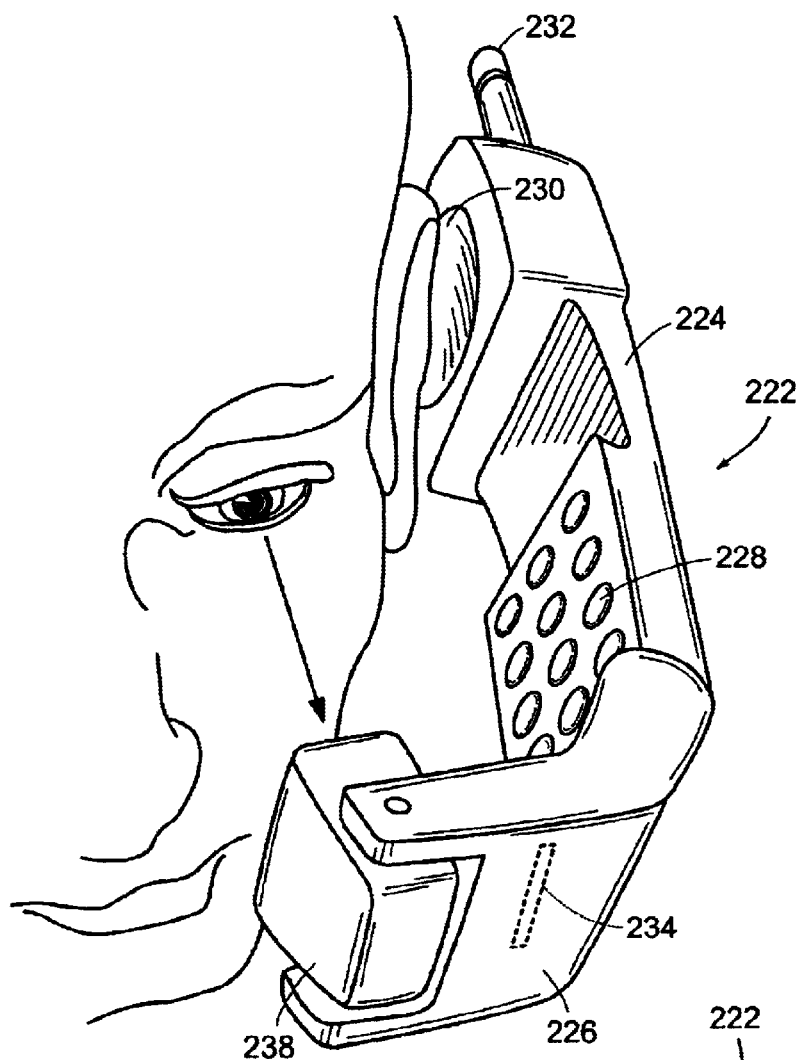
FIGS. 8B–8C illustrate an alternative embodiment of a mobile telephone having a display device in accordance with the invention.
Figure 8C:
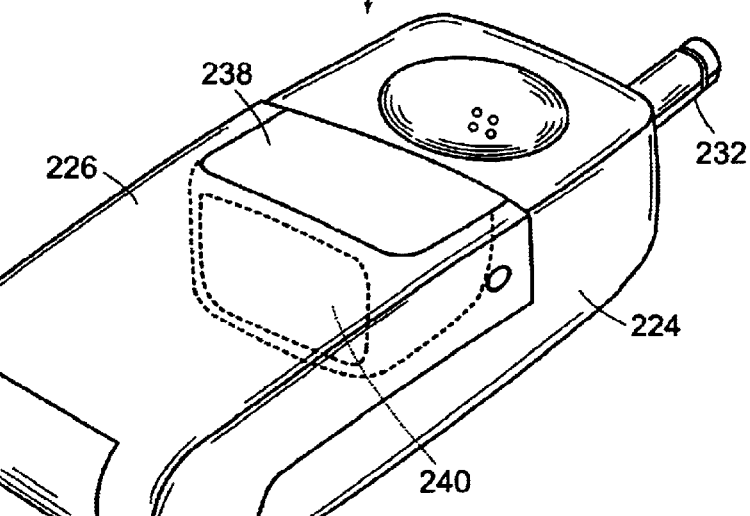

Referring to FIGS. 8B and 8C, an alternative embodiment of a cellular telephone 222 having a magnified microdisplay in accordance with the invention is shown in open and closed perspective views respectively. The cellular "flip-phone" 222 has a base portion 224 and a flip portion 226. The base portion 224 has a keypad 228 a speaker 230, and an antenna 232. The base portion 224 may include an alphanumeric display for seeing the telephone number as it is being entered. The flip portion 226 pivots from the base portion 224 and includes a microphone 234, shown in hidden line in FIG. 8B. The microdisplay is located in a module 238 which rotates relative to the flip portion 226. The module or pod 238 is flush with the flip portion 226 when in a stored position, such that the viewing port 240 is protected by the flip portion 226, as seen in FIG. 8C. When the "flip-phone" 222 is in use, the pod 238 is rotated generally 90 degrees from the stored closed position, such that a viewing port 240 is exposed and in the user's line of sight. The flip portion 226 spaces the microdisplay the proper distance from the base portion 224 to facility viewing.

Figure 8D:
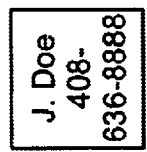
FIGS. 8D–8G illustrate the changing of the resolution of the display from high resolutions to low resolutions.
Figure 8F:
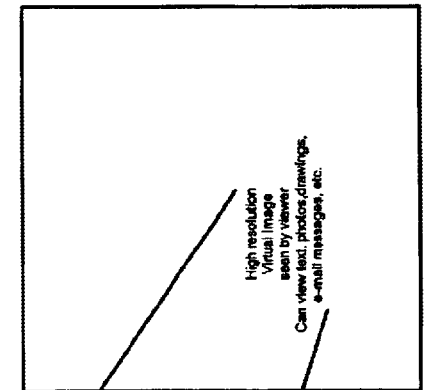
Figure 8E:
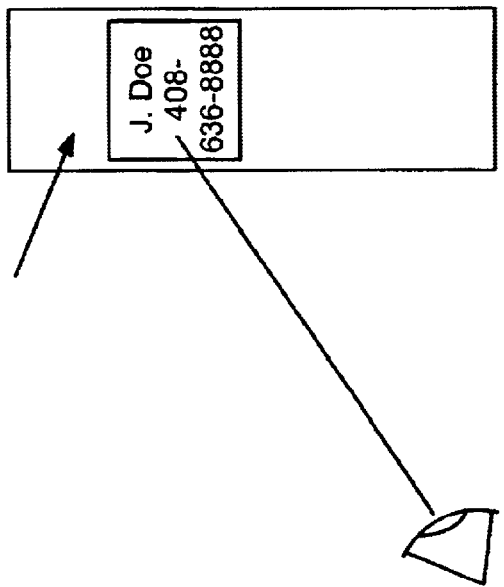
Figure 8G:
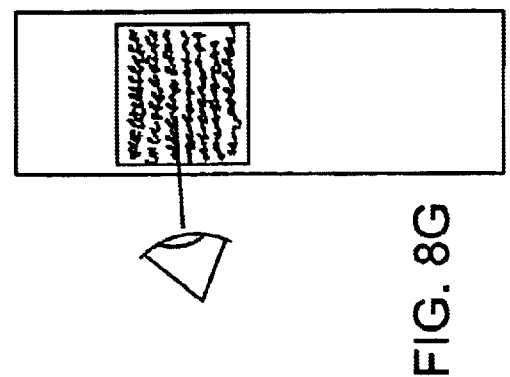

Alternatively to the base portion 224 having an alphanumeric display, the telephone 222 can have software which can vary the image size on the microdisplay. The software can create low resolution image with large characters, such as illustrated in FIG. 8D. This resolution is primarily used when the microdisplay is viewed from 6 to 18 inches. When the user is inputting the telephone number on the keypad 228, the user's eye is typically that distance from the microdisplay as represented in FIG. 8E. The software can create high resolution small characters, and typically does, such as represented in FIG. 8F. This resolution is primarily implemented when the user's eye is 1 to 6 inches from the microdisplay, as represented in FIG. 8G, such as when the user is speaking on the phone. The software can automatically switch after the telephone number is dialed or a button can be pushed.

Referring to FIGS. 8H and 8I, an alternative embodiment of a cellular, cordless or standard telephone handset 1222 having a magnified microdisplay in accordance with the invention is shown. The telephone 1222 has a base portion 1224 and a display portion 1226 formed as an integral piece. The base portion 1224 can include a keypad 1228 or virtual keypad, a speaker 1230, and can include an antenna 1232. The base portion 1224 can include an alphanumeric display for seeing the telephone number as it is being entered. An alternative to the alphanumeric display is for the microdisplay to change resolution as described above or overlay enlarged numerical information on images being displayed.

The display portion 1226 of the telephone 1222 projects from the base portion 1224. The display portion 1226 includes the microdisplay with a lens 1236 that can extend substantially orthogonal to the plane of the base portion 1224. A microphone, located behind an opening 1234, can be generally located where the display portion 1226 and the base portion 1224 merge. The telephone 1222 can have a battery 1238 which is accessible from a palm receiving portion of the base 1224, as seen in FIG. 8I. This embodiment and other personal communication devices described in connection with other embodiments can utilize a high gain rear projection screen 1235 that can be positioned relative to the lens 1236 such that several people can observe the displayed image at one time. This option can include a high brightness switch for the backlight which can be manually actuated to draw more power to improve clarity of the image. The screen 1235 can be 1 and 4 inches in diameter depending upon the application and the brightness level generated by the backlight. The screen 1235 can be folded out from the telephone housing, or can be a detachable accessory including sidewalls 1239.

A camera 1237 can be incorporated adjacent the display section 1226 to provide an image of the user or some other object of interest for transmission.

Alternatively, the display can be formed in a modular component that snaps onto the base portion of a standard telephone and couples to a display circuit port in the base section of the telephone. This is illustrated in the preferred embodiments of FIGS. 9A–9J.

Figures 9A, 9B:
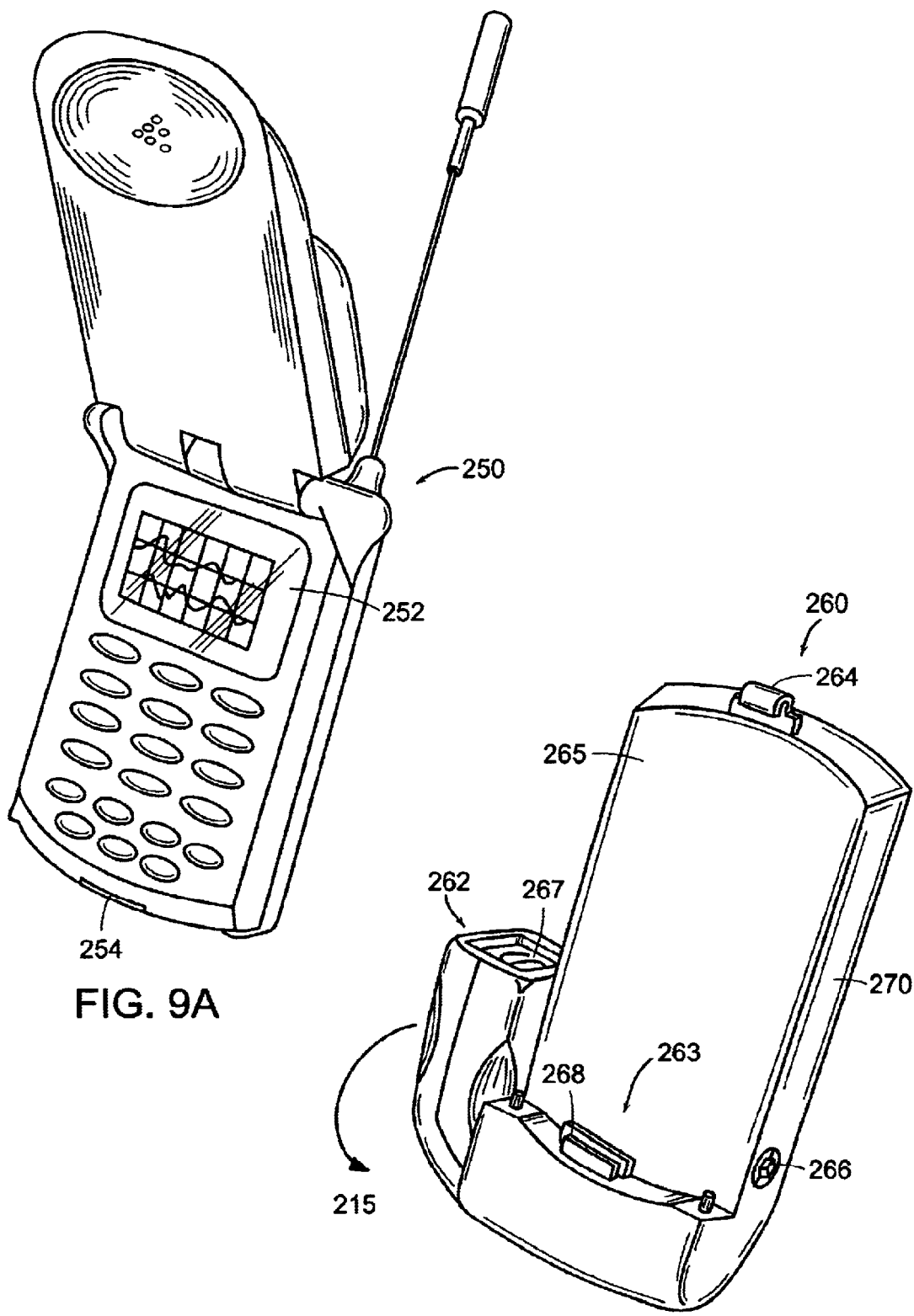
FIGS. 9A–9J are illustrations of further preferred embodiments of a telephone microdisplay system in accordance with the invention.
Figures 9C, 9D:
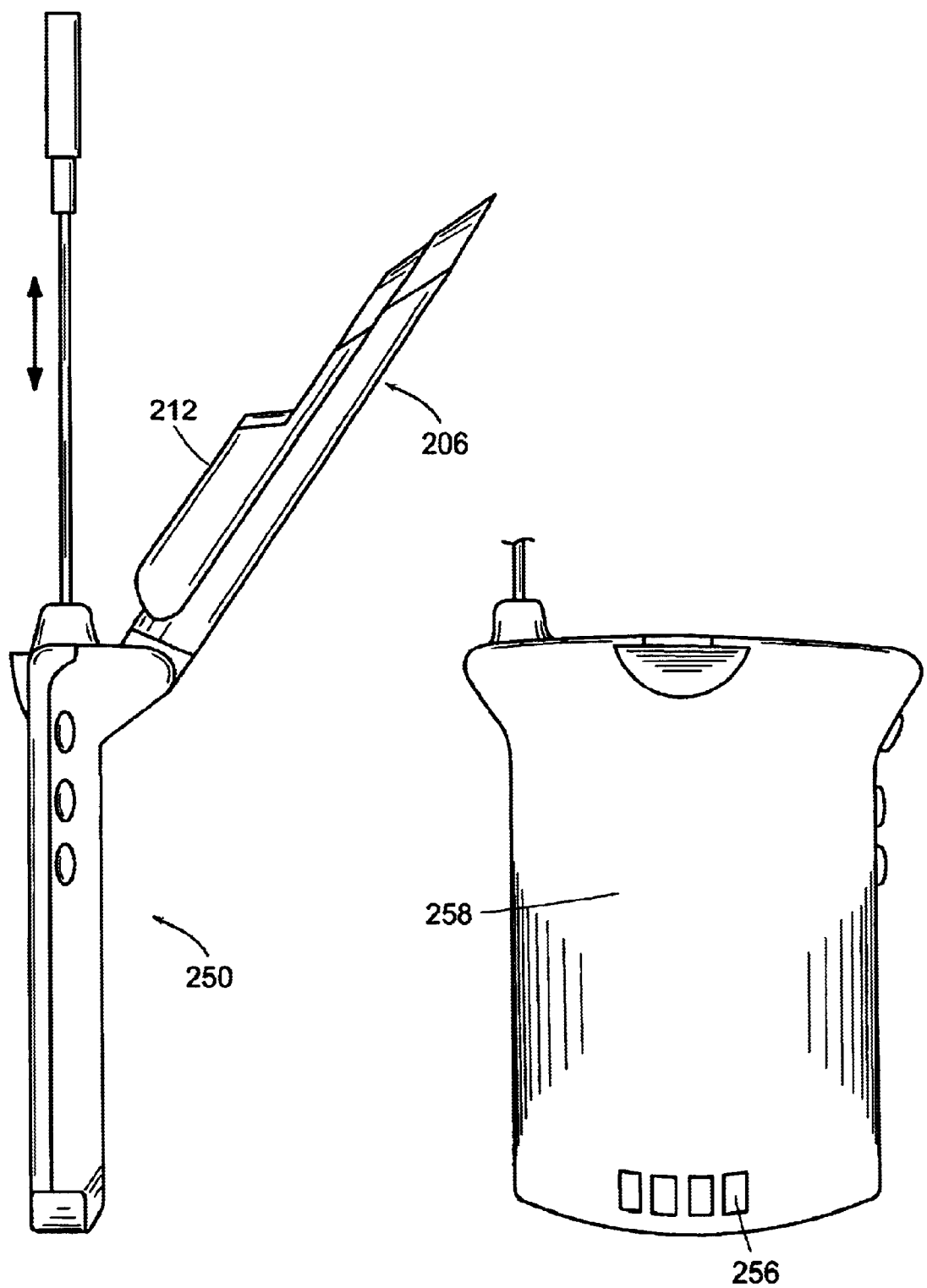

FIG. 9A shows a telephone 250 having standard features such as a display 252 and a port 254 for external communications. The modular display unit 260 shown in FIG. 9B is configured to dock with the telephone 250 wherein the connector 268 is inserted into port 254 and latch 264 connects to the top of the base section of telephone 250 thereby connecting the microdisplay within display subhousing 262 to the receiver within the telephone 250. The subhousing 262 pivots relative to main housing 270 to allow viewing of the display through lens 267 during use of the telephone 250. In this embodiment, telescoping camera 215 can extend from subhousing 262. Base 270 includes a second battery, drive electronics for the LED backlight LCD display on activation switch 266. FIG. 9C is a sideview of telephone 250 showing the battery housing 212 on the opposite side from the speaker 206. Back panel 258 is shown in the rear view of FIG. 9D along with second battery contacts 256 exposed thereon. When the telephone 250 is docked in unit 260, the surface 258 abuts surface 265 and connectors 264 are positioned against contacts 256 such that the telephone can be powered by the second battery in housing 270.

Figure 9E:
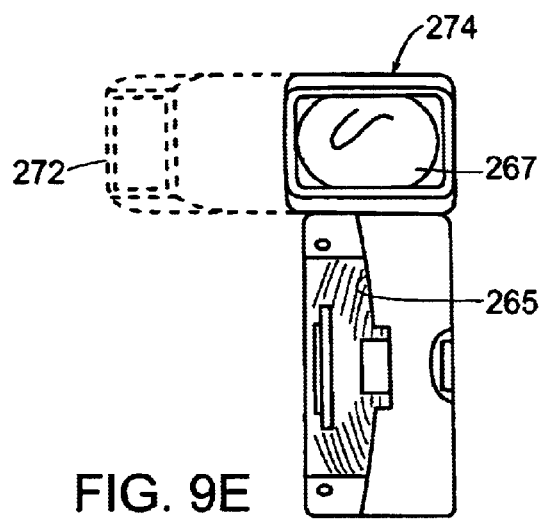
Figure 9F:
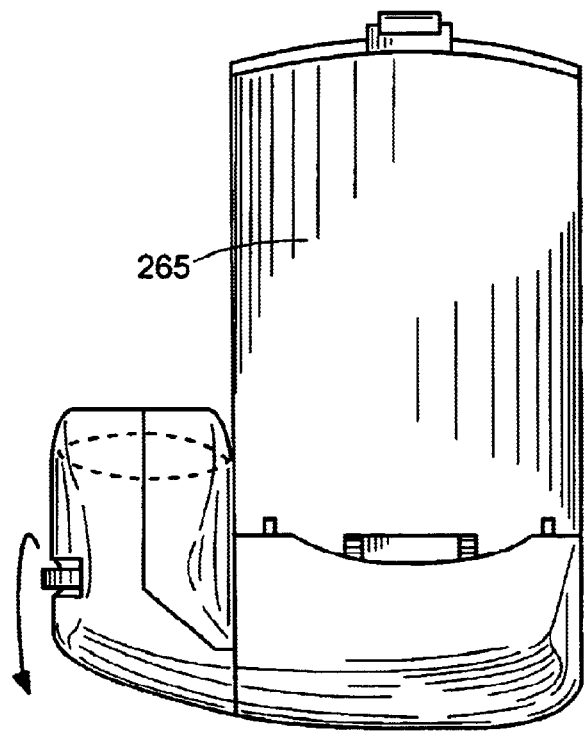
Figure 9G:
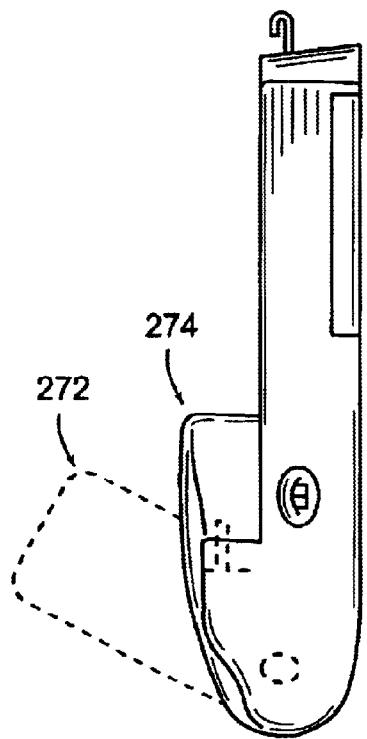
Figure 9I:
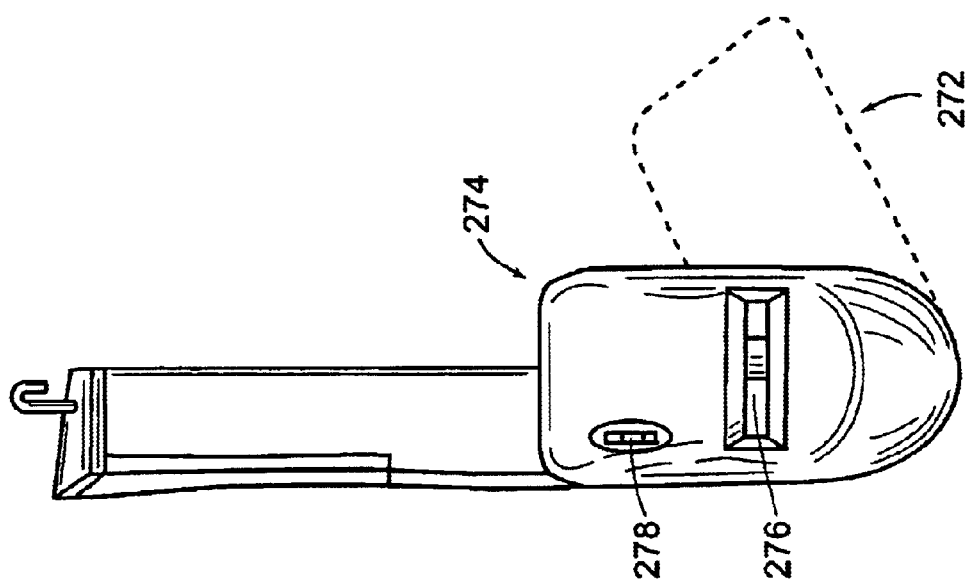
Figure 9H:
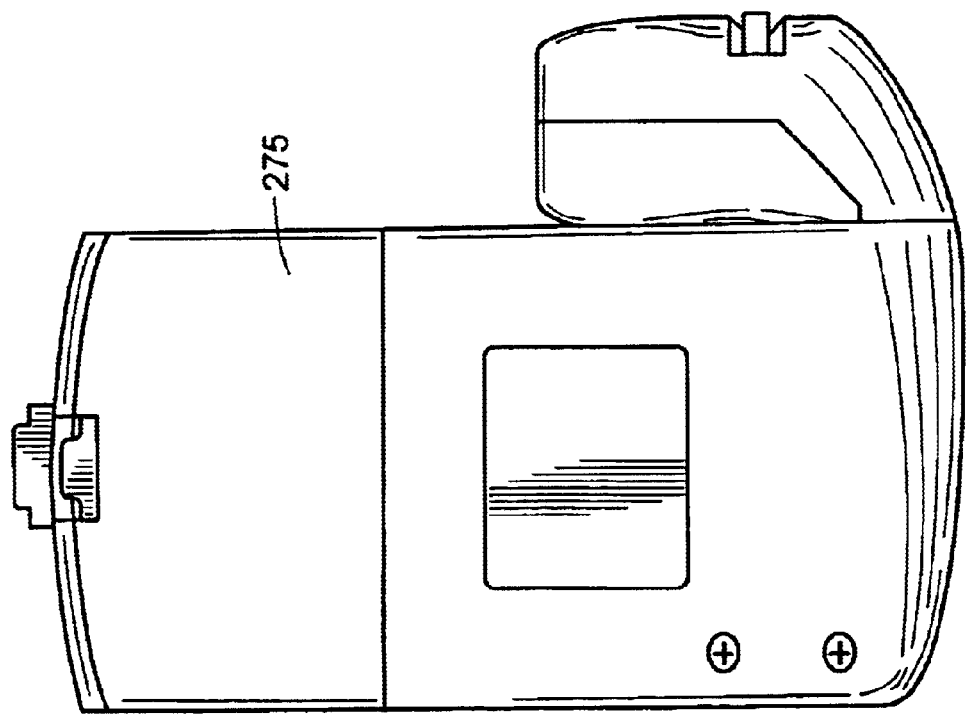

FIGS. 9E, 9F and 9G illustrate top front and side views of unit 260 where the subhousing is shown in both its storage position 274 and its viewing position 272. FIGS. 9H and 9I show back and second side views of unit 260 and illustrate battery access panel 275, focus knob 276 and control buttons 278 that are exposed on the side of housing 270 when the sub-housing 262 is rotated to the viewing position 272.

Figure 9J:
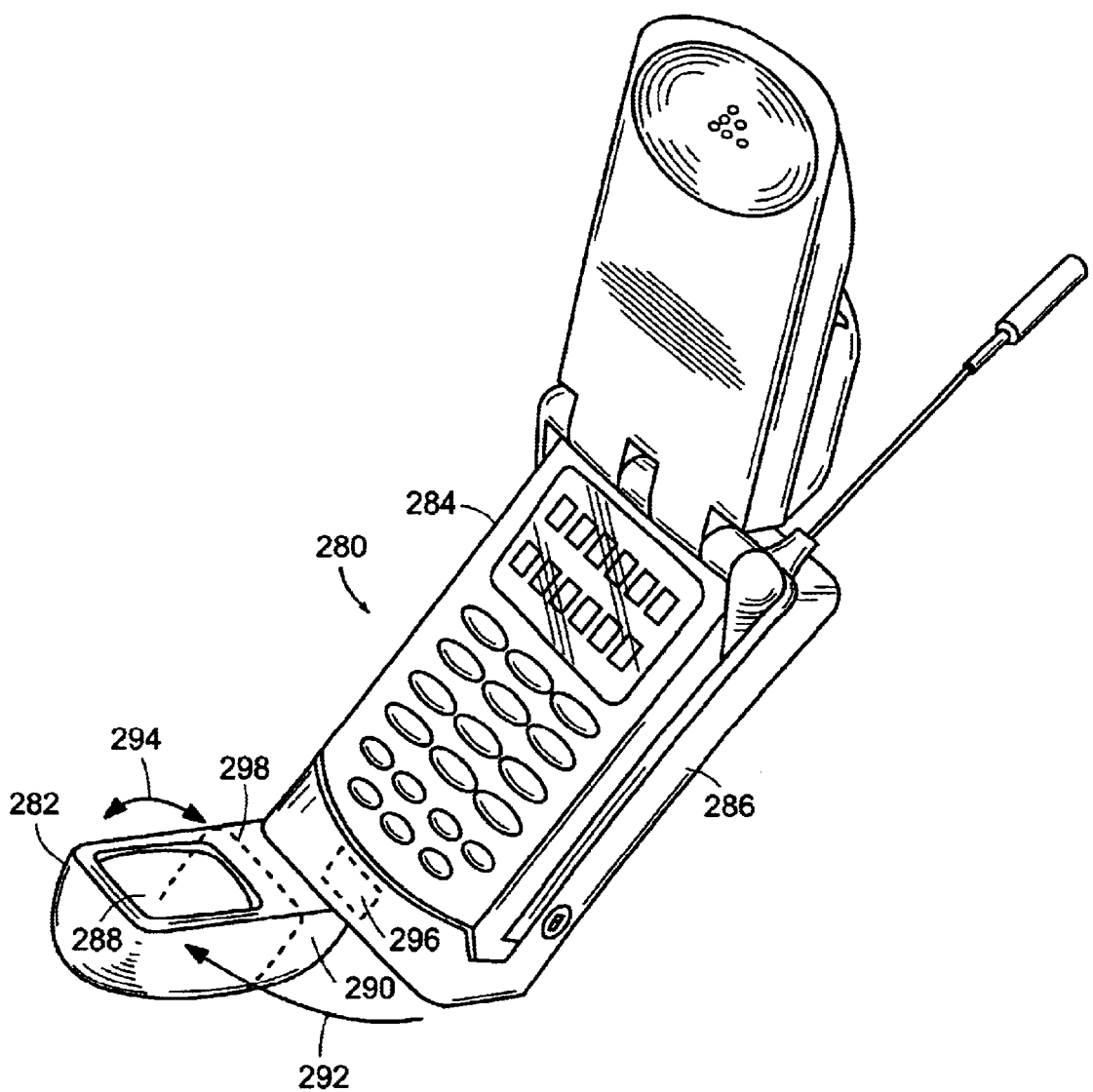

In the embodiment 280 shown in FIG. 9J the telephone 284 is shown docked with housing 286. However in this embodiment, the display is mounted within a pivoting unit 282. The user can swing unit 282 along arc 292 to expose viewing lens 288. The user can also swing the display around a second orthogonal axis 294 at joint 298 so that the display rotates into a variety of viewing positions relative to hinge section 290.

FIGS. 10A and 10B illustrate another docking system for a portable telephone. The element 286 of system 300 includes mouse controls 303 that can be positioned on the front or rear of the element. The telephone, which can incorporate a touchpad 301, nests within the docking element 286 and is electrically connected to the element through a connecting port as described previously. Part of the base section houses a display module 306 having a display window 309 and can optionally also include a CCD or CMOS camera 310 in module 305. The modules 305, 306 can be manually or electrically actuated to move between a cavity within the base element and an operating position outside of the base section. Each module 305, 306 can rotate around axis 308 when in the operating position for easy repositioning by the use. The display can be used as a view finder for the camera. The base section can optionally rotate around the longitudinal axis of the base section for left or right handed use.

The docking element 286 can also include a PCMCIA card slot 302 and a touchpad on the rear panel adjacent the docking element battery. Slot can receive an image data card on which data can be stored or retrieved. The slot and associated circuitry can thus receive a smart card that can be used to charge or pay for phone calls or information on the card can be shown on the display or transmitted. Slot 302 as described herein can also be included in a wireless telephone with an integrated display as shown in FIG. 8.

Figure 11:
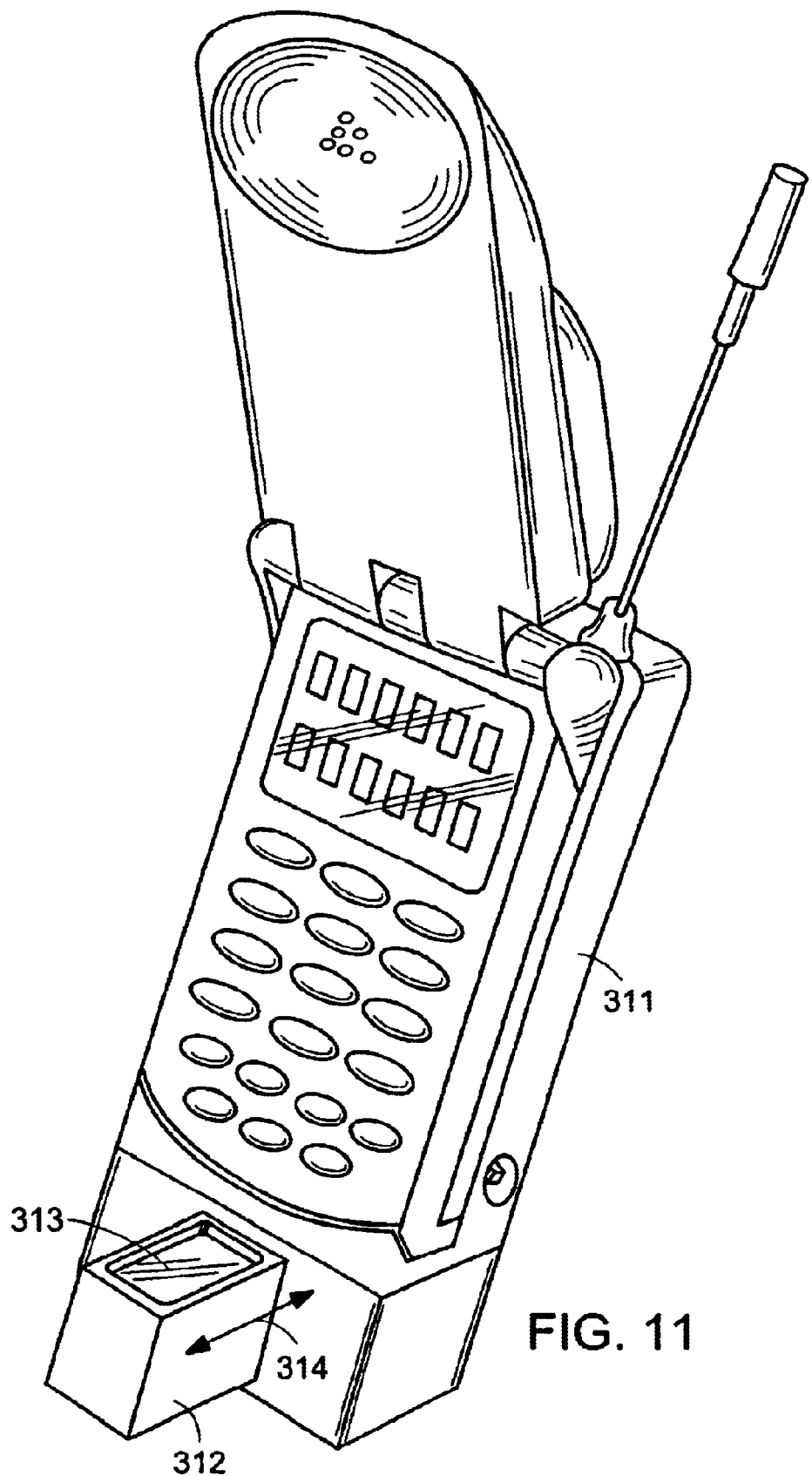
FIG. 11 illustrates another preferred embodiment of a telephone microdisplay system in accordance with the invention.

FIG. 11 illustrates another preferred embodiment of a docking element 311 in which the display module 312 can be moved along axis 314 between a position within the base section to an operating position outside the docking element housing. The image viewed through lens 313 can be inverted for left or right handed use.

Figure 12B:
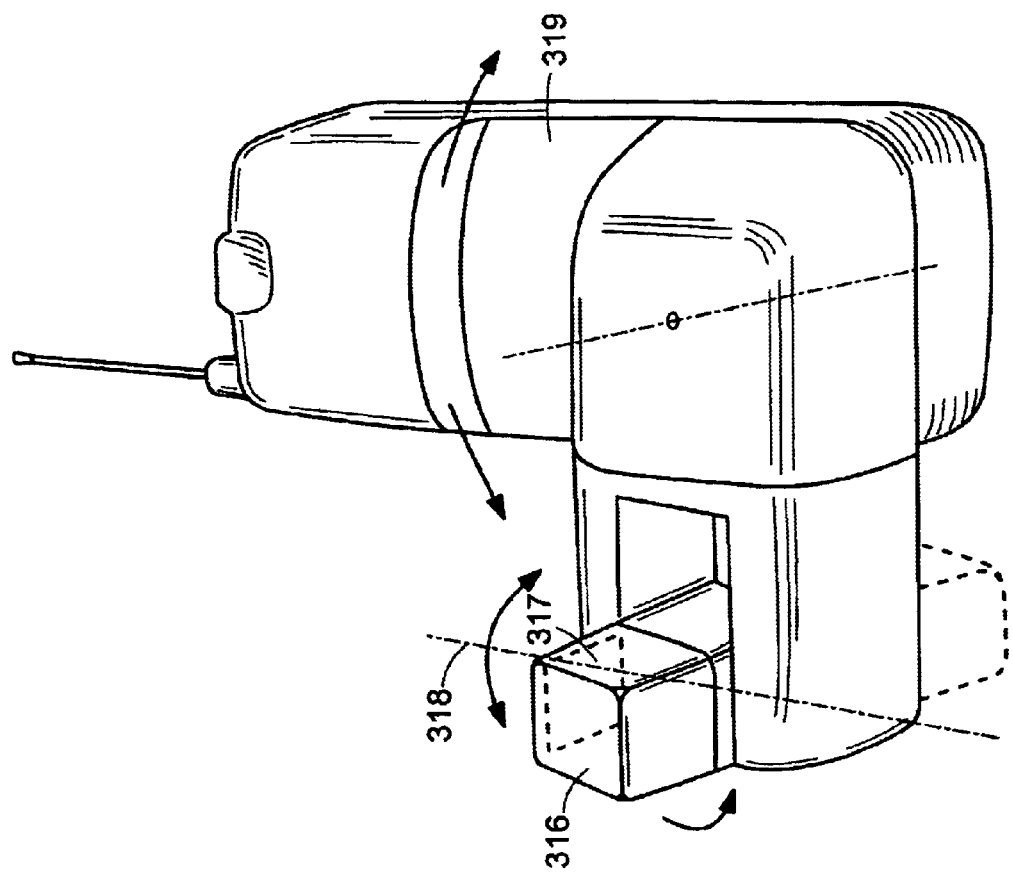
FIGS. 12A and 12B illustrate rear views of another preferred embodiment of a telephone microdisplay.
Figure 12A:
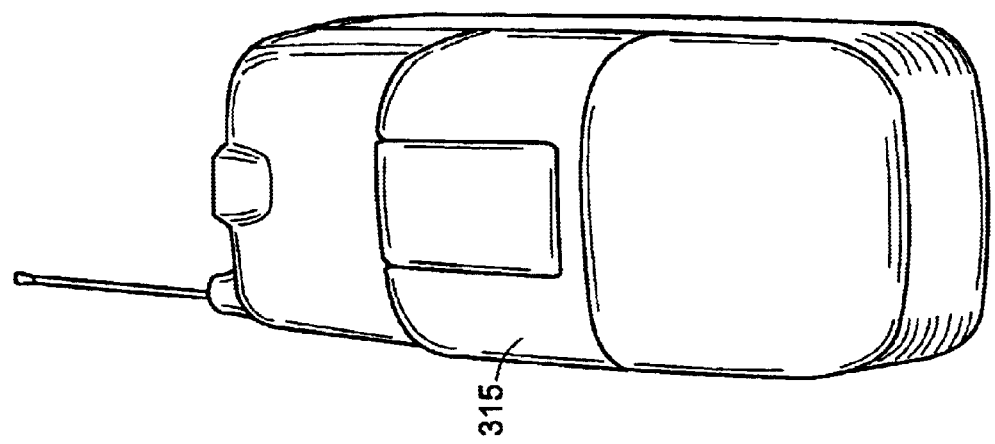

Another preferred embodiment of the docking element is illustrated in FIGS. 12A and 12B. The element 315 has a rotating portion on the back of the telephone and includes a display module 316 which rotates around a second axis 318 to expose the viewing port 317. The module 316 can rotate around a third axis for positioning by the user.

Another preferred embodiment of the docking element is illustrated in connection with FIGS. 13A–13F. In this embodiment a cellular phone 552 docks with a docking element 550. Docking system 550 has a two display module ports 554 and 556. Either port 554 or 556 can receive the display module 580 that is illustrated in FIG. 13F. FIG. 13A illustrates port 554 on a first side of system 550 and docking port connector access 571. FIG. 13B shows a second port 556 on a second side of the docking system as well as a joystick element 560, a mouse button 558 and an external mouse port 562.

FIGS. 13C and 13D show the docking element 550 without the phone 552. These illustrate the phone docking connector 566 and the phone retention clip slot 564.

FIG. 13E shows an exploded view with the housing 550 having top 551 and bottom 553. The housing contains the joystick 561, the phone port connector 565, circuit board 570, docking port connector 572 clip 563.

The display module housing 580 has a connector 586 that electrically connects the display circuit to the circuit board 570. A circular element 584 connects to each port 554, 556 and permits the housing 580 to rotate relative to system 550 so that the viewing window 582 can be positioned by the user.

Figure 13G:
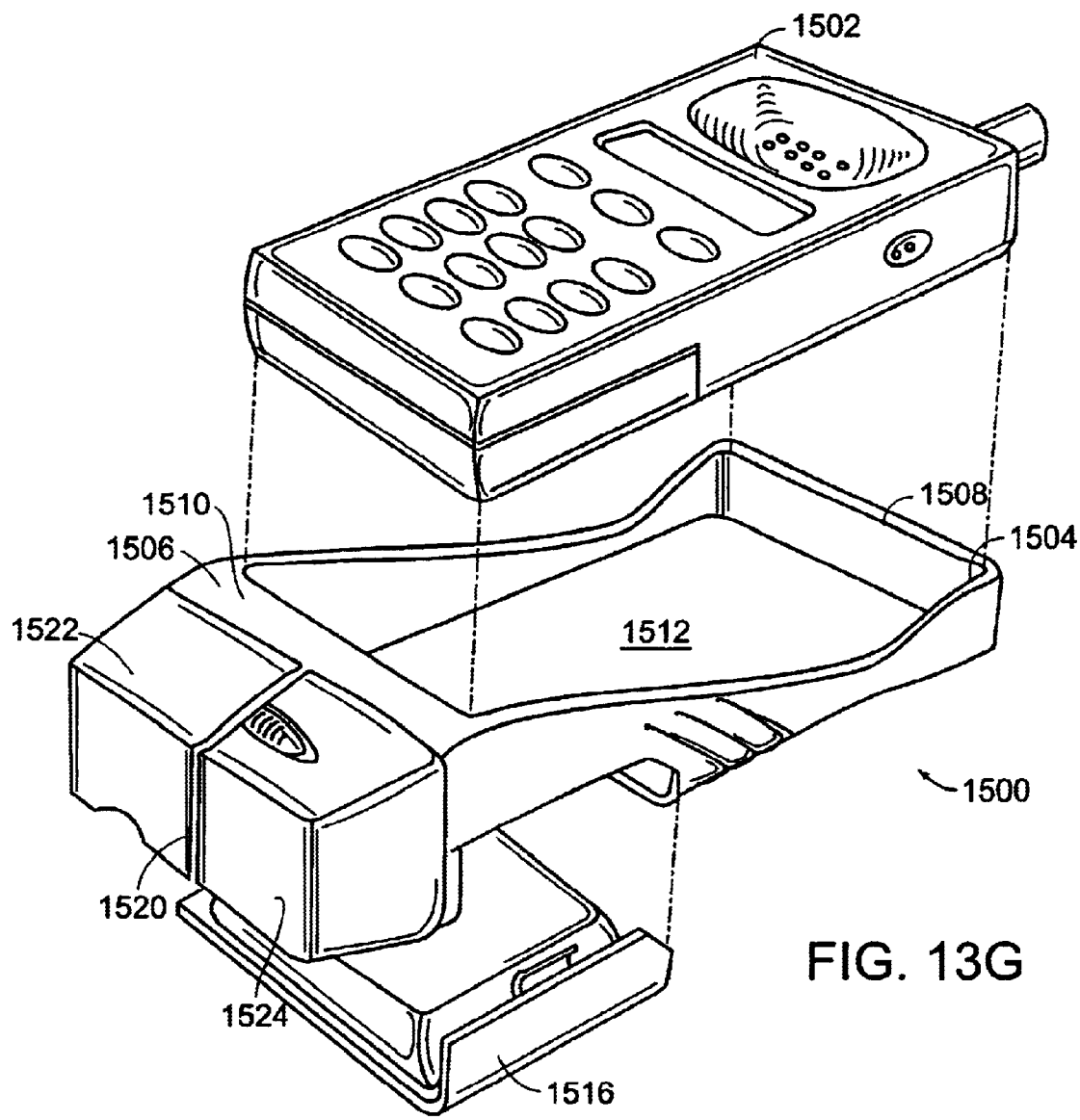
Figure 13H:
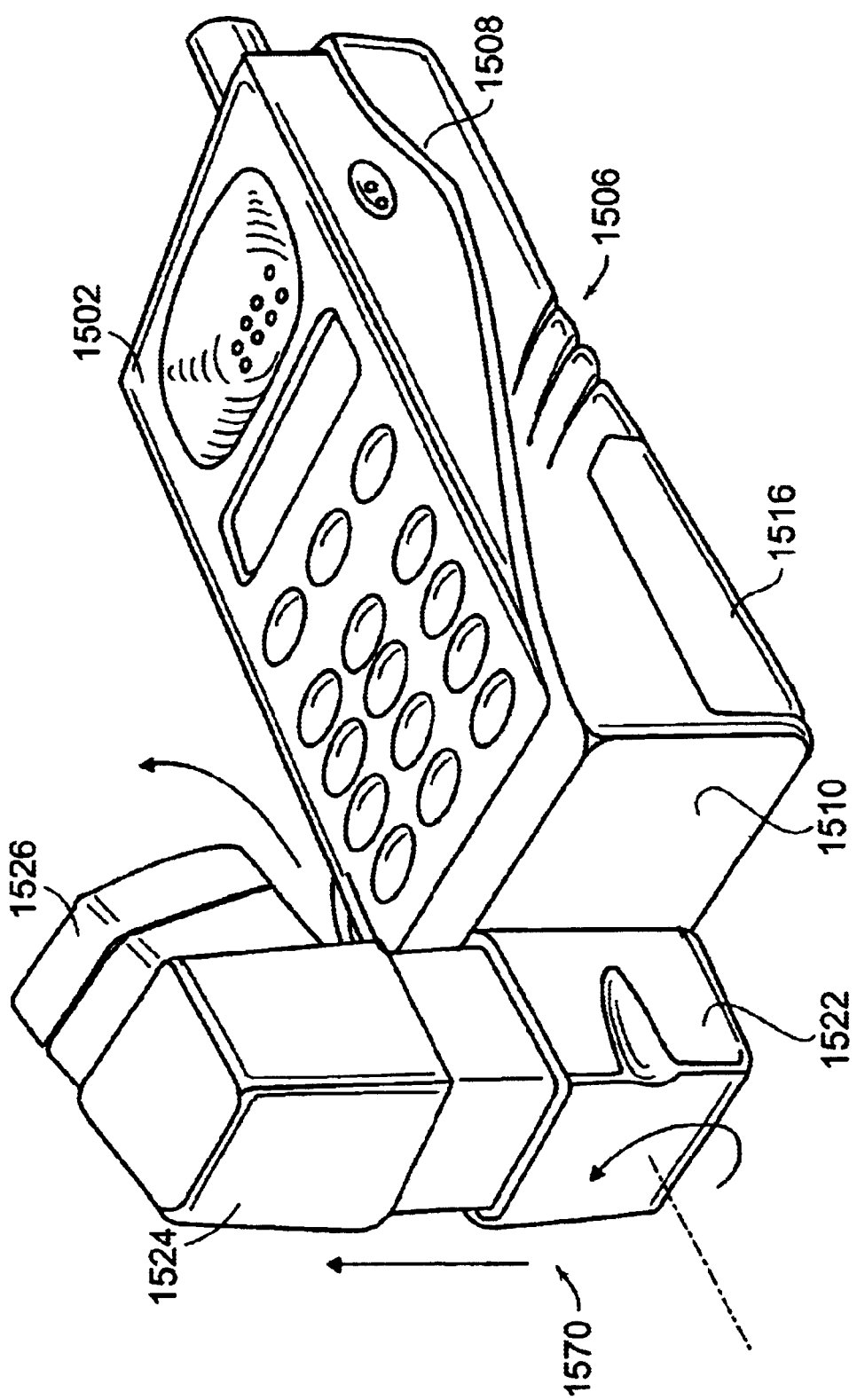
Figure 13I:
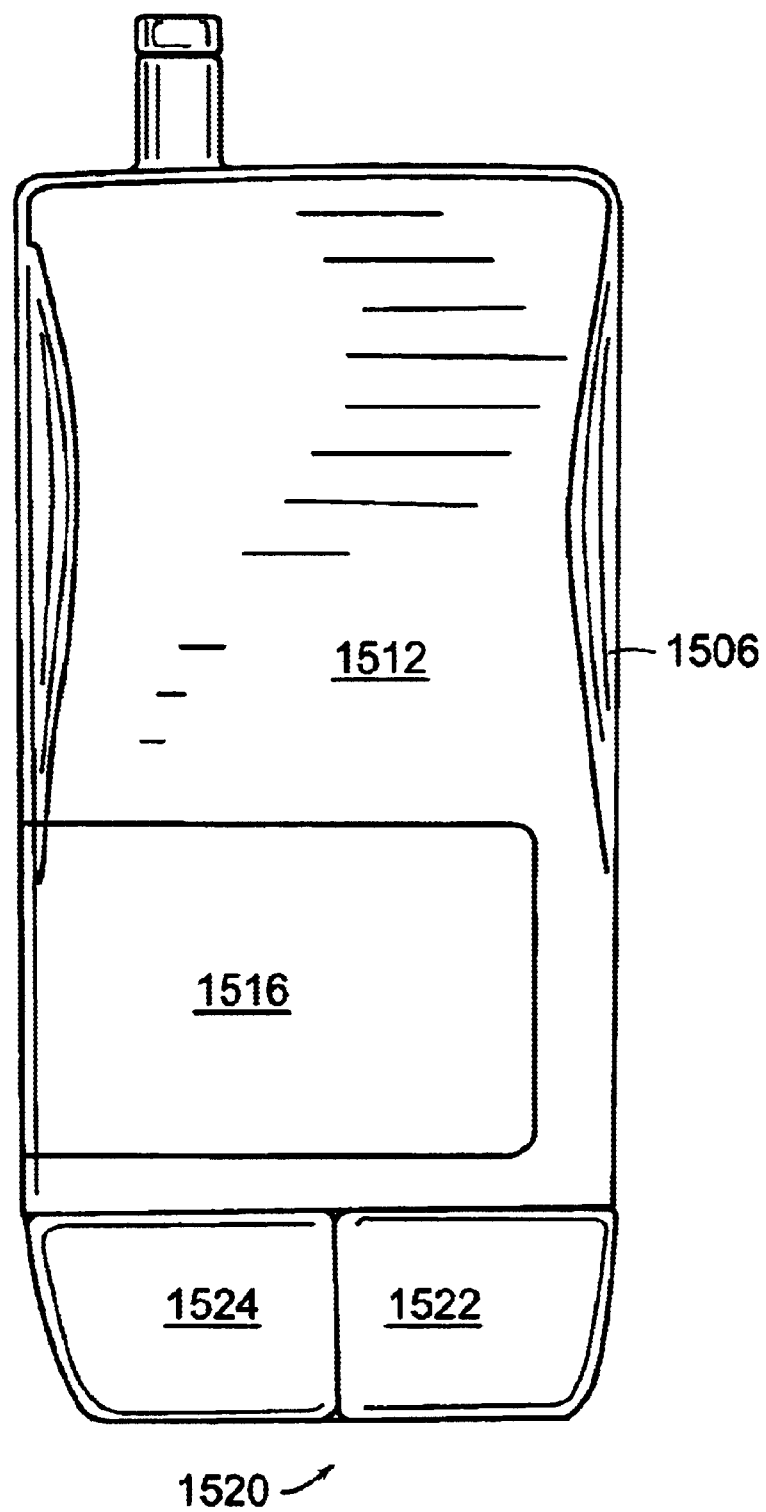

An alternative display docking system 1500 is shown if FIGS. 13G–13I. A cradle 1504 in a docking element or station 1506 receives the cellular phone 1502. The cradle 1504 is formed by a pair of side rails and a top rail 1508, in addition to the base 1510 and the bottom 1512. The docking station 1506 is adapted to receive a battery 1516 as best seen in FIGS. 13G and 13I. The battery 1516, which is received on the bottom of the docking station 1506, is capable of powering both the docking station 1506 and the cellular phone 1502.

Still referring to FIGS. 13G–13I, the docking system 1500 has a display subhousing 1520 which pivots relative to the base 1510 of the docking station 1506. The display subhousing 1520 has a foot pivot portion 1522 that rotates relative to the base 1510 of the docking station 1506 and an arm 1524. The arm 1524 extends laterally from the foot pivot portion 1522 in the operating position, as seen in FIG. 13H. The arm 1524 has a viewing housing 1526 with a lens, which moves outward, therein spacing the lens from the microdisplay located in the arm 1524.

Figure 13J:
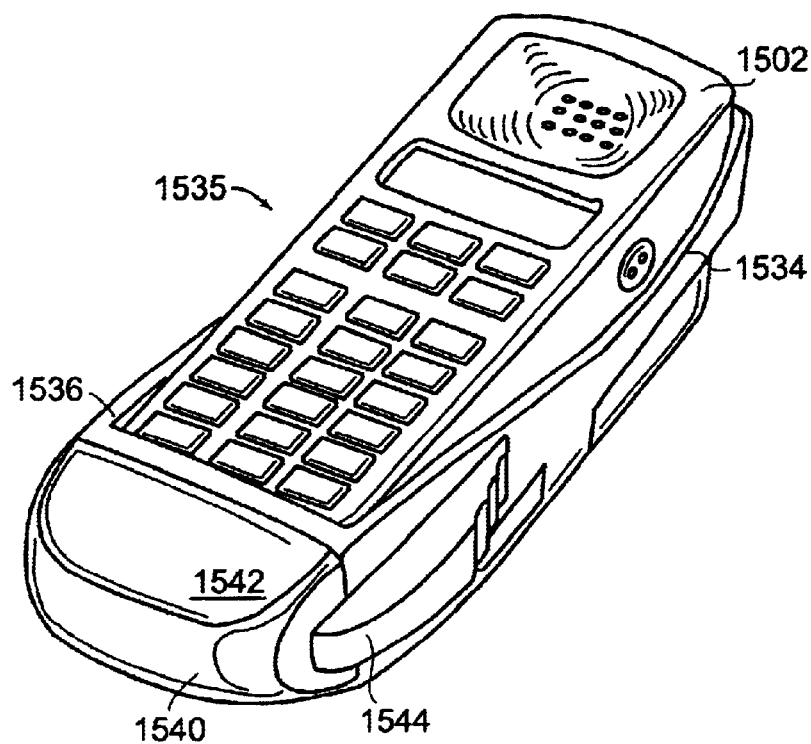
Figure 13K:
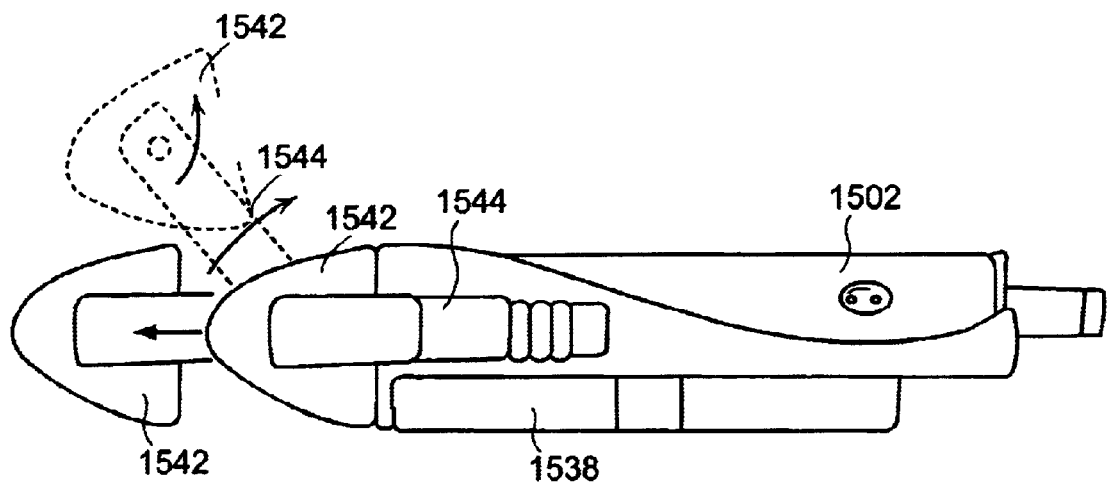

FIGS. 13J and 13K show another alternative display docking system 1530. The display docking system 1530 has a cradle 1534 on the docking station 1536 similar to the embodiment shown in FIGS. 13G–13I. The docking station 1536 likewise is adapted to receive a battery 1538 capable of powering both the docking station 1536 and the cellular phone 1502.

Still referring to FIGS. 13J and 13K, the docking system 1530 forms a handset and has a display subhousing 1540 which has a display pod 1542 and a pair of sliding arms 1544. The display subhousing 1540 moves relative to the docking station 1536 by the arms 1544 moving translation relative to the side rails of the station 1536 as represented in FIG. 13K. The arms 1544 then are capable of rotating relative to the docking station 1536 as illustrated in phantom in FIG. 13K. The display pod 1542, which houses the microdisplay and a lens, can rotate relative to the arms 1544 to position the microdisplay for viewing.

Figure 13L:
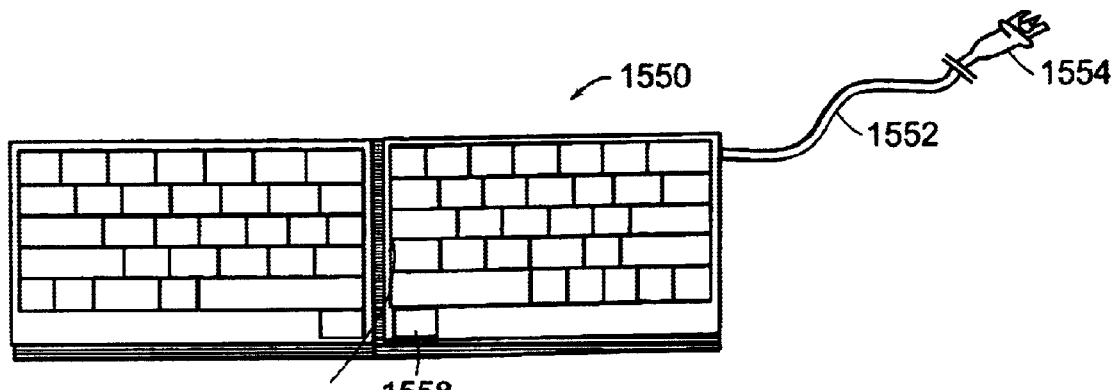
FIGS. 13L–13N illustrate a folding keyboard with a touchpad for uses with phone, display docking system, or pager.
Figure 13M:
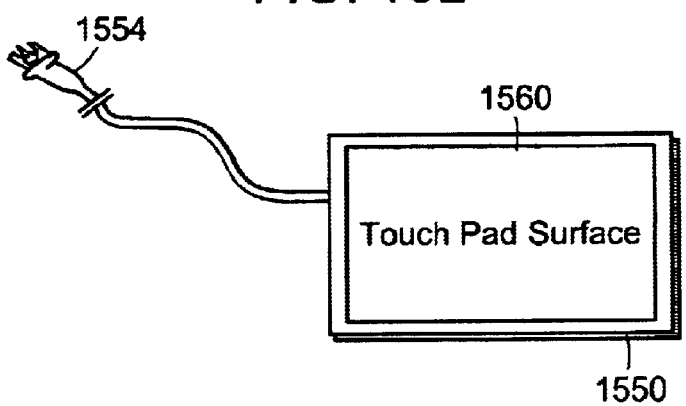
Figure 13N:
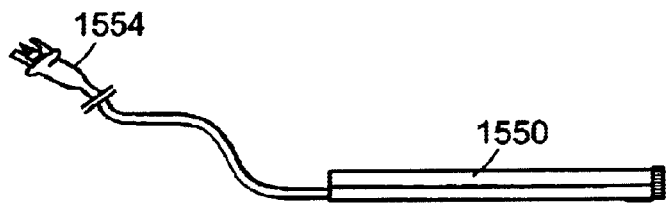

FIG. 13L illustrates a keyboard 1550 having a conventional key layout. The keyboard has a cord 1552 with a plug 1554 adapted to be received by a data transmission system, such as a docking station, a cellular telephone or a pager. The keyboard 1550 has a mouse track point joy stick 1556 and a pair of mouse buttons 1558. The keyboard 1550 is capable of folding such that its thickness is less than 15 millimeters as illustrated in FIG. 13N. The keyboard 1550 can have a touch pad 1560 on one side, such as shown in FIG. 13M, for taking notes or drawing inputs.

Figures 13O, 13P:
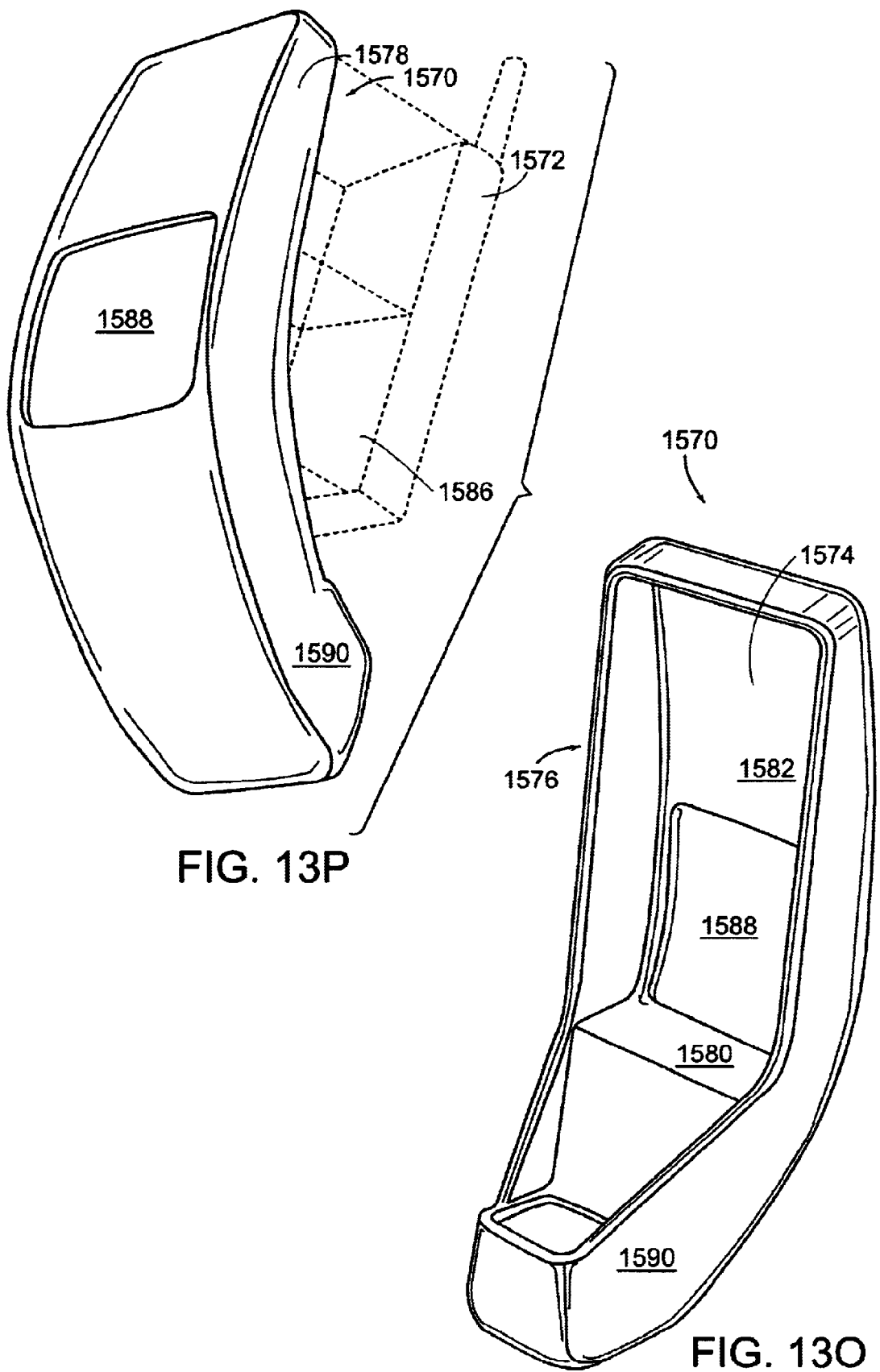

An alternative display docking system 1570 is shown in FIGS. 13O–13P. A cradle 1574 in a cradle portion 1578 of a docking element or station 1576 receives a cellular phone 1572, shown in phantom in FIG. 13P, of the display docking system 1570. The cradle 1574 is formed by a pair of side rails and a top rail, in addition to a base 1580 and a back 1582. The back 1582 of the cradle portion 1578 has a hole 1588 such that the a battery 1586, as shown in phantom in FIG. 13P, of the cellular phone 1592 can be accessed when the phone 1592 is in the cradle 1584.

Still referring to FIGS. 13O–13P, the docking system 1570 has a display subhousing or portion 1590 which projects downward and outward away from the base 1580 of the cradle 1574. The display portion 1590 includes the microdisplay with a lens 1594.

Figure 13R:
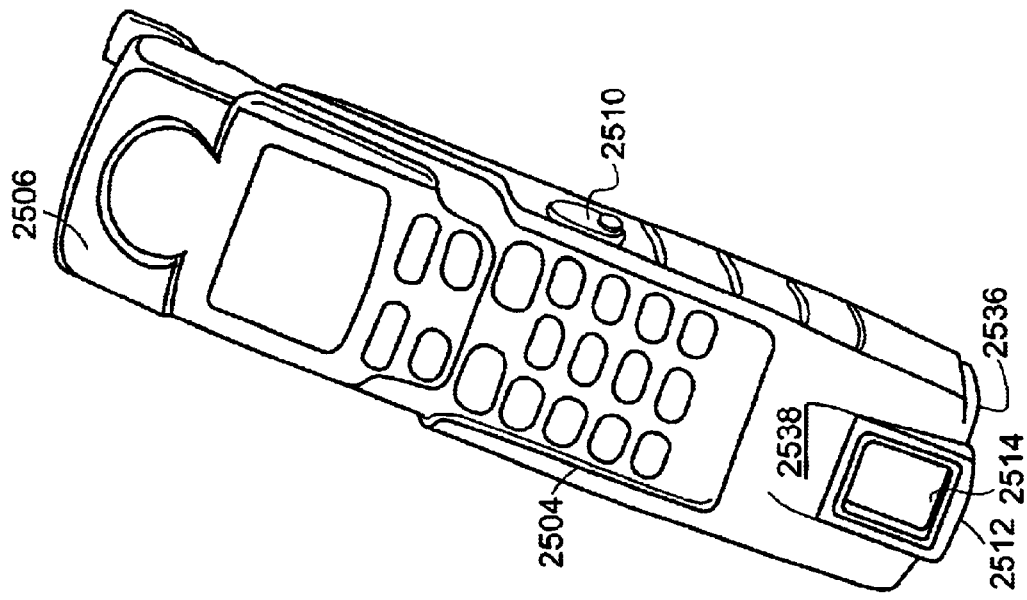
Figure 13Q:
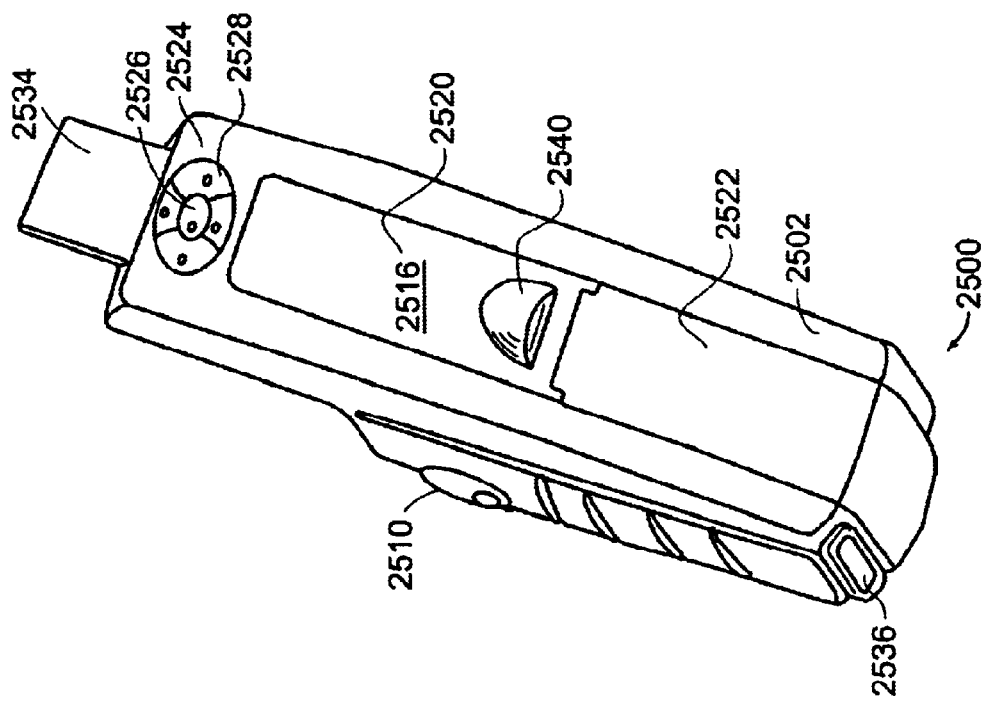

FIGS. 13Q–13S illustrate another preferred embodiment of a docking system 2500. A docking element or station 2502 is shown in a bottom back perspective view in FIG. 13Q. A cradle 2504 in the docking element or station 2502 receives a cellular phone 2506, shown in FIGS. 13R and 13S. The cradle has sidewalls 2507 that extend partially up the sides of a telephone in the docked position, as well as a front border 2509 that partially envelopes the telephone while exposing the telephone keypad.

The docking element 2502 has a latch mechanism 2508 on the right side, the left side in FIG. 13Q, for securing to the side of the cellular phone 2506. The latch mechanism 2508 is released by a button 2510 located on the side of the docking element 2502.

The docking system 2500 has a display subhousing 2512 as seen in FIG. 13R in a storage position in a base 2538 of the docking element 2502. The display subhousing 2512 houses the microdisplay and a lens 2514. In a preferred embodiment, the lens 2514 for the microdisplay is not covered in the storage position, as seen in FIG. 13R. In this embodiment, images can also be shown on the display in the storage position.

The display subhousing 2512 moves relative to the docking station or element 2502. The display subhousing 2512 is carried by an extension 2516.

The back 2518 of the docking element 2502, the portion that underlies the back of the cellular telephone 2506, includes the extension 2516 as seen in FIG. 13Q. The extension 2516 has a first portion 2520 and a second portion 2522. The second portion 2522 of the extension 2516 is rigidly attached to the display subhousing 2512.

The docking station 2502 has a five key cursor control and select 2524. The center key 2526 is for selecting and the four surrounding keys 2528 are for movement of the cursor displayed on the microdisplay. The five key cursor control and select 2524 is located above the extension 2516.

At the top 2530 of the back 2518 of the docking station 2500, a memory card slot 2532 is located for receiving a memory card 2534 above the five key cursor control and select 2524. The docking station 2500 also has an accessory port 2536 on the right side of the base 2538 of the docking station 2500, the left side in FIG. 13Q.

The extension 2516 is moved from the storage position, as seen in FIG. 13Q, to an operating position, as seen in FIG. 13S, by moving the first, upper, portion 2520 of the extension 2516 downward by pushing against a raised nub 2540 at the lower end of the first portion 2520. The first portion 2520 moves laterally in a channel 2542 in the back 2518 of the docking station 2502. The second, lower portion 2522, the portion of the extension 2516 which holds the subhousing 2512, moves laterally downward and then is rotated upward into position. The extension 2516 is released from the operating position by operation of a positioning button 2544 which projects upward into the channel 2542 as the extension 2516 slides past.

Figure 13T:
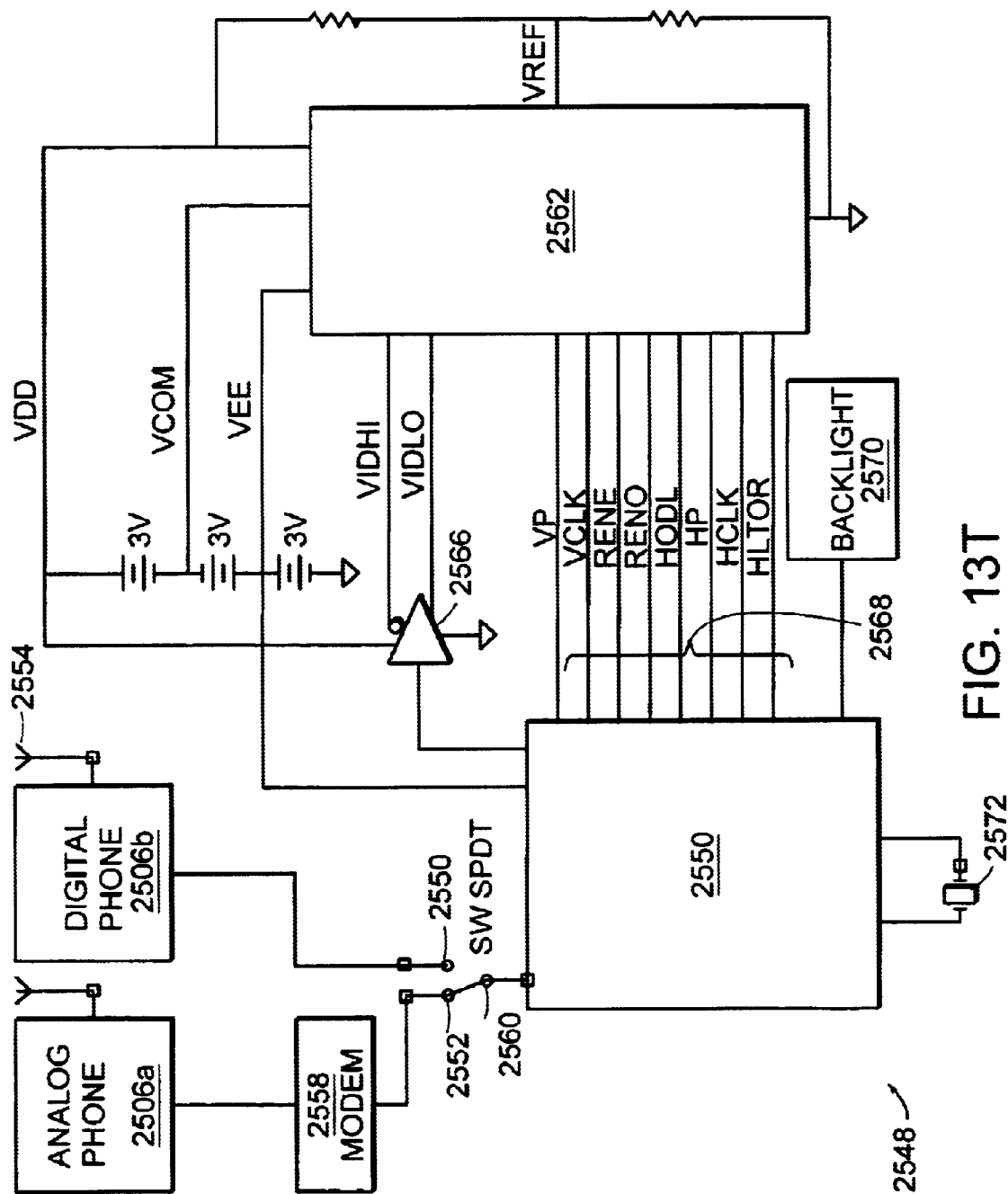
FIG. 13T illustrates an alternative embodiment of a display control circuit for a telephone or docking station capable of receiving an analog phone or a digital phone.

A preferred embodiment of a display control circuit 2548 for use in a docking system 2500 is illustrated in connection with FIG. 13T. The docking element or station 2502 has a cradle or other area for receiving or securing to the cellular telephone 2506. The docking station 2500 has input ports 2552 and 2554 for both an analog phone 2506*a* with an antenna 2556 or a digital phone 2506*d* with an antenna 2556. The inputs 2552 from an analog phone 2506*a* are conveyed through a modem 2558. A switch 2560 on the docking station 2502 selects between the digital input or the output from the modem 2558 associated with the analog phone to input into a control circuit 2550. It is recognized that the input ports can be identical that switching takes the modem in and out of the circuit depending on whether the signal is analog or digital.

The video signal is sent from the control circuit 2550 to the display 2562 through an D/A converter and a buffer/inverter 2566. The buffer/inverter 2566 sends the video straight through the buffer 2566 to get VIDLO (Video low) and through the inverter 2566 to get VIDHI (video high). The display 2562 is controlled through a plurality of lines 2568 from the display control circuit 2550.

The various voltage levels such as supply voltage-sink ($V_{EE}$), common voltage ($V_{COM}$) and supply voltage-source ($V_{DD}$) are sent to the display. In addition, $V_{EE}$ is used to power the control circuit 2550. $V_{DD}$ is used to power the buffer/inverter 2566.

The backlight 2570, which is controlled by the control circuit 2550, flashes to allow viewing the image. Similar to that discussed with respect to FIG. 2I, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point at which the flash must be terminated, is dependent on when the liquid crystal associated with the first pixel to be written of the next frame has twisted sufficiently that light from the backlight is visible to the viewer.

The display control circuit 2548 has a clock 2572 which feeds through the control circuit 2500 to synchronize the signals and control the delay times.

An alternative embodiment of the docking element or station 2502 of FIGS. 13Q–13S is shown in FIG. 13U. The docking station 2502 has a cover portion 2576 for covering the lens 2514 of the microdisplay when not in use. The cover 2576 can also be slidably mounted to the top surface of the docking element.

Figure 13W:
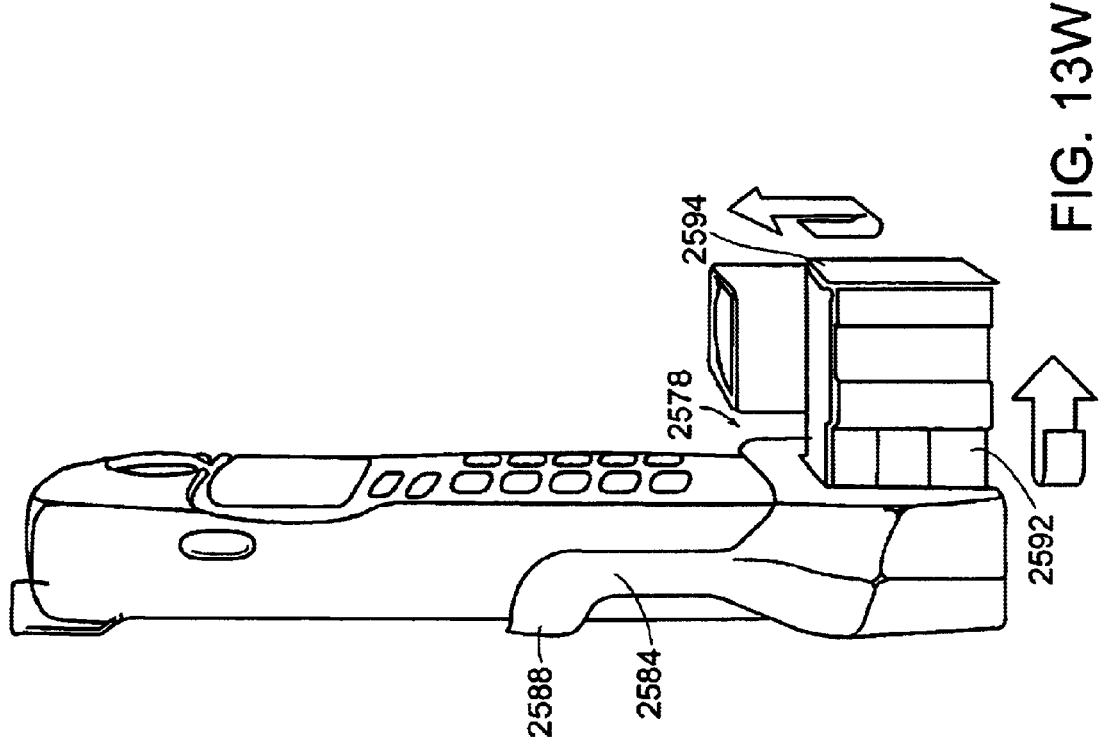
FIGS. 13V–13W illustrate another preferred embodiment of a display docking system.
Figure 13V:
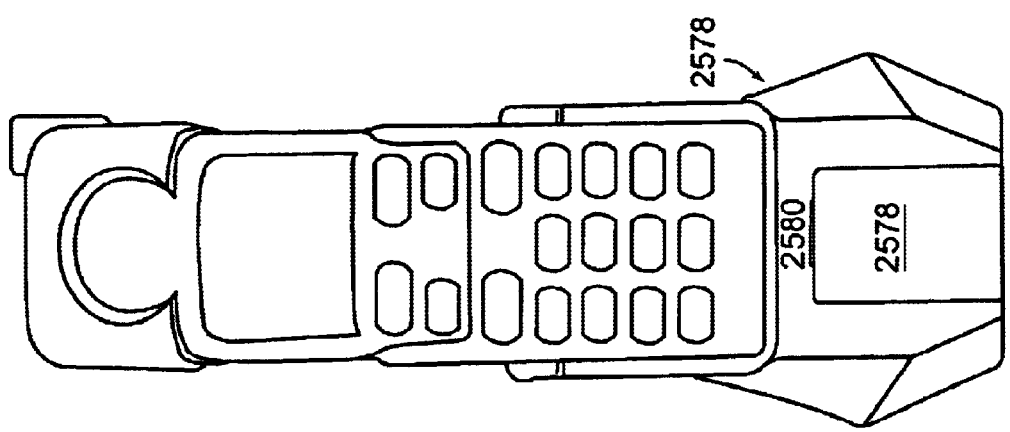

FIGS. 13V and 13W show another alternative embodiment of a docking system 2578. The docking system 2578 has a docking station or element 2580 that has a base 2582 and a cradle 2584. The cradle 2584 has a pair of arms 2586 and an underlying support bar 2588.

The docking system 2578 has a display subhousing 2590 as seen in FIG. 13V in a stored position. The display subhousing 2578 houses the microdisplay and a lens. The subhousing has an arm 2592 that extends laterally upward to space the microdisplay from the base. The arm 2592 has a viewing housing 2594 with the lens, which moves outward, therein spacing the lens from the microdisplay located in the arm 2592.

Figure 14A:
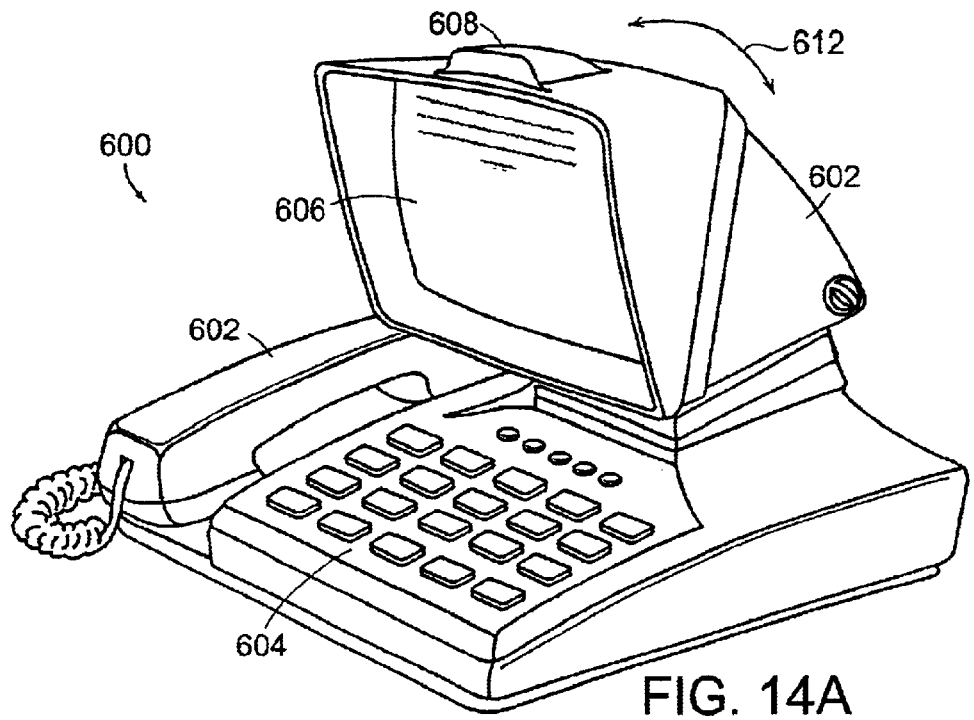
FIGS. 14A–14C illustrates the use of a microdisplay rear projection system for a telephone video conferencing station.
Figures 14B, 14C:
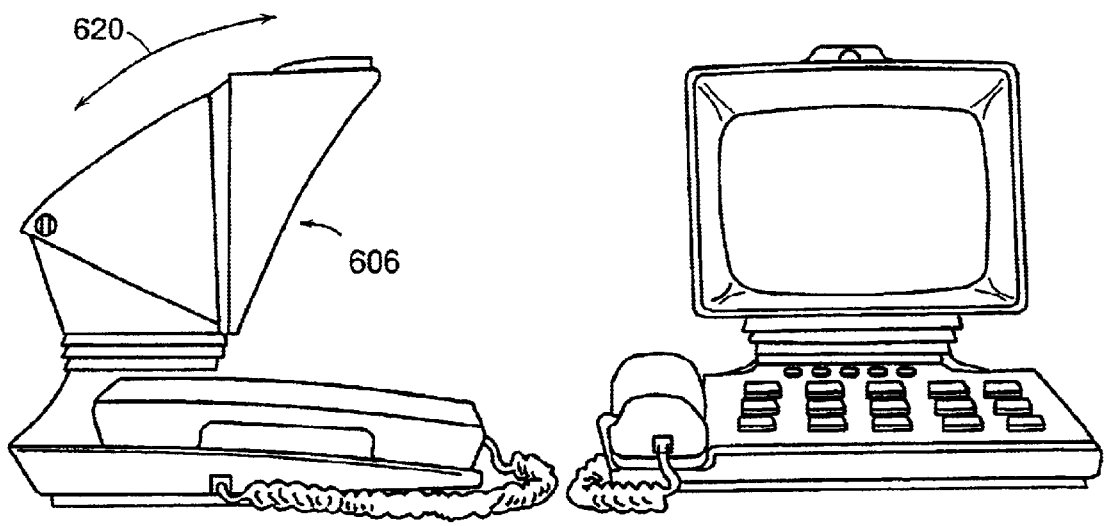

Illustrated in FIGS. 14A–14C is another preferred embodiment of a telephone system 600 incorporating the microdisplay of the present invention. In this desktop system a handset 602 is connected by cable or wireless connection to a base containing by cable or wireless connection to a base containing a standard telephone keypad 604. The display operates in a rear projection configuration within housing 610. The housing can pivot 620 or swivel 612 and includes a camera 608 so that a user viewing screen 606 can be seen by a person with a similar system. Further details regarding rear projection systems are described in U.S. Pat. No. 5,467,154, the contents of which is incorporated herein by reference.

Figure 15C:
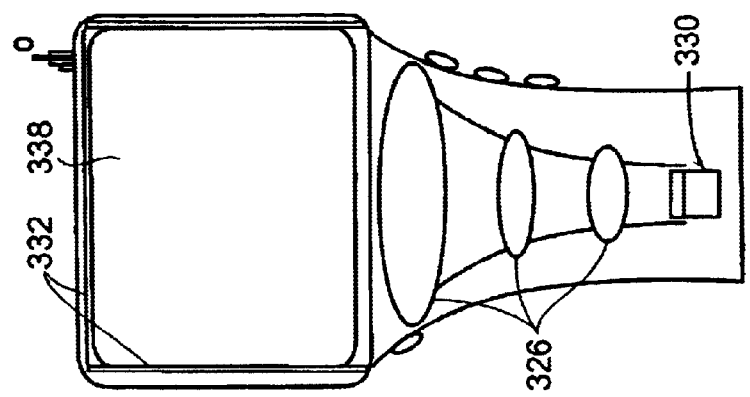
FIGS. 15A–C are side cross-sectional, front, and front cross-sectional views of a hand held rear projection display system in accordance with the invention.
Figure 15B:
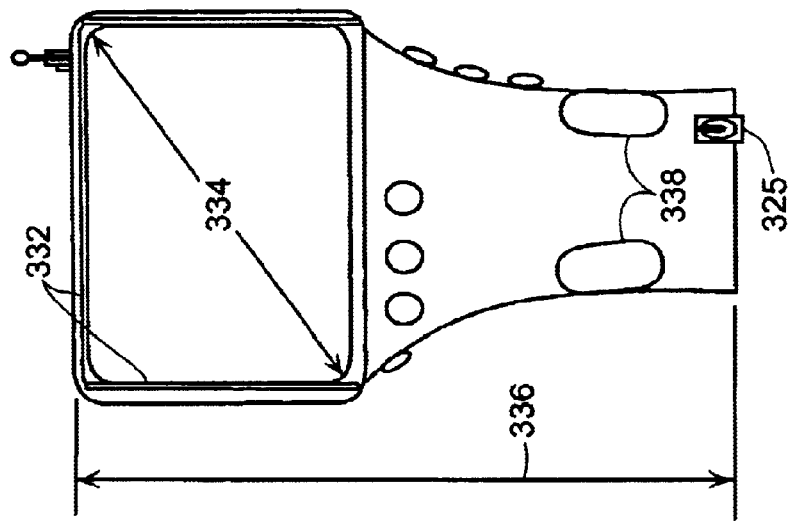
Figure 15A:
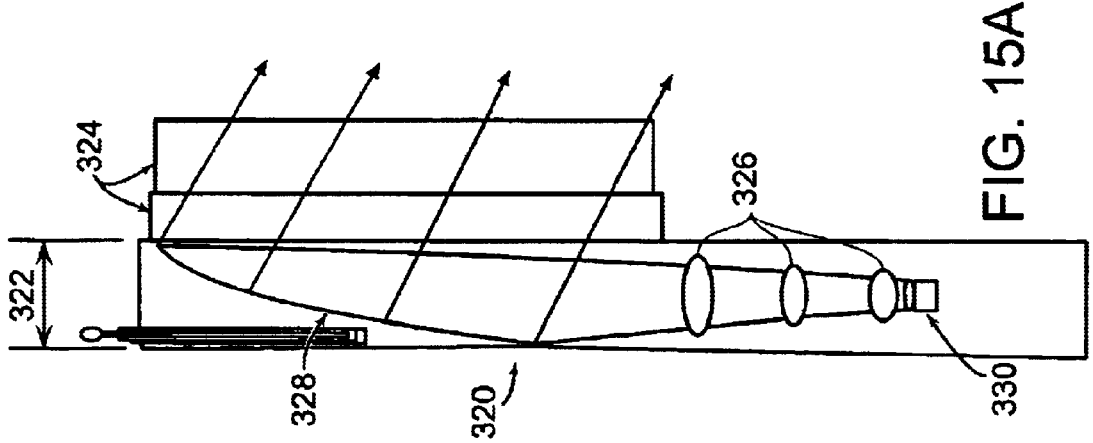

FIGS. 15A, 15B and 15C show side cross-sectional, front and front cross-sectional views of a hand-held rear projection system 320 using a microdisplay. The system 320 includes a microdisplay and backlight assembly 330, a projection lens system 326, a reflective screen 328 and optional retractable sun screens 324. The device has a thickness 322 of less than 2 inches, preferably about 1 inch, a height 336 of less than 8 inches, preferably about 5–6 inches and a display diagonal 334 of 4 inches or less, preferably about 3 inches. This provides a system volume that is preferably less than about 40 inches. The rear reflective screen 328 is shown in the front view of FIG. 13C at 338 and are surrounded on 3 sides by retractable shades 332 (324). The handle portion can include speakers 338 and an earphone jack 325.

Figure 16B:
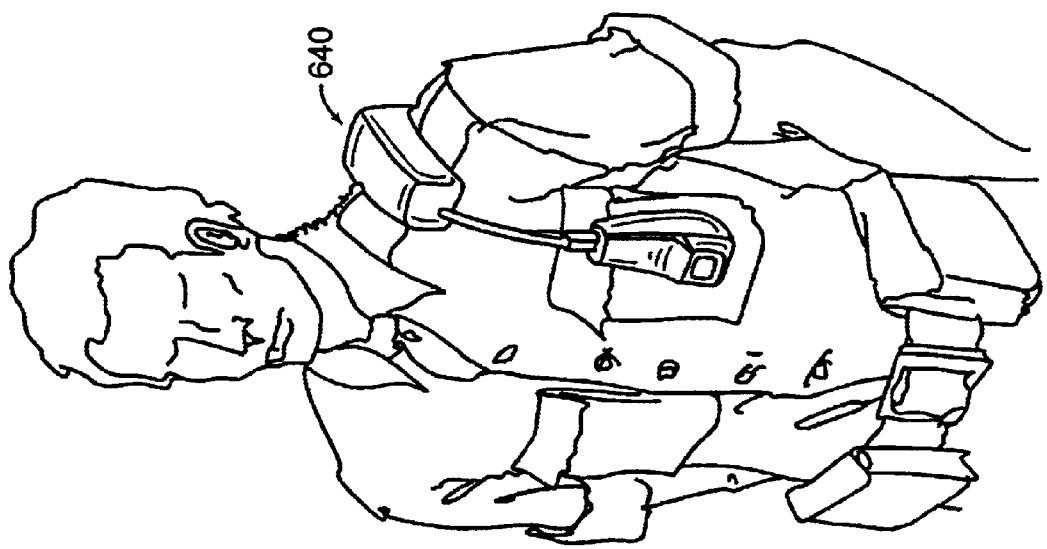
FIGS. 16A–16B illustrate a body worn, hand operated display system in accordance with the invention.
Figure 16A:
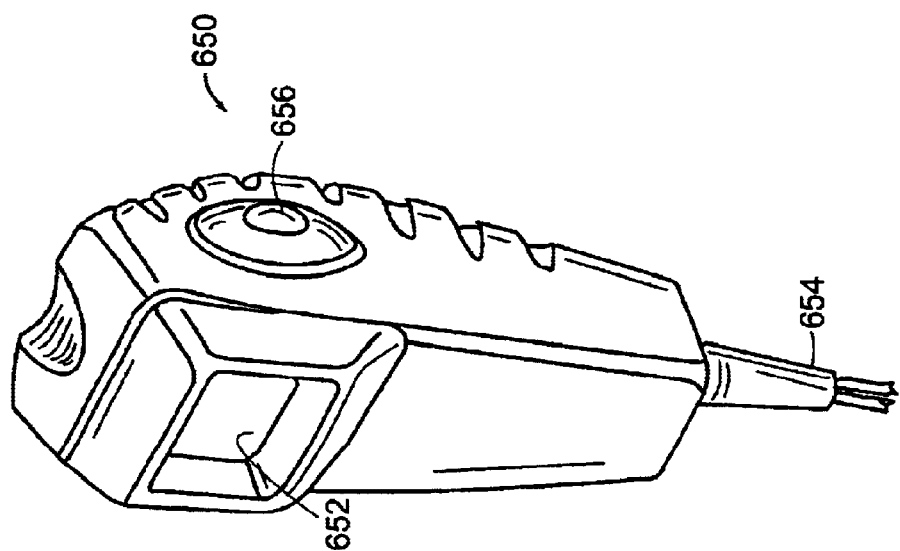

A body worn hand-held display system is shown in FIGS. 16A and 16B. The hand-held unit 650 includes a microdisplay viewed through port 652 that is controlled by control element 656 and connected by cable 654 to a body worn communications pod 640.

Figure 16C:
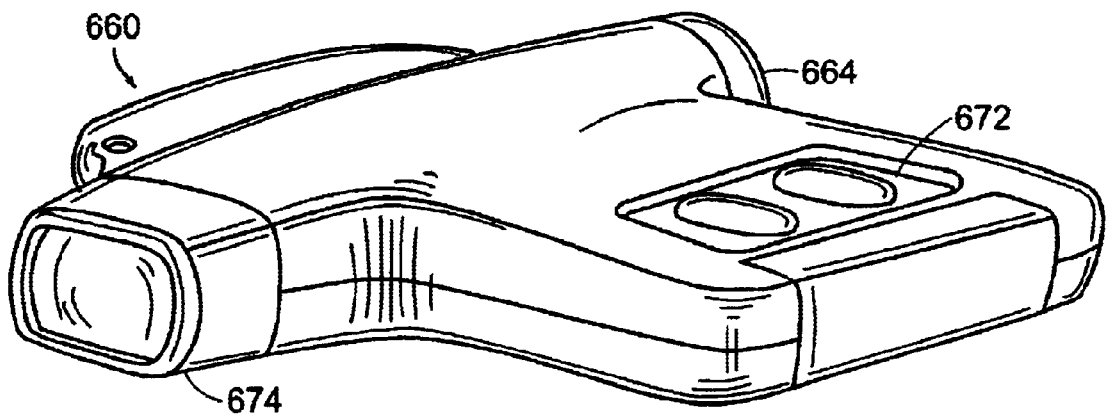
FIGS. 16C–16D illustrate the use of a microdisplay as a viewfinder for a camcorder in another preferred embodiment of the invention.
Figure 16D:
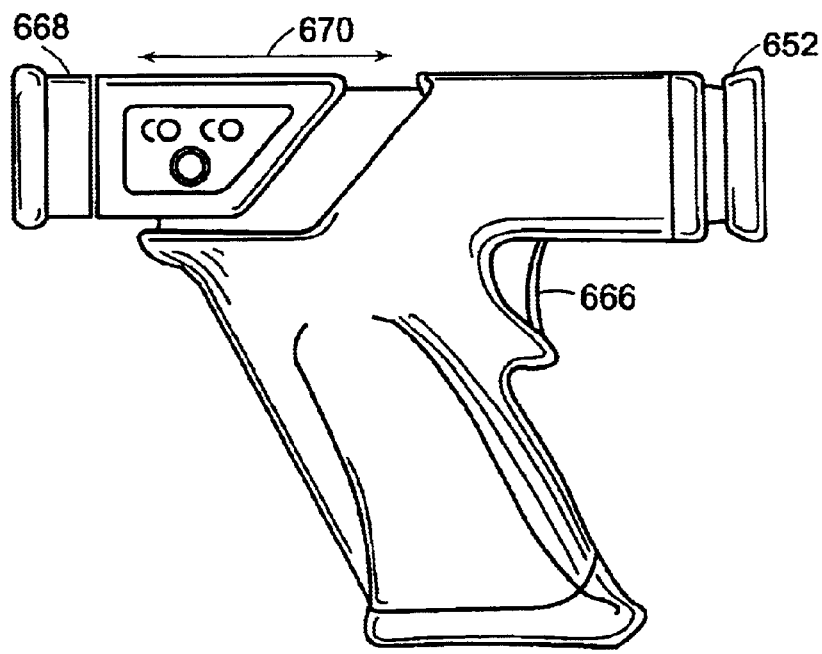

FIG. 16C illustrates another preferred embodiment of the invention including the use of a microdisplay in the viewfinder 674 of a camcorder 660. The camera lens 664 is positioned at the opposite end with tape or recording disk 672 access on one side and a control panel on the top and opposite side. Shown in FIG. 16D is a pistol grip camcorder having a sliding 670 QVGA microdisplay viewer 668 opposite to the camera lens 662. Control element 666 operates the record function of the camera for the rapid sequential recording of images.

Figure 16E:
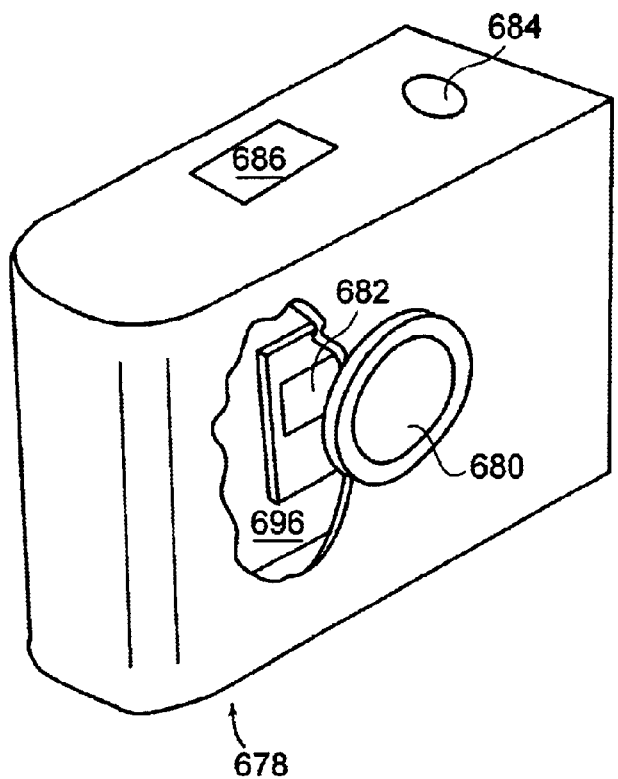
FIGS. 16E–16F illustrate the use of a microdisplay as a viewfinder for a digital still camera in another preferred embodiment of the invention.
Figure 16F:
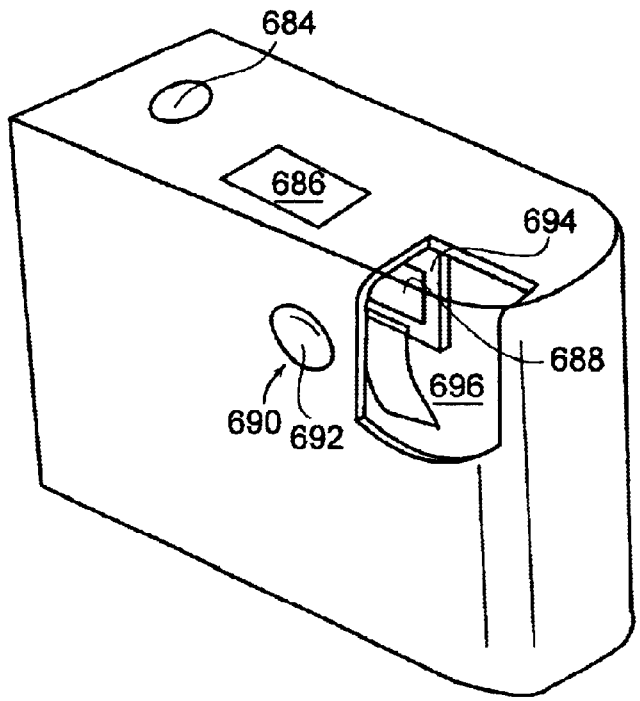

A digital camera 678 for still photographs is illustrated in FIGS. 16E and 16F. The digital camera 678 has a lens 680 located in front of an image sensor 682 and a photosensitive semiconductor such as a charge-coupled device (CCD) or CMOS image sensor. Interposed between the lens 680 and the image sensor 682 is a shutter which is controlled on the digital camera 678 by a shutter release button 684. A second display panel 686 is located on the top or backside of the digital camera 678.

The digital camera 678 has a microdisplay 688 which is seen through a viewfinder 690 as illustrated in FIG. 16F. The viewfinder 690 has a lens 692 for viewing the microdisplay 688. The microdisplay 688 is located on its own chip 694 which is connected to a logic controller on a main or mother board 696 of the digital camera 678. It is recognized that the information typically displayed on the second display panel 686 can also be displayed on the microdisplay.

Figure 16G:
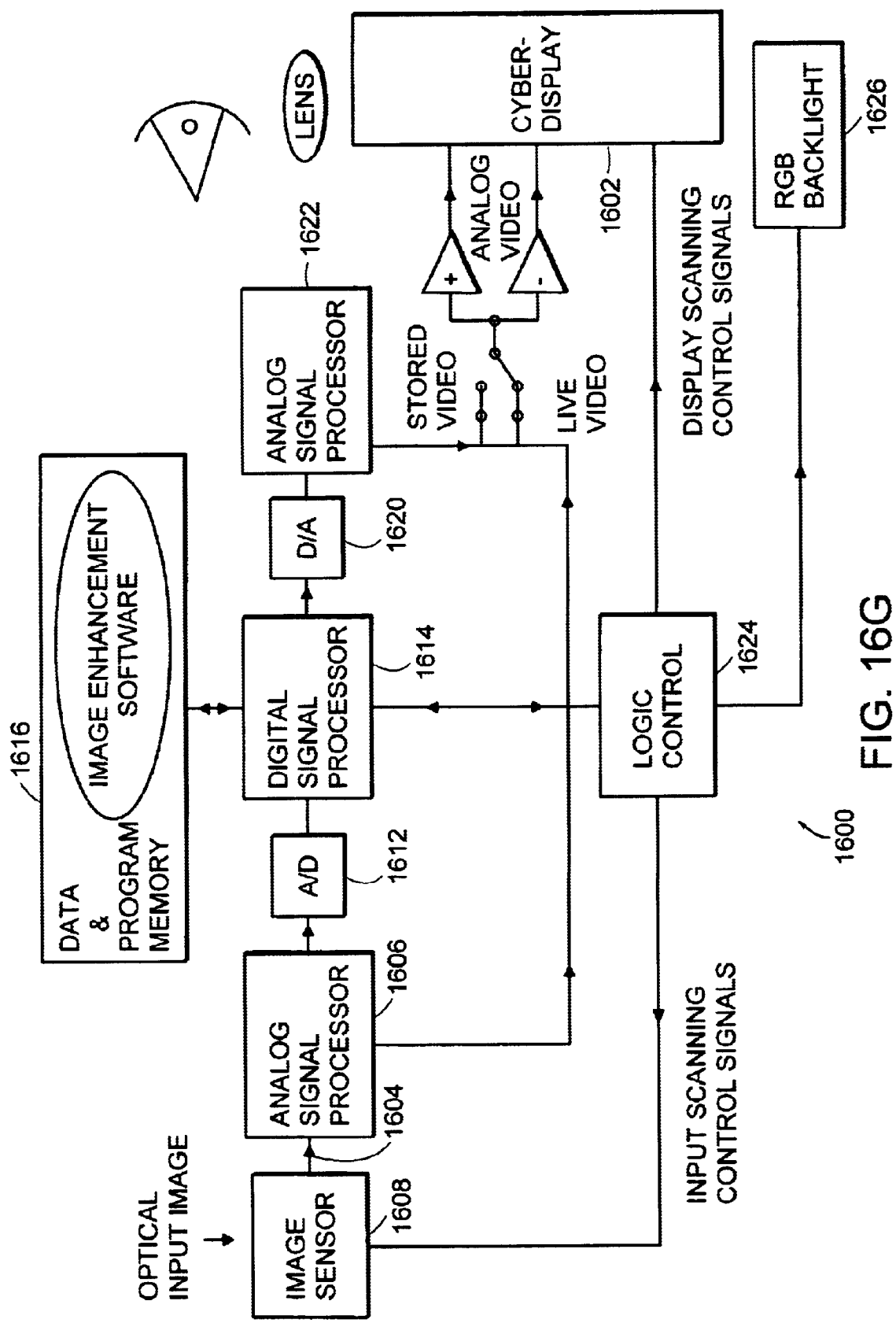
FIG. 16G illustrates a display control circuit for a camera.

A preferred embodiment of a display control circuit 1600 for a color sequential microdisplay 1602 for a camera is illustrated in FIG. 16G. The display control circuit 1600 receives an analog composite signal 1604 at an analog signal processor 1606 from an image sensor 1608. The analog signal processor 1606 can be a commercially available chip, such as the Sony CXA1585, which separates the signal 1604 into red, green and blue components.

The image is sent from the analog signal processor 1606 directly to the microdisplay 1602. At the same time, the three analog color components are converted into digital signals by analog to digital (A/D) converters 1612. The digital signals are further processed by a digital signal processor 1614 and stored in a memory circuit 1616. The signal stored in the memory circuit 1616 can be enhanced or altered such as compression, gamma correction, smoothing and/or dithering. The enchanting or altering uses commercially available software, such as that marketed by Photoshop, Inc.

In addition to viewing directly from the analog signal processor 1606 associated with the image sensor 1608, the microdisplay 1602 can display what is stored in the memory 1616 by the digital signals going through the digital signal processor 1614 to a digital-to-analog converter 1620 to convert the digital signal back into an analog signal. The display control circuit 1600 has an analog signal processor 1622 for separating the signal into red, green and blue components.

The display control circuit 1600 has a logic circuit 1624 including a timing circuit. The logic circuit 1624 is connected to the image sensor, the microdisplay, the digital signal processor and the memory for controlling the flow of the video signal.

When taking the images directly from the image sensor to the microdisplay 1602 through the analog signal processor 1606, the logic circuit 1624 synchronizes the signal into red, green and blue signals which the microdisplay 1602 uses. This synchronization can include the use of various filters to gather image data in a synchronized color order to be fed to the microdisplay 1602 and coordinating actuation of the backlight 1626.

The logic circuit 1624 controls the sequential flow of each color frame onto the display by sending video data from the memory 1616 onto the display 1602 and coordinating actuation of the backlight 1626 along lines for each primary color.

Figure 16H:
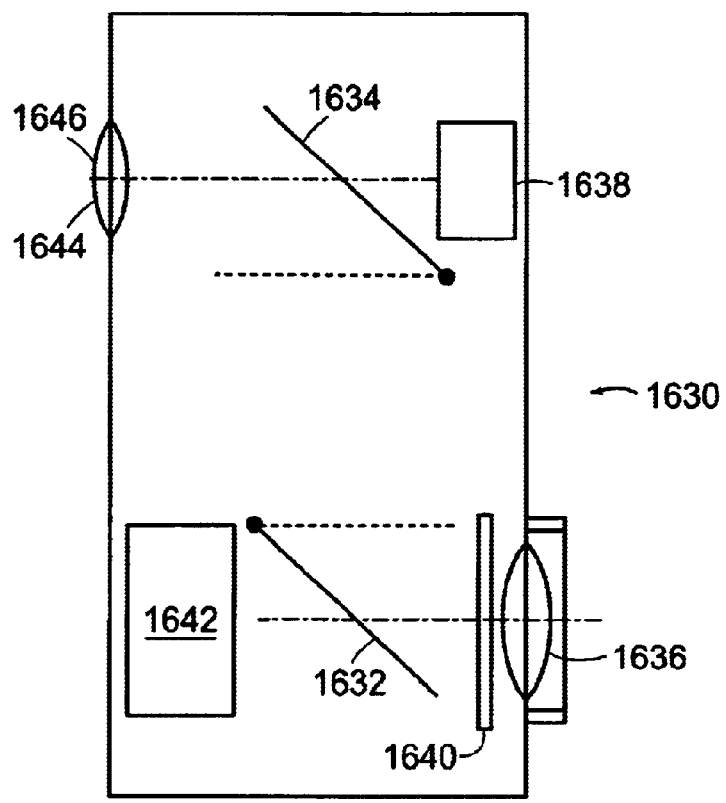
FIGS. 16H and 16I illustrate cameras with moving mirrors for through the lens viewing.

The digital camera 678 shown in FIGS. 16E and 16F uses the microdisplay 688 to view the image prior to shooting the picture. FIG. 16H illustrates a digital camera 1630 having a pair of mirrors 1632 and 1634 so that the user can view the image through the camera lens 1636 rather than from the microdisplay 1638 if preferred. The first mirror 1632 is located between a shutter 1640 and the image sensor 1642. The first mirror 1632 directs the image that is seen through the lens 1636 up to the second mirror 1634, which is located between the microdisplay 1638 and a lens 1644 of the viewfinder 1646.

When the shutter release button is pushed, both mirrors 1632 and 1634 flip to a substantially horizontal position as seen in phantom in FIG. 16H. The image that passes through the camera lens 1636 is seen by the image sensor 1642. In addition, if the user wants to see the image on the microdisplay 1638 or view a previously taken picture stored in memory, the second mirror 1634 is flipped horizontally, as viewed in FIG. 16H in phantom, so the microdisplay 1638 can be seen through the lens 1644 of the viewfinder 1646.

Figure 16I:
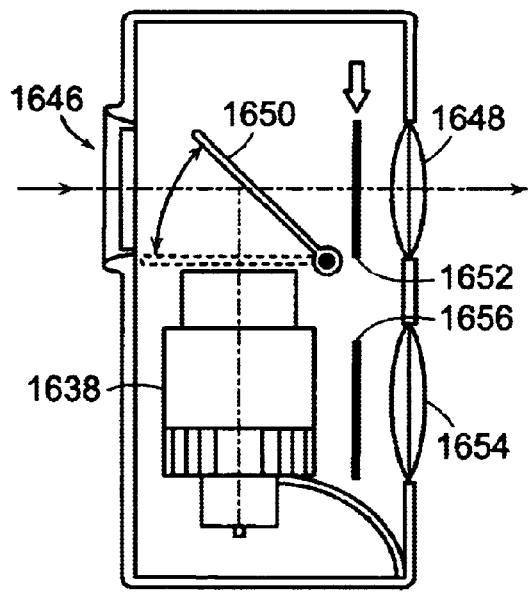

An alternative embodiment is shown in FIG. 16I. In this embodiment the viewfinder 1646 uses a separate second lens 1648 from that of the lens 1654 of the image sensor 1656 and a single mirror 1650. With the mirror 1650 in the position shown, the mirror 1650 allows the user to see the image of the microdisplay 1638 through the lens 1644 of the viewfinder 1646. With the mirror 1650 flipped down as seen in phantom, the user sees the view to be photograph through the second lens 1648. If the mirror 1650 is a half mirror, the user can see both the microdisplay 1638 and the view through the second lens 1648. A shutter 1652 interposed between the second lens 1648 and the mirror 1650 allows selection of viewing the through of either the second lens 1648 or microdisplay 1638 when a half mirror 1650 is used.

Figure 16J:
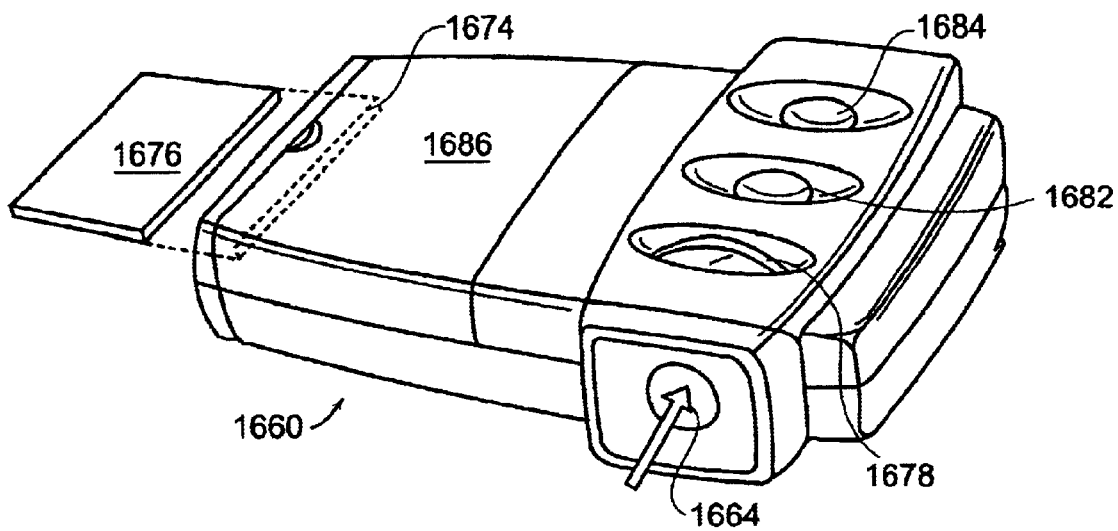
FIGS. 16J and 16K illustrate a camera/imager with a microdisplay as a viewfinder.
Figure 16K:
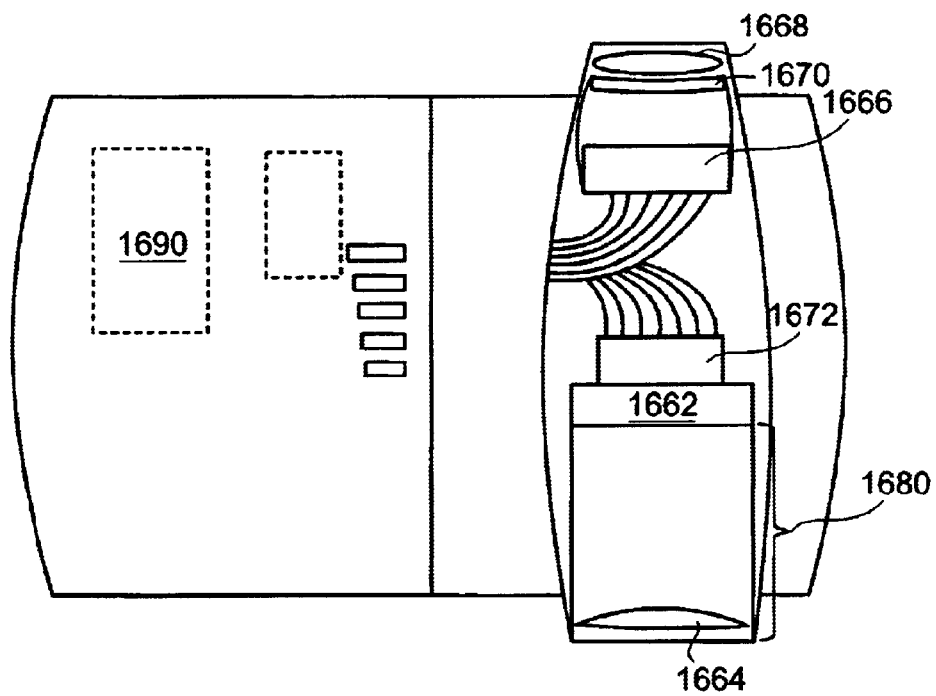

A digital camera/card reader 1660 is illustrated in FIGS. 16J and 16K. The digital camera/card reader 1660 has a microdisplay 1662 with a viewing lens 1664 and a image sensor 1666, such as the Intel VL5426S002, with a lens 1668 and an interposed shutter 1670. Note that an electronic shutter can also be used. A backlight 1672 for the microdisplay 1662 is interposed between the microdisplay 1662 and the image sensor 1666.

The digital camera/card reader 1660 has a slot 1674 for receiving a memory card which can store or already contain images viewable on the microdisplay 1662. A focus knob 1678 for the display is located on the optical engine 1680 of the microdisplay 1662. A shutter release button 1682 and an image select button 1684 are also shown.

A detachable battery pack 1686 and the housing 1688 for the circuit 1690, illustrated in broken line, which underlie the battery 1686, create a handle for holding the digital camera/card reader 1660.

Another preferred embodiment of the invention relates to a card reader system. Such a system 700 is illustrated in connection with FIGS. 17A–17C and includes a housing 705 with a port or aperture 712 for insertion of a card 730, a display system 706 for presenting information to the user, a card reader 734, a control circuit 736, and a control panel 715 that controls reader operation. The display system 706 can include the color sequential display module as described previously herein.

The card 730 being read by the reader can be a so-called "Smart Card" or a PCMCIA card. Smart cards are commercially available and can include elements 738 such as a memory for storing data, a controller, a power source, and a coil antenna 732 to interface with the reader, all mounted on a piece of plastic. This type of card can be used to store personal financial information, personal medical history, insurance information, and/or many other types of data useful to the card user. More details regarding such cards can be found in U.S. Ser. No. 08/680,210 filed on Jul. 11, 1996, the entire contents of which is incorporated herein by reference. Alternatively, the card 730 can be a PCMCIA card such as a modem including a wireless receiver or data storage card.

The user is often interested in displaying information contained on the card and in controlling access to this information. The card reader of the present invention is used to provide access to this information by displaying selected information stored on the card. As shown in FIG. 17A, the reader housing 705 has a viewing window 702 and a slot or aperture 712 for insertion of at least that portion of the card containing the interface 732 to permit reading of information stored in card memory. The user manipulates control elements or buttons on a control panel 715 of the reader housing 705 to operate the system. The elements can include an on/off switch 708 and a four way element 710 to scroll the display up, down, left or right. An internal battery 720 provides power for all reader functions.

In an alternate embodiment of the invention, the reader 700 can also include an imaging device 718, including a CMOS or CCD imaging circuit 722 and imaging optics 724. Button 714 can operate the cameras 718 and select button 716 allows the user to select from a menu of reader 700 operations.

As shown in FIG. 17B, another preferred embodiment provides for detaching the display 706 and or the camera 718 from the housing 705. Either detachable element can be electrically connected to the housing 705 with a cable 726 from a socket 728 of either element 706, 718. The reader 734 is positioned in the housing 705 to be adjacent to the antenna 732 on the card 730 or can be any other suitable interface such as a magnetic strip reader.

Figure 18:
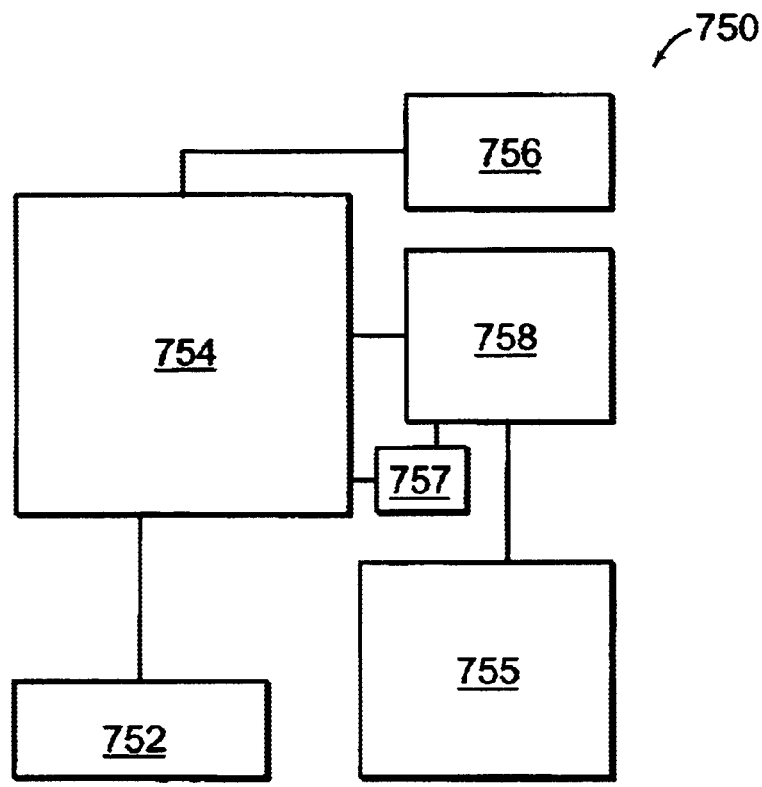
FIG. 18 is a schematic circuit diagram for a portable card reader system.

A schematic circuit diagram for a card reader system is illustrated in FIG. 18. The circuit includes an interface 752 that connects with the card being read, a controller 754 having a memory, a user control panel 756, a microdisplay circuit 758, as described previously herein, and a display 755. The interface 752 can be for cards with contacts or for contactless cards. A battery 757 provides power to the reader. The controller 754 and interface 752 and other physical characteristics of the card reader are preferably configured to comply with the guidelines set forth in the International Organization for Standardization (ISO) and the American National Standards Institute (ANSI) standards which are available from ANSI at 11 West 42nd Street, New York, N.Y. 10036. These standards, including ISO/IEC 7816-1 through 7816-7, and the amendments thereof, are incorporated herein by reference in their entirety As illustrated in FIG. 19A, the card reader 750 can be connected by wireless modem, telephone or other cable link 764 to an interface 760 such as a personal computer (PC) card to a general purpose computer 762.

Another embodiment of the card reader system 766 is illustrated in FIG. 19B. The system includes a housing 768 with a port or aperture 770, shown in hidden line, for insertion of the card 730, or at least that portion of the card that contains the interface, a display system 772 for presenting information to the user, and a control panel 774 that controls reader operation. Similar to the previous embodiment, the system 766 has a card reader, a control circuit, and a internal battery as described previously. The display system 772 can include the color sequential display module as described previously herein and is shown in actual size.

As shown in FIG. 19B, the reader housing 768 has a viewing window 776. The user manipulates control elements or buttons on a control panel 774 of the reader housing 768 to operate the system. The elements can include an on/off switch 778 and a four way element to scroll the display up, down, left or right.

The card reader system can be used to access or change the data stored on the card or select an option from choices provided through a PCMCIA modem. The user can change the data or make the selection using a four way element 710 and a select button 716, such as shown in FIG. 17A.

FIG. 19C discloses a schematic of an embodiment of a circuit 780 for the card 730. The circuit 780 has a control chip 782, a memory chip 784, and an interface chip (flashcard) 786. The control chip 782 takes the images stored on the memory chip 784 and sends the signal to the interface chip 786. The control chip 782 and the memory chip 784 are connected by both address lines 788 and data lines 790. In addition, an output enable (OE) line 792 extends between the control chip and the memory chip to allow the card 730 both to be read and to store data. The control chip 782 takes the image and sends the image in a series of bits to the interface chip 786.

Figure 19D:
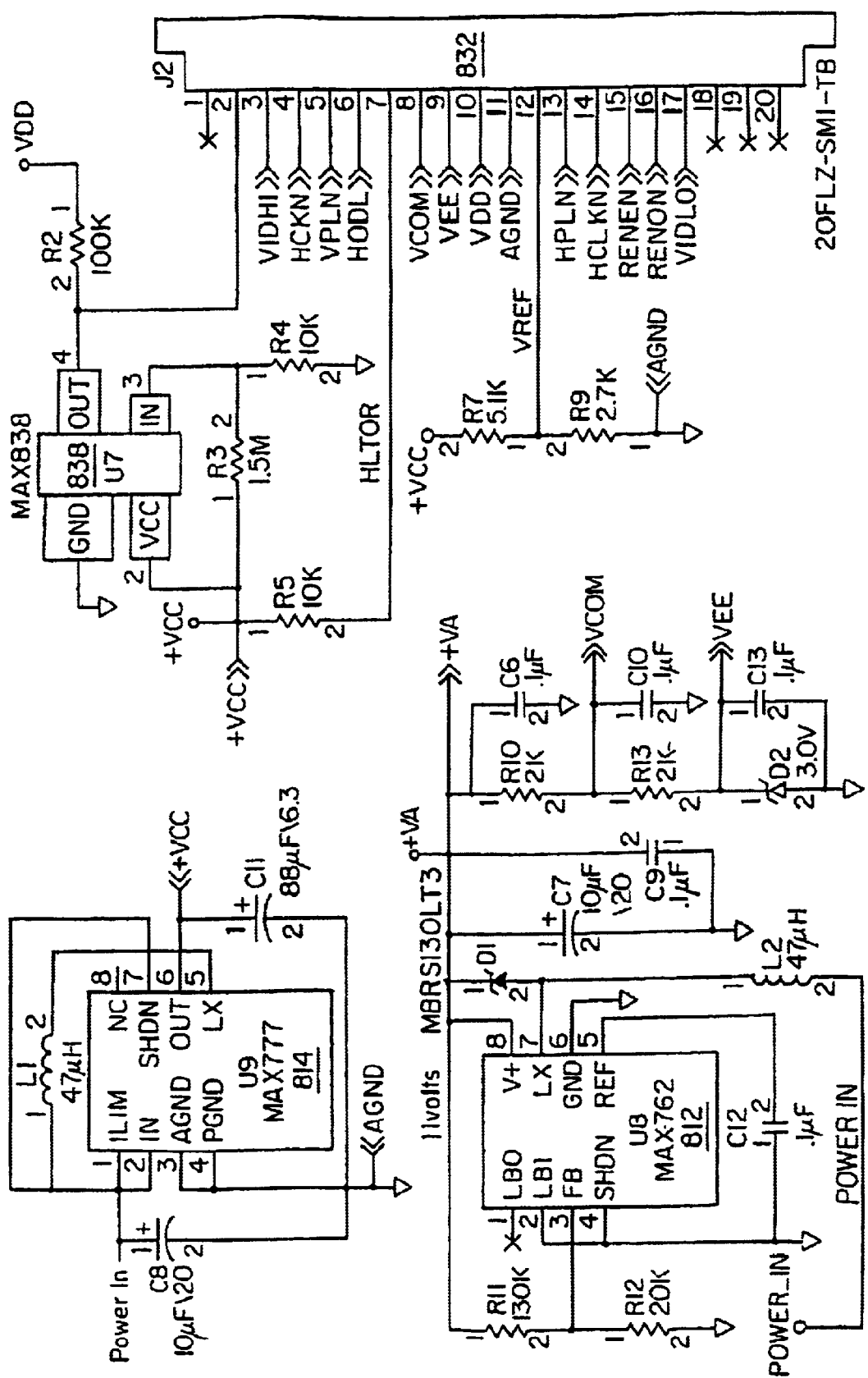
FIGS. 19D and 19E, consisting of FIGS. 19E-1 and 19E-2, is a schematic circuit diagram of the controller within the reader or imager.

The interface chip 786 has eight connection points 794, 796, 798, 800, 802, 804, 806, and 808 for interacting with an interface connection 816, as illustrated in FIG. 19D, on the card reader 750. The card 730 receives power (voltage) and is grounded through the connections 794 and 796 made on the interface chip 786. The card receives a frame reset signal through a frame reset connection 798 to allow the control chip 782 to know when to send the next frame. A picture increment signal sent through a picture increment connection 800 allows the control chip 782 to shift addresses to another stored picture. A clock signal to the control chip from the clock connection 802 regulates the flow of data. The control chip 782 sends a bit of data for each clock pulse and waits for a signal before starting the next row. The image signal is sent from the memory 784 through the control chip 782 to a data out connection 804 to the card reader 750.

The mode input 806 is used to switch between a read and a write mode. The data in connection 808 is for writing data to the memory.

Figure 19E:
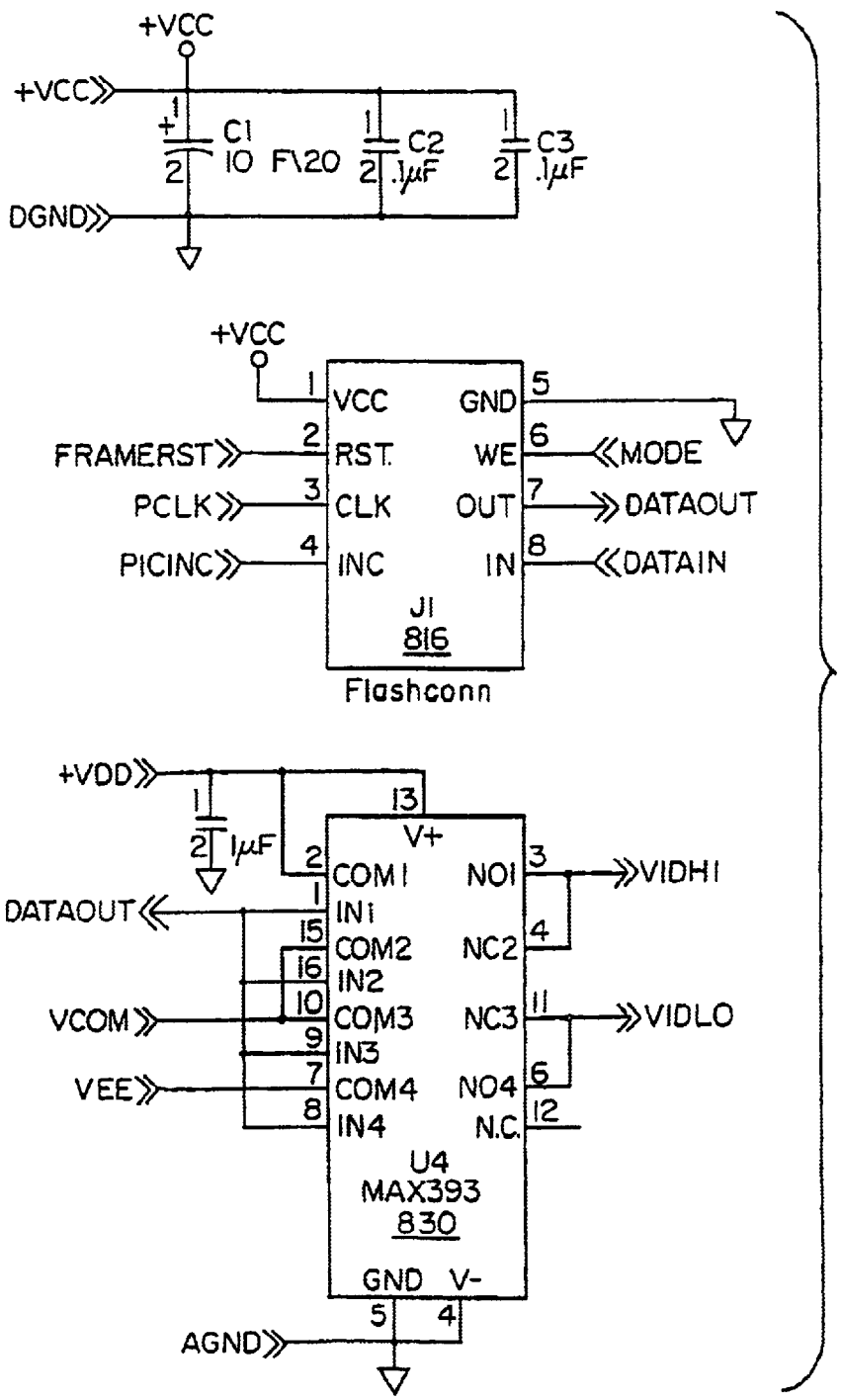
Figures 2, 19E:
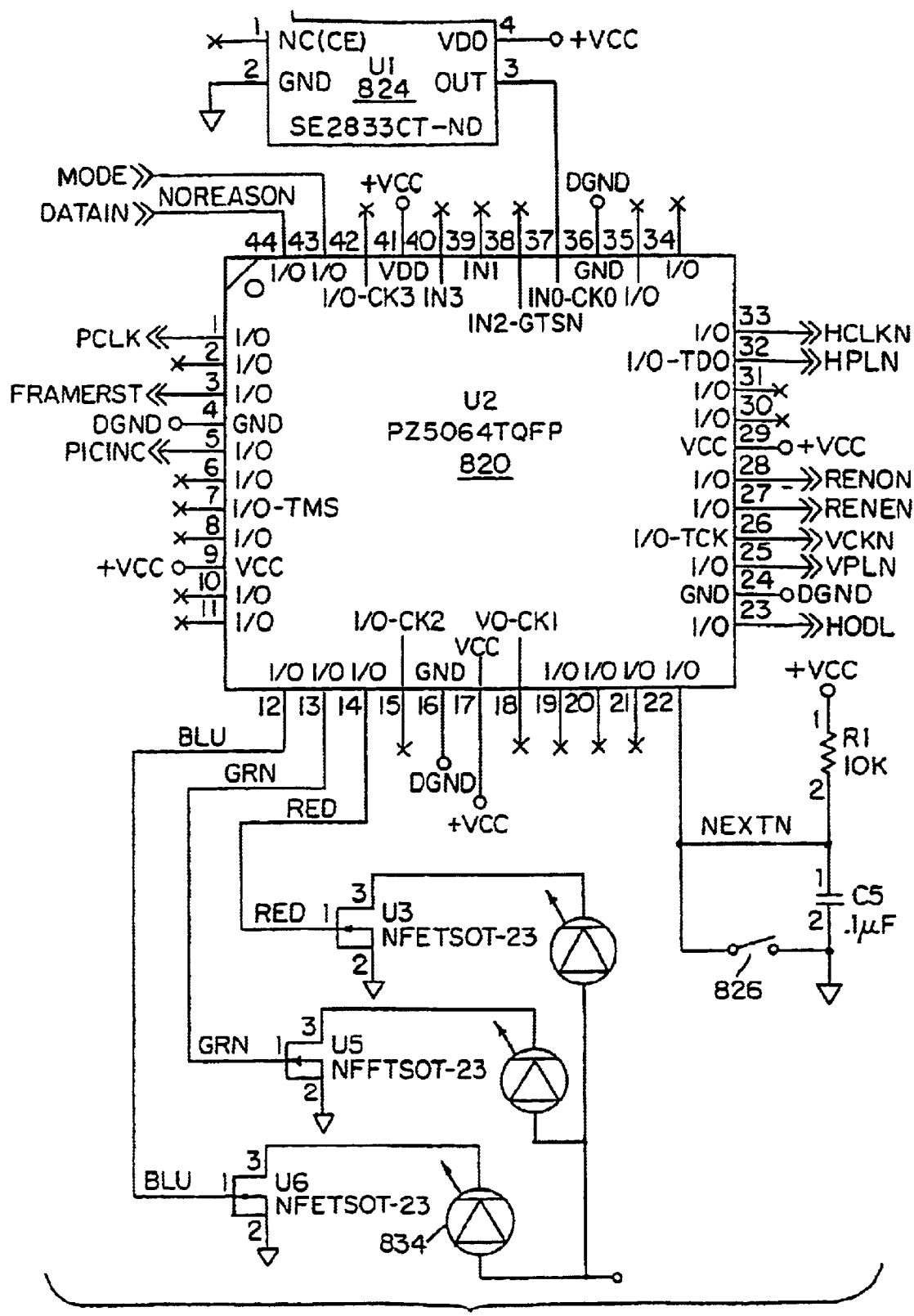
Figure 19F:
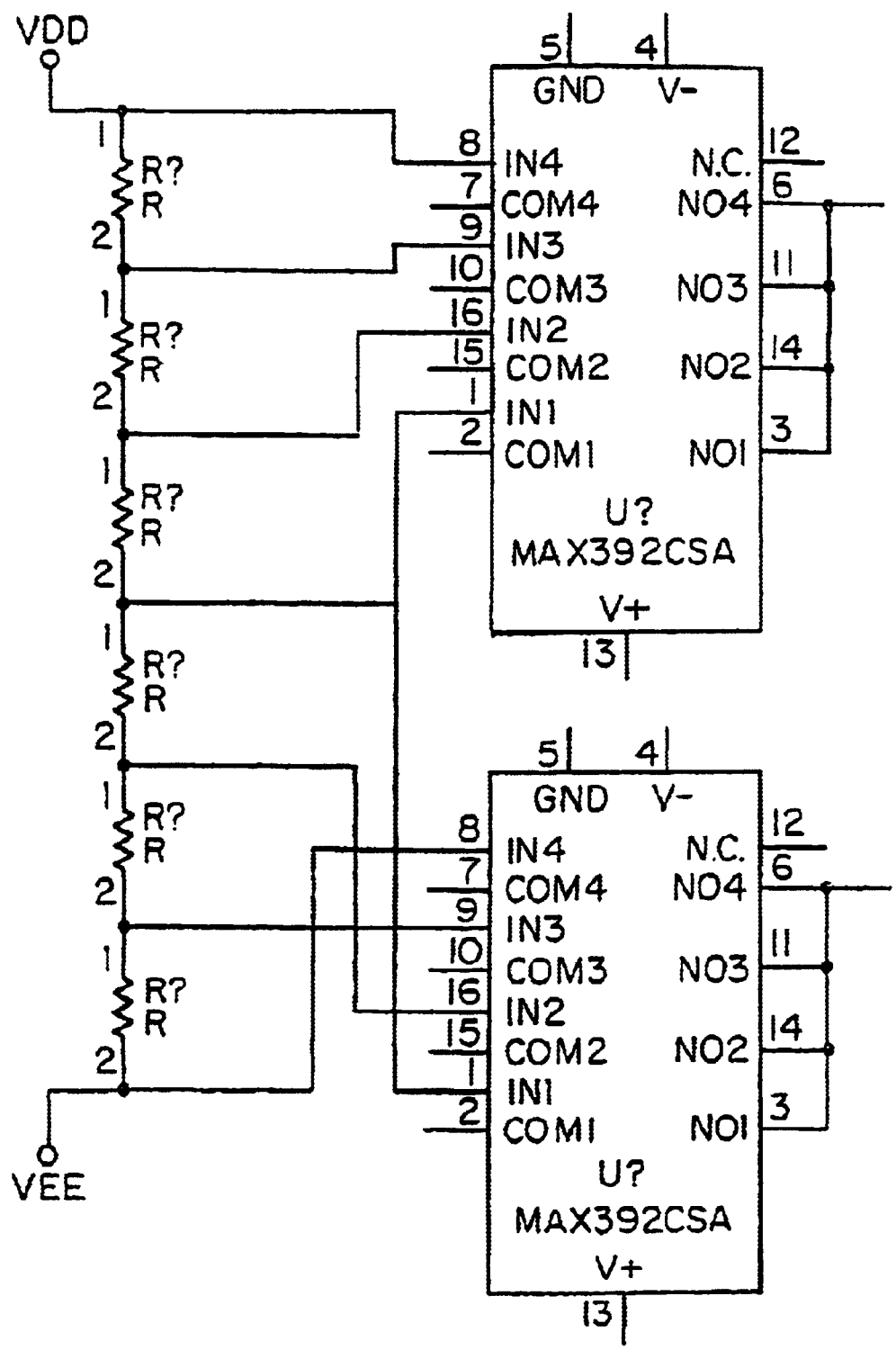
FIG. 19F is a schematic circuit diagram of an alternative embodiment of a switcher in the controller.

FIGS. 19D and 19F illustrate a schematic of a display control circuitry 810 in the card reader 750. The display control circuit 810 has a battery, which through a digital power supply 812 and an analog power supply 814, powers the circuit 810 as represented in FIG. 19D. The flash connection 816 of the card reader 750 is the interface with the flashcard 786 of the card 730. The flash connection 816 sends the signals and power described above including the clock, the frame reset and picture increment from a control chip 820. The control chip 820 receives its clock signal from a 20 MHz clock chip 824. The picture increment is set high by a switch 826, which is physical connected to a button on the control panel 774 of the reader housing 768.

The data signal from the card 730 through the flash connection 816 is sent to a switch circuit 830 which set the signal high ($V_{DD}$) or low ($V_{COM}$) depending if the signal is a high bit (1) or a low bit (0). The video signal is sent from the switch to a connector, which connects to the microdisplay. The connector in addition send the control signals from the control circuit and power to the microdisplay. The LEDs for the backlight are controlled each by a transistor and a signal from the control chip.

The circuit in addition has a power down reset circuit. The power down reset circuit sends a signal to the microdisplay to clear the image before the power is off.

FIGS. 19D and 19E represent a 1 bit color display control circuit which displays eight colors (red, blue, green, black, white, magenta, cyan, and yellow). By selecting varying voltages between $V_{EE}$ and $V_{DD}$ and having two switches, a 2 bit color display control circuit having 64 colors is possible. It is recognized that greater number of colors are desired, but for items such as pagers and cellular telephones, the wireless transmission rate may limit the bits available for transmitting image data. With these limited transmission rates the available number of colors for displayed is reduced until better compression systems and transmission rates are available. With limited colors because of transmission rates, a switch chip is preferred to a video processor because of power requirements. For items such as cameras and other products not including wireless transmission 8 bit color displays having 16 million colors is preferred.

The display module shown in FIG. 19B can be equipped with an antenna and television receiver to provide a pocket size color television.

Head Mounted Display System

In yet another embodiment of the invention shown in FIG. 20A, the HDTV color active matrix display, as described in connection with FIG. 2A, is provided with suitable optics and incorporated into a housing 860 and pivotally attached to a headband frame 861 to provide a novel head mounted display system 864. In general, the system 864 is comprised of a unique headband frame 861 and adjustable strap 862 for attaching the system to the user's head, a side-mounted speaker system 866 connected by cable 868 to electronics console 870 attached to the front of the frame 862, a microphone 872 rotatably suspended from speaker frame 874, and the aforementioned display housing 860 dependent from console 870 and electronically connected thereto by cable 876.

Figure 20A:
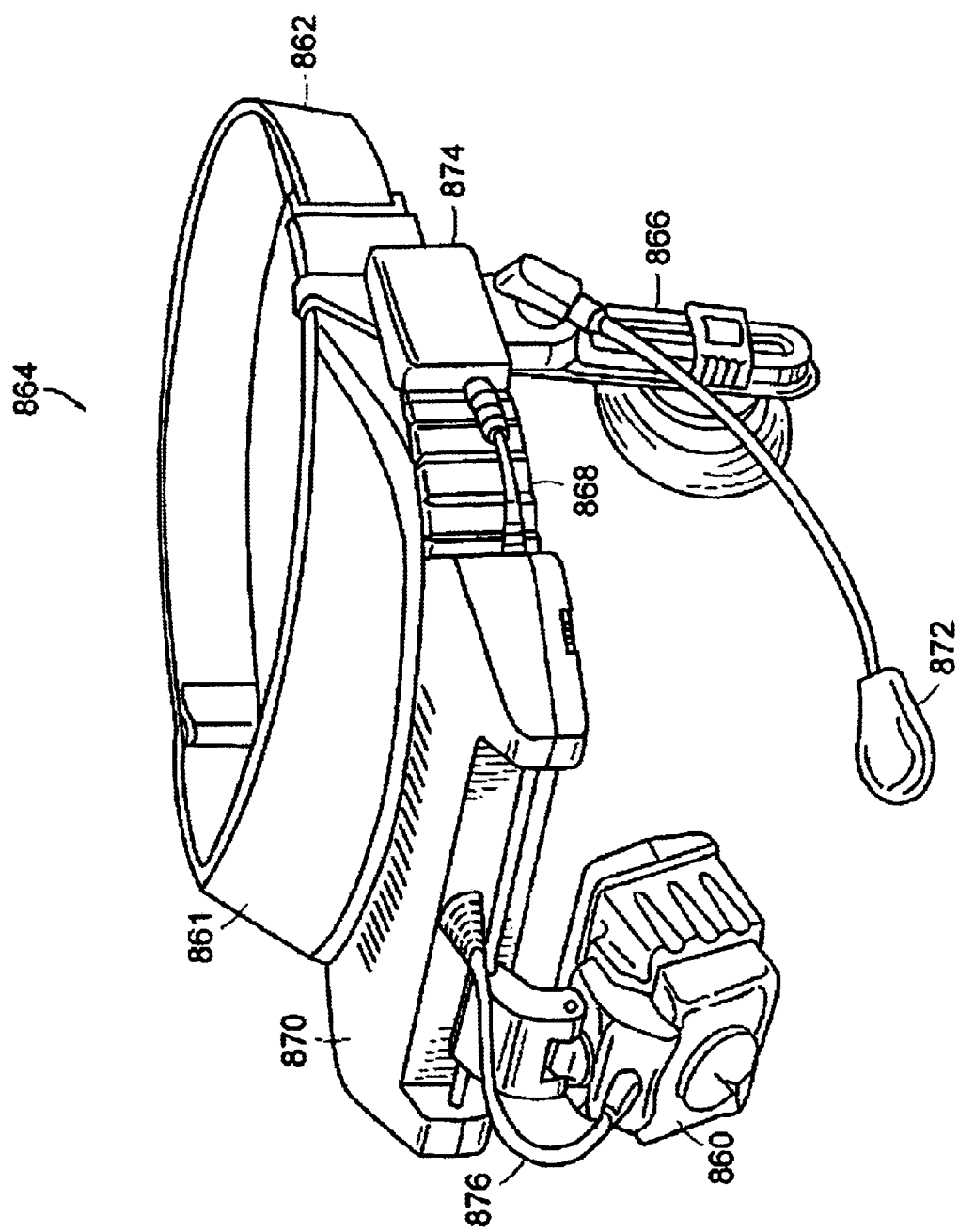
FIG. 20A is a perspective view of a head-mounted display system of the invention.
Figure 20B:
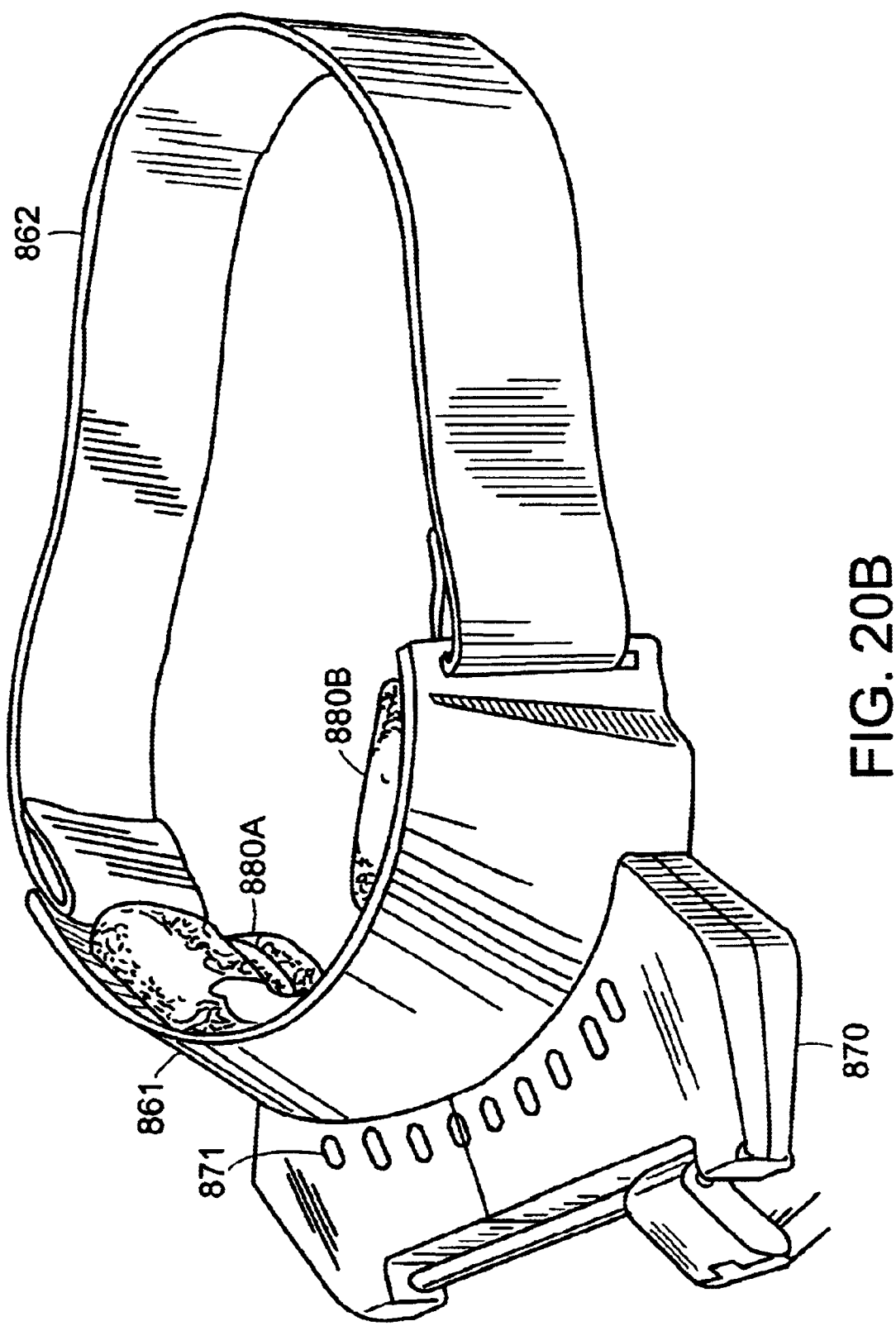
FIG. 20B is a partial schematic perspective view of the system of FIG. 20A emphasizing additional features of the invention.
Figure 20C:
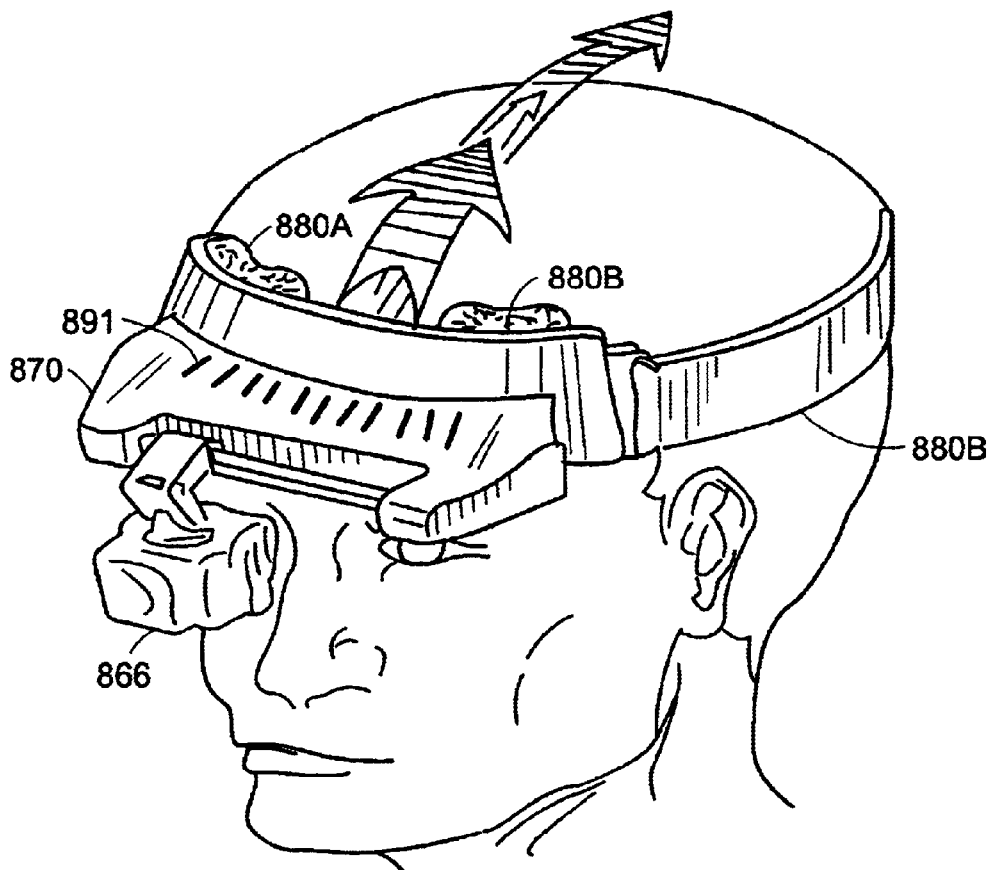
FIG. 20C is a schematic perspective view of the system of FIG. 20A which emphasizes certain aspects of the invention.
Figure 20D:
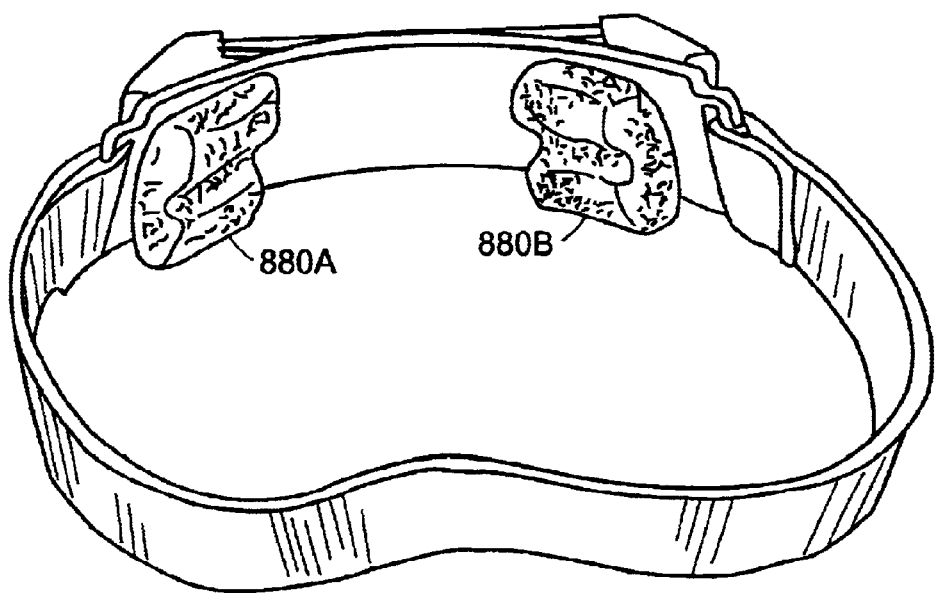
FIG. 20D is a schematic perspective view of the headband and pads of FIG. 20C.
Figure 20E:
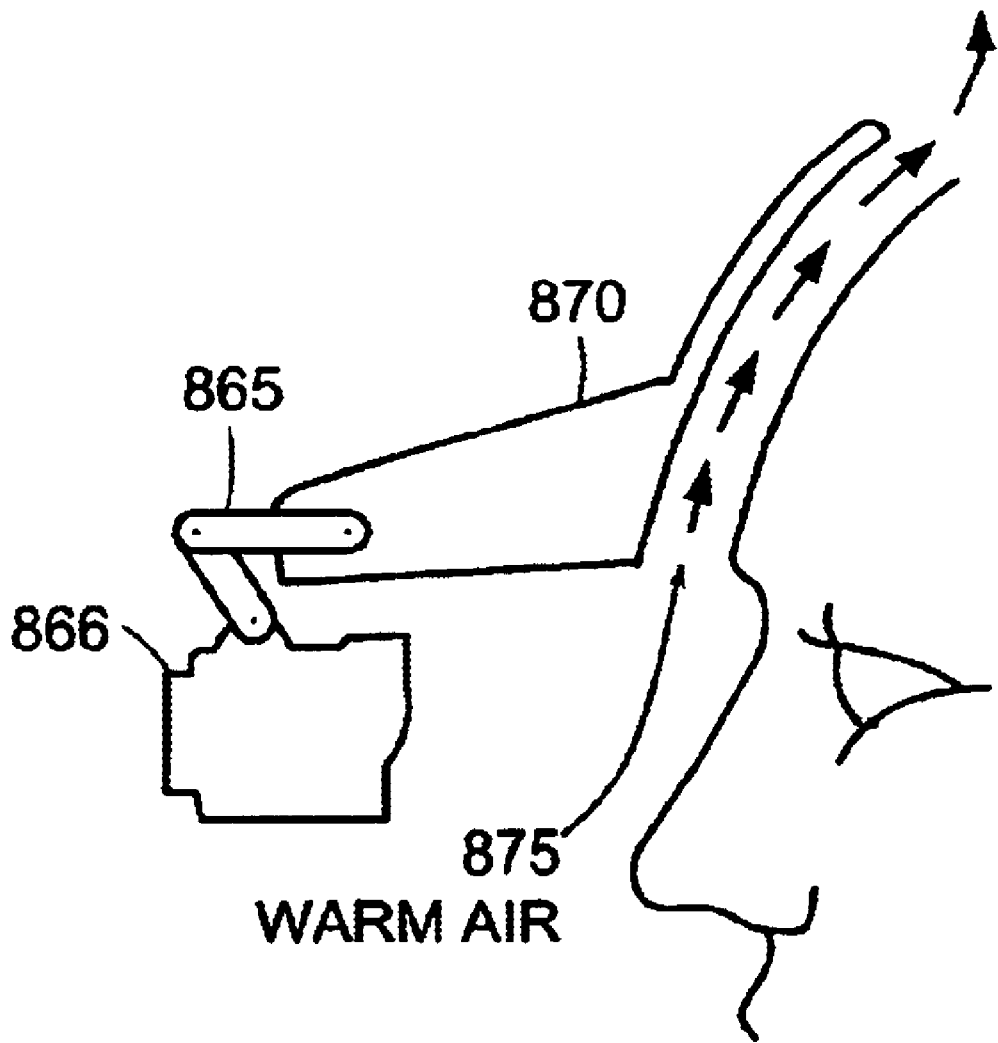
FIG. 20E is a partial schematic side view of the system of FIG. 20A.

Not shown in FIG. 20A is a headband system comprised of two or more pads 880A, 880B, as shown in FIGS. 20B–20E.

To allow for the broadest range of head sizes, the headband frame 861 utilizes two contoured foam pads 880A and 880B, angled, and spaced apart such that both small and large forehead curvature are accommodated. Each foam pad also has two primary contact areas 881 and 883, that act in the same way. When combined with a strap 862 placed below the ball formed at the rear of the head, the net effect is that the headband frame 861 is securely located on the wearer's forehead 887 whether child or adult.

When the electronics are used, there is some heat being generated in the main housing or console 870. Prior art headbands used wide forehead pads which effectively trapped this heat at the wearer's brow. This proved to be quite uncomfortable after extended wear.

The foam pads 880A and 880B displace the headband frame 861 from the user's forehead 887 leaving a gap there between which serves as a warm air vent 875 to dissipate warm air generated by the electronics in console 870.

This new embodiment provides a "chimney-like effect" that effectively vents the warm air away from the wearer's face. The foam pads are removably attached, as by Velcro® type fasteners, and covered with terrycloth 861 for improved comfort. Optional additional vents 871 are provided in the console 870.

Equivalents

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An electronic image viewing device comprising:
   a device housing;
   an image sensor that is mounted to the housing and senses an image;
   a signal processor that is mounted to the housing and processes signals from the image sensor;
   a display circuit that is electrically connected to the signal processor and generates display data based on the processed signals;
   a light valve display that is mounted to the housing and presents the display data as an image;
   a light emitting diode (LED) light source that is optically coupled to the display for illuminating the image presented on the display;
   a lens optically coupled to the display that focuses the image on the display for viewing by a user; and
   a power management circuit that controls the power consumption of the display, the power management circuit lowering the power consumption of the display after the image is illuminated until the next image is ready to be presented on the display, without comparing images.

2. The electronic image viewing device of claim 1 further comprising a recording device for recording the image.

3. The electronic image viewing device of claim 2 wherein the recording device records an analog signal.

4. The electronic image viewing device of claim 2 wherein the recording device records a digital signal.

5. The electronic image viewing device of claim 1 wherein the display is a color sequential display and the light source is a plurality of LED backlights.

6. The electronic image viewing device of claim 2 wherein the images are recorded in a rapid sequence.

7. The electronic image viewing device of claim 2 wherein the images are recorded individually at distinct times.

8. The electronic image viewing device of claim 1 further comprising a card reading device for reading a card containing images.

9. The electronic image viewing device of claim 1 wherein the display includes an array of at least 75,000 pixel electrodes in a flint plane, and a counterelectrode panel extending in a second plane that is parallel to the first plane, the any of pixel electrodes having an active imaging area of less than 100mm$^2$.

10. The electric image viewing device of claim 9 wherein the display has an array of at least 320 by 240 pixel electrodes.

11. The electronic image viewing device of claim 9 wherein the display circuit actuates the pixel electrodes to display the image on the display, the display control circuit also including a first switch and a second switch under the control of a timing circuit, the first switch selecting between a high or a low common voltage applied tote counter electrode panel, and the second switch being set to scan inverted image data into the display, the display control circuit actuating the pixel electrodes to display the image, flashing the light source to illuminate the image, switching the first switch to switch the common applied voltage to the counterelectrode panel to one the image, and switching the second switch to invert the image and scan the inverted image into the display, the time sequence of the actuating, flashing, switching the first switch and second switch being determined byte timing circuit.

12. The electronic image viewing device of claim 1 wherein the power management circuit lowers the power consumption of the display between sequentially generated display data.

13. The electronic image viewing device of claim 1 wherein the display is an active matrix display.

14. The electronic image viewing device of claim 1 wherein the display includes a reflective display.

15. An electronic image recording and viewing device comprising:
    an image sensor that senses an image, the sensor being positioned within a housing;
    a signal processor that processes signals from the image sensor;
    a memory that is connected to the processor and that stores an image;
    a color sequential matrix display within the housing for displaying the images and having an any of at least 75,000 pixel electrodes in a first plane and a counterelectrode panel extending in a second plane that is parallel to the first plane, the array of pixel electrodes having a display area of less than 100mm$^2$;
    a light source that directs a plurality of colors onto the matrix display in sequence;
    a display lens that focuses an image on the matrix display, for viewing by a user; and
    a display control circuit that is connected to the matrix display and actuates the pixel electrodes to display the image on the matrix display, the display control circuit also including a first switch and a second switch under the control of a timing circuit, the first switch selecting between a high or a low common voltage applied to the counterelectrode panel and the second switch being set to scan inverted image data into the matrix display, the display control circuit actuating the pixel electrodes to display the image, flashing the light source to illuminate the image, switching the first switch to switch the common applied voltage to the counterelectrode panel to erase the image, and switching the second switch to invert the image and scan the inverted image into the matrix display, the time sequence of the actuating, flashing, switching the first switch and second switch being determined by the timing circuit.

16. The device of claim 15 further comprising at least one mirror movable between a position for viewing the matrix display with a lens of a viewfinder and a second position for viewing through a lens of the image sensor.

17. The device of claim 15 further comprising a temperature sensor positioned between a substrate and a cover layer of the matrix display for measuring a temperature of the matrix display.

18. The device of claim 15 further comprising a heating element that heats the matrix display.

19. The device of claim 15 wherein the matrix display includes a reflective display.

20. A method of recording and displaying an image on an active matrix display that is positioned in a camera housing comprising;
    sensing an image with an image sensor positioned within the housing;

recording processed signals of the image in a memory electrically connected to the sensor;

generating display data with a display circuit based on the processed signals;

presenting the display data as an image on an active matrix display;

flashing a light source to illuminate the image;

displaying the image for viewing through a lens that focuses the image on the display; and controlling the power consumption of the display with a power management circuit by lowering the power consumption of the display after the image is illuminated until the next image is ready to be presented on the display, without comparing the images.

21. The method of claim 20 further comprising transferring the image from the memory to a memory card inserted into the camera housing and removing the memory card from the housing.

22. The method of claim 20 further comprising reflecting the image with a mirror from the display through the display lens.

23. The method of claim 20 wherein the display includes an any of pixel electrodes in a first pine, and a counter electrode panel extending in a second plane that is parallel to the first plane.

24. The method of claim 23 further comprising:

selecting a high or a low common voltage with a switching circuit under the direction of the display circuit;

applying the selected common voltage to the counterelectrode panel;

actuating the pixel electrodes to write the image into the display with the display control circuit;

switching the common voltage applied to the counterelectrode panel to erase the image with the switching circuit;

inverting image data after the image has been scanned into the display with a second switching circuit, and scanning the inverted image into the display, and controlling the timing of the actuating, flashing, switching, and inverting with a timing circuit.

25. The method of claim 20 wherein the controlling the power consumption includes lowering the power consumption of the display between sequentially generated display data.

26. An electronic image viewing device comprising:

an image sensor that senses an image;

a signal processor that processes signals from the image sensor;

a matrix display connected to the signal processor, and having an array of at pixel electrodes in a first plane and a counterelectrode panel extending in a second plane that is parallel to the first plane, the display presenting an image based on the signals from the image sensor;

a light source that is optically coupled to the display for illuminating the display;

a display control circuit that is connected to the display and actuates the pixel electrodes to display the image on the display, the display control circuit also including a first switch and a second switch under the control of a timing circuit, the first switch selecting between a high or a low common voltage applied to the counterelectrode panel, and the second switch being set to scan inverted image data into the display, the display control circuit actuating the pixel electrodes to display the image, flashing the light source to illuminate the image, switching the first switch to switch the common applied voltage to the counterelectrode panel to erase the image, and switching the second switch to invert the image and scan the inverted image into the display, the time sequence of the actuating, flashing, switching the first switch and second switch being determined by the timing circuit; and a power management circuit that controls the power consumption of the display, the power management circuit lowering the power consumption of the display after the image is illuminated until the next image is ready to be presented on the display, without comparing images.

27. The device of claim 26 wherein the power management circuit lowers the power consumption of the display between sequentially generated display data.

28. A method of operating an electronic image viewing device comprising:

sensing an image with an image sensor that is mounted to a housing;

processing signals from the image sensor;

generating display data based on the processed signals;

presenting the display data as an image with a light valve display that is mounted to the housing;

illuminating the image presented on the display with a light emitting diode (LED) light source tat is optically coupled to the display;

focusing the illuminated image for viewing by a user; and controlling the power consumption of the display with a power management circuit, the power management circuit lowering the power consumption of the display after the image is illuminated until the next image is ready to be presented on the display, without comparing images.

29. A method of operating an electronic image recording and viewing device comprising:

sensing an image with an image sensor, the sensor being positioned within a housing;

processing signals from the image sensor;

storing an image ma memory;

displaying the image with a color sequential matrix display within the housing, the matrix display having an ray of at least 75,000 pixel electrodes in a first plane and a counterelectrode panel extending in a second plane that is parallel to the first plane, the array of pixel electrodes having a display area of less than 100mm$^2$;

directing a plurality of colors onto the matrix display from a light source in sequence;

focusing an image from the matrix display on a display lens, for viewing by a user; and from a display control circuit that is connected to the matrix display, actuating the pixel electrodes to display the image on the matrix display, the display control circuit also including a first switch and a second switch under the control of a timing circuit, the first switch selecting between a high or a low common voltage applied to the counterelectrode panel, and the second switch being set to scan inverted image data into the matrix display, the display control circuit actuating the pixel electrodes to display the image, flashing the light source to illuminate the image, switching the first switch to switch the common applied voltage to the counterelectrode panel to erase the image, and switching the second switch to invert the image and scan the inverted image into the matrix display, the time sequence of the actuating, flashing, switching the first switch and second switch being determined by the timing circuit.

30. A method of operating an electronic image viewing device comprising:

sensing an image with an image sensor;

processing signals from the image sensor with a signal processor;

presenting an image on a matrix display based on the signals from the image sensor, the matrix display having an array of at pixel electrodes in a first plane and a counterelectrode panel extending in a second plane that is parallel to the first plane;

illuminating the display with a light source;

from a display control circuit, actuating the pixel electrodes to display the image on the display, the display control circuit also including a first switch and a second switch under the control of a timing circuit, the first switch selecting between a high or a low common voltage applied to the counterelectrode panel, and the second switch being set to scan inverted image data into the display, the display control circuit actuating the pixel electrodes to display the image, flashing the light source to illuminate the image, switching the first switch to switch the common applied voltage to the counterelectrode panel to erase the image, and switching the second switch to invert the image and scan the inverted image into the display, the time sequence of the actuating, flashing, switching the first switch and second switch being determined by the timing circuit; and from a power management circuit, controlling the power consumption of the display, the power management circuit lowering the power consumption of the display after the image is illuminated until the next image is ready to be presented on the display, without comparing images.

* * * * *

UNITED STATES PATENT AND TRADEMARK OFFICE
CERTIFICATE OF CORRECTION

PATENT NO. : 6,677,936 B2
DATED : January 13, 2004
INVENTOR(S) : Jacobsen et al.

It is certified that error appears in the above-identified patent and that said Letters Patent is hereby corrected as shown below:

Column 31,
Line 51, replace "flint" with -- first --.
Line 53, replace "any" with -- array --.
Line 63, replace "tote" with -- to the --.

Column 32,
Line 2, replace "one" with -- erase --.
Line 6, replace "byte" with -- by the --.

Column 33,
Line 24, replace "any" with -- array --.

Column 34,
Line 28, replace "tat" with -- that --.
Line 43, replace "ma" with -- in a --.
Line 46, replace "ray" with -- array --.

Signed and Sealed this

Eleventh Day of April, 2006

JON W. DUDAS
*Director of the United States Patent and Trademark Office*